United States Patent [19]

Kawaguchi et al.

[11] Patent Number: 5,471,610
[45] Date of Patent: Nov. 28, 1995

[54] METHOD FOR CHARACTER STRING COLLATION WITH FILTERING FUNCTION AND APPARATUS

[75] Inventors: Hisamitsu Kawaguchi, Sagamihara; Katsumi Tada, Kokubunji; Kanji Kato, Tokorozawa; Masatsugu Shinozaki, Hadano, all of Japan

[73] Assignee: Hitachi, Ltd., Tokyo, Japan

[21] Appl. No.: 31,625

[22] Filed: Mar. 15, 1993

Related U.S. Application Data

[60] Continuation-in-part of Ser. No. 985,795, Nov. 30, 1992, which is a division of Ser. No. 555,483, Jun. 14, 1990, Pat. No. 5,168,533.

[30] Foreign Application Priority Data

| Jun. 14, 1989 | [JP] | Japan | 1-149630 |
| Jul. 24, 1989 | [JP] | Japan | 1-188772 |
| Jul. 24, 1989 | [JP] | Japan | 1-188773 |
| Sep. 8, 1989 | [JP] | Japan | 1-231567 |
| Jun. 14, 1990 | [WO] | WiPO: | PCT/JP90/00774 |
| Mar. 19, 1992 | [JP] | Japan | 4-063067 |
| Sep. 18, 1992 | [JP] | Japan | 4-249191 |
| Nov. 17, 1992 | [JP] | Japan | 4-306748 |

[51] Int. Cl.⁶ .................................................. G06F 17/21
[52] U.S. Cl. ...................... 395/600; 364/DIG. 1; 364/282.1
[58] Field of Search ...................... 395/600; 364/419–420

[56] References Cited

U.S. PATENT DOCUMENTS

| 4,516,166 | 5/1985 | Tellone et al. | 360/72.1 |
| 5,099,426 | 3/1992 | Carlgren et al. | 364/419 |

FOREIGN PATENT DOCUMENTS

| 0266586A3 | 5/1988 | European Pat. Off. |
| 0437615A1 | 7/1991 | European Pat. Off. |
| 60-105040 | 6/1985 | Japan |
| 60-105039 | 6/1985 | Japan |
| 60-117326 | 6/1985 | Japan |
| 62-011932 | 1/1987 | Japan |
| 62-241026 | 10/1987 | Japan |
| 63-198124 | 8/1988 | Japan |
| 63-311530 | 12/1988 | Japan |
| 5-76068 | 12/1989 | Japan |
| 3-95672 | 4/1991 | Japan |
| 3-125263 | 5/1991 | Japan |
| 5-55912 | 8/1993 | Japan |
| WO9016036 | 12/1990 | WIPO |

OTHER PUBLICATIONS

L. Hollaar "Text Retrieval Computers" IEEE Computer Mar. 1979, pp. 40–50.

Haskins, et al., "Operational Characteristics of a Hardware–based Pattern Matcher", ACM Trans on Database Systems, v. 8, No. 1, Mar. 1983, pp. 15–40.

Aho, et al., "Efficient String Matching: An Aid to Bibliographic Search" Comm of the ACM, v. 18, No. 1, Jun. 1975, pp. 333–340.

Faloutsos, et al., "Signature Filed: An Access Method for Documents and Its Analytical Performance Evaluation", ACM Trans on Office Information Systems, v. 2, No. 4, Oct. 1984, pp. 267–288.

Sellis, Timos K. "Multiple–Query Optimization," ACMTransactions on Database Systems, vol. 13, No. 1, Mar.

(List continued on next page.)

*Primary Examiner*—Thomas G. Black
*Assistant Examiner*—Peter Y. Wang
*Attorney, Agent, or Firm*—Fay, Sharpe, Beall, Fagan, Minnich & McKee

[57] ABSTRACT

Character string retrieval method and system for deciding en bloc whether or not a plurality of search terms as designated exist in a text composed of characters expressed in the form of character codes is characterized by inclusion of a character string storage unit for storing a text, a filtering unit for fetching character codes from a text read out from the character string storage unit to thereby output only those character codes that are included in the search term, and a character string matching unit for matching en bloc to decide whether or not the aforementioned search term exists in the string of character codes outputted from the filtering unit.

38 Claims, 36 Drawing Sheets

OTHER PUBLICATIONS 1988, pp. 23–52. (English).

Alsabbagh, J. R., et al. "A Framework for Multiple–Query Optimization," IEEE Second International Workshop on Research Issues on Data Engineering: Transaction Query Processing, Cat. No. 92TH0417–6, Feb. 3, 1992, pp. 157–162. (English).

Kang, Myong H., et al. "Algorithm Choice for Multiple–Query Evaluation," Parbase–90 International Conference on Databases, Parallel Architectures and Their Applications, Cat. No. 90CH2728–4, Mar. 9, 1990, p. 535. (English).

Mukhopadhyay, Uttam, et al. "An Intelligent System for Document Retrieval in Distributed Office Environments," Journal of the American Society for Information Science, vol. 37, No. 3, May 1986, pp. 123–135. (English).

Kim, Michelle Y. "Synchronized Disk Interleaving," IEEE Transactions on Computers, vol. C–35, No. 11, Nov. 1986, pp. 978–988. (English).

Kimbrell, Roy E. "State Machines Find the Pattern," Computer Design, vol. 24, No. 5, May 1985, pp. 163–169. (English).

F I G. 4 PRIOR ART

| INPUT TEXT / TOKEN | 0→1 | 1→2 | 2→3 | 3→5 | 5→6 | 6→7 | 7→8 |
|---|---|---|---|---|---|---|---|
| TOKEN 1 | 0→1 | — | — | — | — | — | — |
| TOKEN 2 | — | 0→X | — | — | — | — | — |
| TOKEN 3 | — | — | 0→X | — | — | — | — |
| TOKEN 4 | — | — | — | 0→X | — | — | — |
| TOKEN 5 | — | — | — | — | 0→X | — | — |
| TOKEN 6 | — | — | — | — | — | 0→X | 1→X |
| TOKEN 7 | — | — | — | — | — | — | 0→X |

1) X INDICATES REDUCTION OF TOKENS
2) NUMERALS REPRESENT STATE NUMBERS INDICATING POSITIONS WHERE TOKENS EXIST

FIG. 8

| ADDRESS | COINCIDENCE FLAG |
|---|---|
| 0 0 | 0 |
| 0 1 | 0 |
| ⋮ | ⋮ |
| 4 1(A) | 0 |
| 4 2(B) | 0 |
| 4 3(C) | 1 |
| 4 4(D) | 0 |
| ⋮ | ⋮ |
| 4 b(K) | 0 |
| 4 c(M) | 1 |
| 4 d(N) | 0 |
| ⋮ | ⋮ |
| 5 6(U) | 0 |
| 5 7(O) | 1 |
| 5 8(P) | 0 |
| 5 9(Q) | 0 |
| 5 a(R) | 0 |
| 5 b(S) | 1 |
| 5 c(T) | 0 |
| ⋮ | ⋮ |
| f e | 0 |
| f f | 0 |

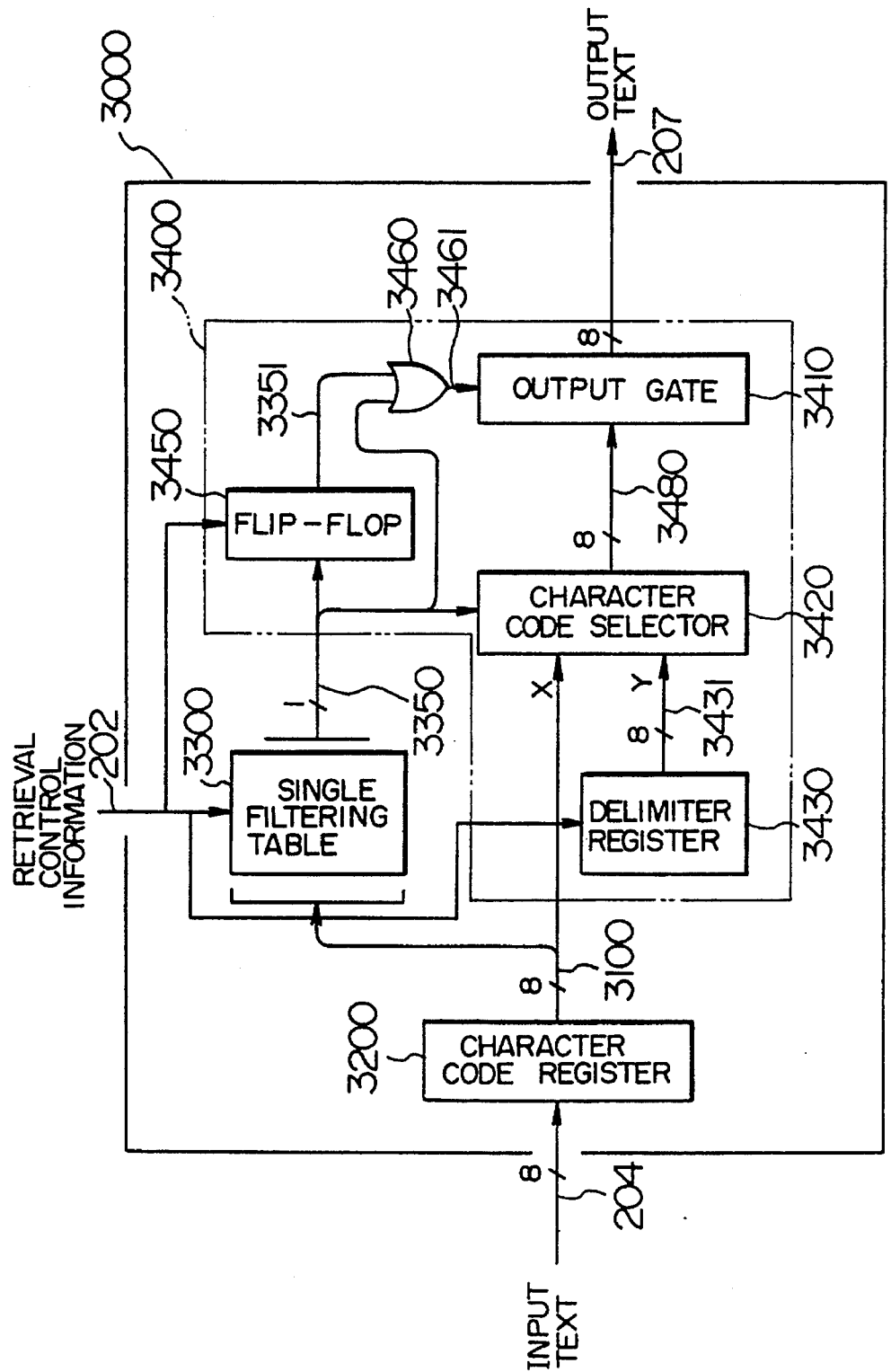

FIG. 13

| ADDRESS | LEADING CHARACTER CO-INCIDENCE FLAG | TRAILING CHARACTER CO-INCIDENCE FLAG |
|---|---|---|
| 0 0 | 0 | 0 |
| 0 1 | 0 | 0 |
| ⋮ | ⋮ | ⋮ |
| 4 1 (A) | 0 | 0 |
| 4 2 (B) | 0 | 0 |
| 4 3 (C) | 1 | 0 |
| 4 4 (D) | 0 | 0 |
| ⋮ | ⋮ | ⋮ |
| 4 b (K) | 0 | 0 |
| 4 c (M) | 0 | 1 |
| 4 d (N) | 0 | 0 |
| ⋮ | ⋮ | ⋮ |
| 5 6 (U) | 0 | 0 |
| 5 7 (O) | 0 | 1 |
| 5 8 (P) | 0 | 0 |
| 5 9 (Q) | 0 | 0 |
| 5 a (R) | 0 | 0 |
| 5 b (S) | 0 | 1 |
| 5 c (T) | 0 | 0 |
| ⋮ | ⋮ | ⋮ |
| f e | 0 | 0 |
| f f | 0 | 0 |

F I G. 19

| ADDRESS | COINCIDENCE FLAG |
|---|---|
| 0000 | 0 |
| 0001 | 0 |
| ... | ... |
| 415b(AS) | 0 |
| 415c(AT) | 1 |
| 415d(AU) | 0 |
| ... | ... |
| 4540 | 0 |
| 4541(EA) | 0 |
| 4542(EB) | 0 |
| ... | ... |
| 5b44(SD) | 0 |
| 5b45(SE) | 1 |
| 5b46(SF) | 0 |
| ... | ... |
| fffe | 0 |
| ffff | 0 |

F I G. 17

| ADDRESS | COINCIDENCE FLAG |
|---|---|
| 0000 | 0 |
| 0001 | 0 |
| ... | ... |
| 415b(AS) | 0 |
| 415c(AT) | 1 |
| 415d(AU) | 0 |
| ... | ... |
| 4540 | 0 |
| 4541(EA) | 1 |
| 4542(EB) | 0 |
| ... | ... |
| 5b44(SD) | 0 |
| 5b45(SE) | 1 |
| 5b46(SF) | 0 |
| ... | ... |
| fffe | 0 |
| ffff | 0 |

FIG. 24

| ADDRESS | LEADING FLAG | DESIGNATION FLAG |
|---|---|---|
| 0 0 0 0 | 0 | 0 |
| 0 0 0 1 | 0 | 0 |
| ⋮ | ⋮ | ⋮ |
| 4 1 5 b (AS) | 0 | 0 |
| 4 1 5 c (AT) | 0 | 1 |
| 4 1 5 d (AU) | 0 | 0 |
| ⋮ | ⋮ | ⋮ |
| 4 5 4 0 | 0 | 0 |
| 4 5 4 1 (EA) | 0 | 0 |
| 4 5 4 2 (EB) | 0 | 0 |
| ⋮ | ⋮ | ⋮ |
| 5 b 4 4 (SD) | 0 | 0 |
| 5 b 4 5 (SE) | 1 | 1 |
| 5 b 4 6 (SF) | 0 | 0 |
| ⋮ | ⋮ | ⋮ |
| f f f e | 0 | 0 |
| f f f f | 0 | 0 |

FIG. 30

INPUT TEXT : "HIGH-SPEED SCSI BUS CONTROLLER"

| NUMBER OF STEPS \ REGISTER | CHARACTER CODE FETCH REGISTER | INPUT CHARACTER CODE REGISTER | INPUT CHARACTER CODE REGISTER |
|---|---|---|---|
| 1st STEP | H I | — | — |
| 2nd STEP | G H | H | I |
| 3rd STEP | - S | G | H |
| 4th STEP | P E | — | S |
| 5th STEP | E D | P | E |
| 6th STEP | ⊔(SPACE) S | E | D |
| 7th STEP | C S | ⊔(SPACE) | S |
| 8th STEP | I ⊔(SPACE) | C | S |
| 9th STEP | B U | I | ⊔(SPACE) |
| 10th STEP | S ⊔(SPACE) | B | U |
| 11th STEP | C O | S | ⊔(SPACE) |
| 12th STEP | N T | C | O |
| 13th STEP | R O | N | T |
| 14th STEP | L L | R | O |
| 15th STEP | E R | L | L |
| 16th STEP | — | E | R |

FIG. 32

| ADDRESS | COINCIDENCE FLAG |
|---|---|
| 0 0 | 0 |
| 0 1 | 0 |
| ⋮ | ⋮ |
| 4 1(A) | 0 |
| 4 2(B) | 1 |
| 4 3(C) | 0 |
| 4 4(D) | 0 |
| 4 5(E) | 0 |
| ⋮ | ⋮ |
| 5 0(P) | 0 |
| 5 1(Q) | 0 |
| 5 2(R) | 0 |
| 5 3(S) | 1 |
| 5 4(T) | 0 |
| 5 5(U) | 1 |
| 5 6(V) | 0 |
| 5 7(W) | 0 |
| ⋮ | ⋮ |
| f e | 0 |
| f f | 0 |

F I G. 33

INPUT TEXT: "HIGH-SPEED SCSI BUS CONTROLLER"

| REGISTER / NUMBER OF STEPS | INPUT | | | | OUTPUT | | | |
|---|---|---|---|---|---|---|---|---|
| | FILTERING MEANS 3200a | | FILTERING MEANS 3200b | | FILTERING MEANS 3200a | | FILTERING MEANS 3200b | |
| | REGISTER 3210a | REGISTER 3210b | | | CHARACTER CODE REGISTER 3240a | COINCIDENCE FLAG REGISTER 3230a | CHARACTER CODE REGISTER 3240b | COINCIDENCE FLAG REGISTER 3230b |
| 1st STEP | H | – | | | – | 1 | – | 1 |
| 2nd STEP | G | H | | | H | 0 | – | 0 |
| 3rd STEP | I | S | | | G | 0 | H | 0 |
| 4th STEP | P | E | | | I | 0 | S | – |
| 5th STEP | E | D | | | P | 0 | E | 0 |
| 6th STEP | ⊔(SPACE) | S | | | E | 0 | D | 0 |
| 7th STEP | C | S | | | ⊔(SPACE) | 0 | S | – |
| 8th STEP | – | ⊔(SPACE) | | | C | 0 | S | – |
| 9th STEP | B | U | | | – | 1 | ⊔(SPACE) | 0 |
| 10th STEP | S | ⊔(SPACE) | | | B | 0 | U | – |
| 11th STEP | C | O | | | S | 0 | ⊔(SPACE) | 0 |
| 12th STEP | N | T | | | C | 0 | O | 0 |
| 13th STEP | R | O | | | N | 0 | T | 0 |
| 14th STEP | L | L | | | R | 0 | O | 0 |
| 15th STEP | E | R | | | L | 0 | L | 0 |
| 16th STEP | – | – | | | E | 0 | R | 0 |

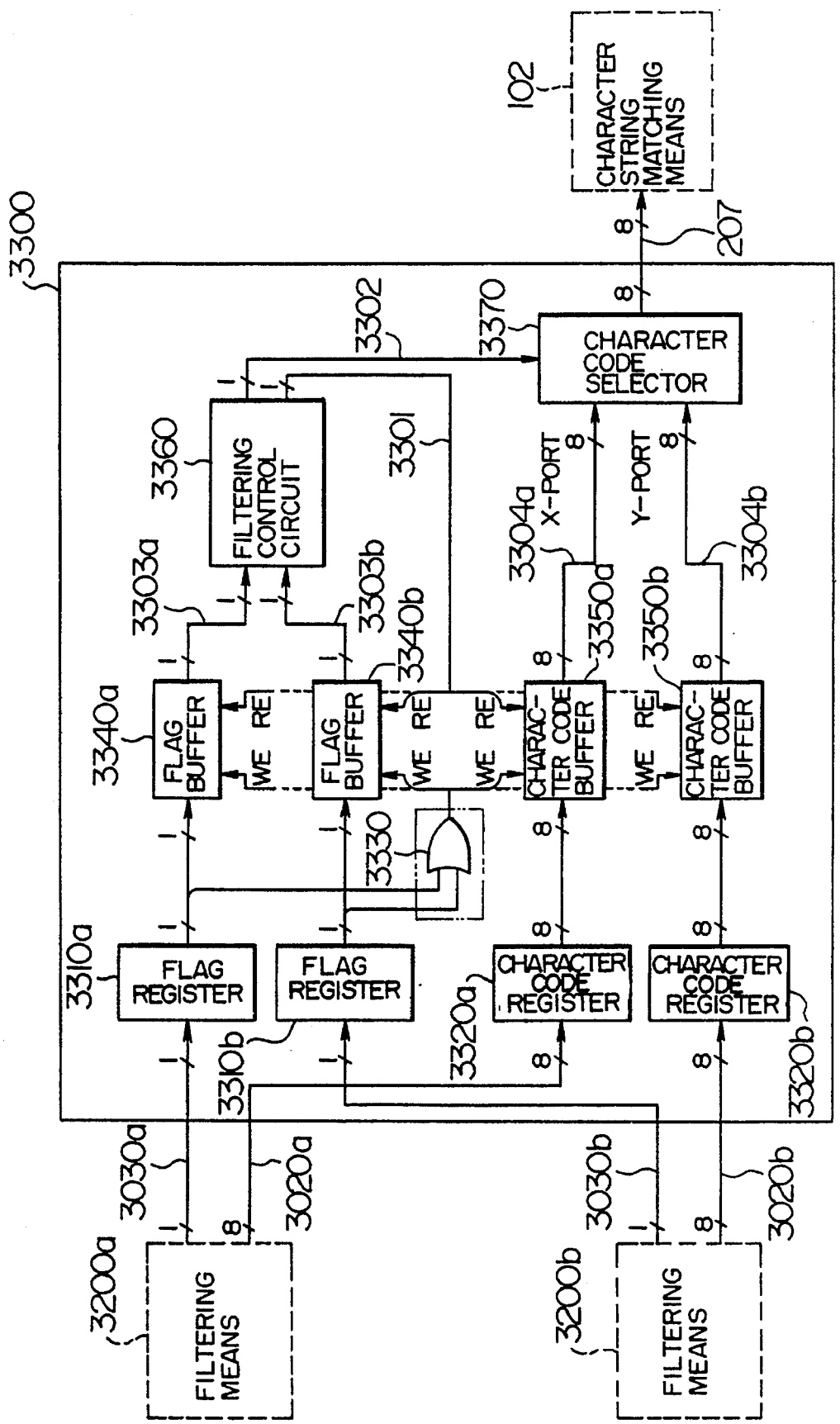

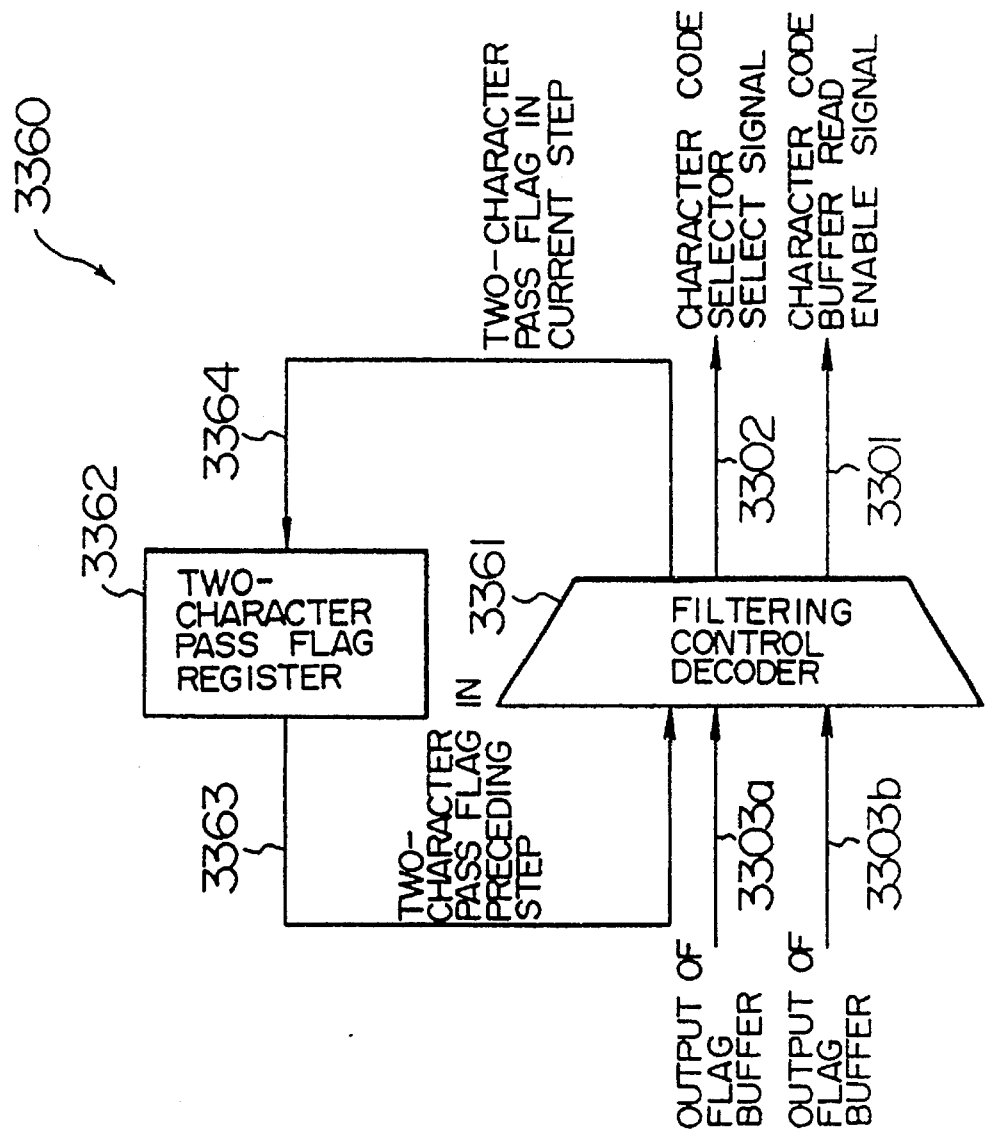
F I G. 35

FIG. 36

| INPUT | | | OUTPUT | | | |
|---|---|---|---|---|---|---|
| TWO-CHARACTER PASS FLAG IN PRECEDING STEP | OUTPUT OF FLAG BUFFER A | OUTPUT OF FLAG BUFFER B | TWO-CHARACTER PASS FLAG IN CURRENT STEP | CHARACTER CODE SELECTOR SELECT SIGNAL | CHARACTER CODE BUFFER READ ENABLE SIGNAL | OPERATION OF CHARACTER CODE SELECTOR |
| ○ | ○ | ○ | *1 | *1 | *1 | *1 |
| ○ | ○ | — | ○ | — | — | SELECTION OF INPUT ONLY THROUGH Y-PORT |
| ○ | — | ○ | ○ | ○ | — | SELECTION OF INPUT ONLY THROUGH Y-PORT |
| ○ | — | — | — | ○ | ○ | SELECTION OF INPUT ONLY THROUGH X-PORT (SELECTION OF INPUT THROUGH Y-PORT IN SUCCEEDING STEP) |
| — | ○ | ○ | *1 | *1 | *1 | *1 |
| — | ○ | — | ○ | — | — | SELECTION OF INPUT AT Y-PORT |
| — | — | ○ | ○ | — | — | SELECTION OF INPUT AT Y-PORT |
| — | — | — | ○ | — | — | SELECTION OF INPUT AT Y-PORT |

1 : OUTPUTS FROM OUTPUT FLAG BUFFER A AND FLAG BUFFER B CAN NEVER SIMULTANEOUSLY BE "○" (BECAUSE OF CONTRADICTION TO THE CONDITION FOR WRITING TO FLAG BUFFER A)

FIG. 37

| NUMBER OF STEPS | CHARACTER CODE AND REGISTER INPUTS ||||  CHARACTER CODE AND FLAG BUFFER / BUFFER INPUTS |||| (*1) WE |
|---|---|---|---|---|---|---|---|---|---|
| | CHARACTER CODE REGISTER 3320a | CHARACTER CODE REGISTER 3320b | FLAG REGISTER 3310a | FLAG REGISTER 3310b | CHARACTER CODE BUFFER 3350a | CHARACTER CODE BUFFER 3350b | FLAG BUFFER 3340a | FLAG BUFFER 3340b | |
| 1st STEP | H | — | 0 | 0 | | | | | 0 |
| 2nd STEP | G | H | 0 | 0 | | | | | 0 |
| 3rd STEP | I | S | 0 | 1 | | | | | 0 |
| 4th STEP | P | E | 0 | 0 | — | S | 0 | | 1 |
| 5th STEP | E | D | 0 | 0 | | | | | 0 |
| 6th STEP | ␣(SPACE) | S | 0 | 1 | | | | | 0 |
| 7th STEP | C | S | 0 | 1 | ␣(SPACE) | S | 0 | | 1 |
| 8th STEP | I | ␣(SPACE) | 1 | 1 | C | S | 0 | | 1 |
| 9th STEP | B | U | 0 | 1 | B | U | 1 | | 1 |
| 10th STEP | S | ␣(SPACE) | 0 | 1 | S | ␣(SPACE) | 1 | 1 | 1 |
| 11th STEP | C | O | 0 | 0 | | | | 0 | 1 |
| 12th STEP | N | T | 0 | 0 | | | | | 0 |
| 13th STEP | R | O | 0 | 0 | | | | | 0 |
| 14th STEP | L | L | 0 | 0 | | | | | 0 |
| 15th STEP | E | R | 0 | 0 | | | | | 0 |

(*1) WE : WRITE ENABLE SIGNAL FOR CHARACTER CODE BUFFER AND FLAG BUFFER

FIG. 38

| NUMBER OF STEPS | INPUT TO CHARACTER CODE SELECTOR | | INPUT TO FILTERING CONTROL DECODER | | | INPUT OF FILTERING CONTROL DECODER | INPUT OF FILTERING DECODER | | OUTPUT OF CHARACTER CODE SELECTOR |
|---|---|---|---|---|---|---|---|---|---|
| | CHARACTER CODE BUFFER 3350a | CHARACTER CODE BUFFER 3350b | TWO-CHARACTER PASS FLAG IN PRECEDING STEP | FLAG BUFFER 3340a | FLAG BUFFER 3340b | TWO-CHARACTER PASS FLAG | CHARACTER CODE SELECTOR SELECT SIGNAL | CHARACTER CODE BUFFER READ ENABLE SIGNAL | |
| 1st STEP | — | S | ○ | ○ | — | ○ | — | — | S |
| 2nd STEP | ␣(SPACE) | S | ○ | ○ | — | ○ | — | — | S |
| 3rd STEP | C | S | ○ | ○ | — | ○ | — | — | S |
| 4th STEP | B | U | ○ | — | — | — | ○ | ○ | B |
| 5th STEP | (B) | (U) | — | (1) | (1) | ○ | — | — | U |
| 6th STEP | S | ␣(SPACE) | ○ | — | ○ | ○ | ○ | — | S |

METHOD FOR CHARACTER STRING COLLATION WITH FILTERING FUNCTION AND APPARATUS

CROSS-REFERENCE TO RELATED APPLICATION

This application is a continuation-in-part of copending application Ser. No. 07/985,795, filed Nov. 30, 1992 which is a divisional Application of Ser. No. 07/555,483 filed Jun. 14, 1990 now U.S. Pat. No. 5,168,533.

BACKGROUND OF THE INVENTION

The present invention relates to an information processing system and more particularly to a search term matching method and apparatus in a text search system and is concerned with a search which is effected by deciding en bloc whether or not a plurality of character substrings designated as a search term exist in a test character string.

The invention can be utilized for the search in a database, a document filing system and a word processor or the like.

In the field of the information processing systems, it is one of the important processings to search all documents which contain a particular word, i.e., a character string desired by a searcher (hereinafter referred to as the search term) from a document constituted by a set of character string data (hereinafter referred to as the text).

There are proposed several text search apparatuses for realizing such search systems. Of these proposed ones, a structure of a typical character string retrieval system is shown in FIG. 1 and will be described below (refer to L. A. Hollaar: "Text Retrieval Computers", COMPUTER, March 1979).

In the character retrieval system 1, a retrieval control means 101 is in charge of overall control of the whole retrieval system and communication with a host computer. More specifically, the retrieval control means accepts a search query 201 issued from the host computer, analyzes it and sends the results thereof as retrieval control information 202 to a character string matching means 102 and a complex or compound condition decision means 103. Further, the retrieval control means 101 controls a storage unit control means 104 for reading out character string data 204 from a character string storage means 105 into the character string matching means 102.

The character string matching means 102 checks the input character string data 204 as to whether or not a character string satisfying the search query 201, i.e., the search term, exists in the input character string data and, if it exists, outputs information 205 identifying the character string to the compound condition decision means 103. On the basis of character string identifying information 205, the compound condition decision means 103 verifies whether or not logical condition such as "AND" or "OR" condition specified in the search query 201 is satisfied. When the compound condition as designated is met, the identification information of a relevant document and text data representing the contents of the document are sent back to the host computer as a retrieval result 206.

As a character string matching scheme adopted in the character string matching means 102 which is vital to the character string retrieval system 1, there is known a method of searching a plurality of character strings through a single text scanning by using a finite automaton. As hardware for executing the finite automaton at a high speed, there may be mentioned those described in Japanese Unexamined Patent Application Publications Nos. 105040/1985 and 95672/1991.

However, attempt for realizing a high-speed character string matching means by employing these known techniques encounters problems, which will be discussed below.

The character string matching means proposed in Japanese Unexamined Patent Application Publication No. 105040/1985 is shown in FIG. 2. This character string matching means is designed for performing the matching for a text in which character codes such as Chinese characters each constituted by two bytes are used. The matching operation executed by this character string matching means 102 will briefly be elucidated below.

The character string matching means 102 is composed of a data register 20, a change-over circuit 21, an address register 7, an address decoder 9, a random access memory 8, a memory register 10 and a control circuit 22.

As the initialization, an initial state number "0" (zero) is set at the more significant byte of the address register 7. Further, a state transition table is set in the random access memory 8. For this reason, the random access memory 8 may herein be referred to as the state transition table.

The matching operation is started by fetching two bytes, i.e., character codes corresponding to one character into the data register 20 from the input text 204. The character codes of two bytes as fetched are divided into single-byte codes in the order of the more significant byte and the less significant byte by the selector 21 to be stored in the address register at the less significant byte position thereof.

Assuming now that the more significant byte is selected by the selector 21 and stored in the address register at the less significant byte position thereof, the value stored in the address register 7, inclusive of the more significant bytes, is sent to the state transition table 8 as the address for reference via the address decoder 9. From the state transition table 8, the (ID) number of destination state for transition is read out in correspondence to the above-mentioned address for reference and held in the memory register. This state number is outputted to the control circuit 22 in order to decide whether or not the state contains the result of the matching. When it is decided that the result of the matching is stored, a matching result (ID) number is outputted as a matching result 205.

Subsequently, the state number is stored in the address register 7 at the more significant byte. Next, the less significant byte of the data register 20 is selected by the selector 21 to be stored in the address register at the less significant byte position thereof. In succession, operation similar to that described above is repeated to carry out the character string matching.

As will be appreciated from the above, this character string matching means 102 is designed to perform the matching processing by decomposing the character code consisting of two bytes into two discrete bytes and transmitting them through the automaton. Thus, the state transition table 8 is referenced twice for a single character. As a consequence, about twice as long as the access cycle for the memory constituting the state transition table 8 is required for the matching of a single character, although the memory capacity for the state transition table 8 can considerably be reduced. Accordingly, search of a text composed of character codes each consisting of two bytes will reduce the matching throughput of the character string matching circuit 102 by a half when compared with the search of a text composed of character codes each composed of one byte, thus giving rise to a problem.

Next, problems from which the system described in Japanese Unexamined Patent Application Publication No. 98672/9991 suffers will be analyzed. In the case of the this system, the input character for which the matching is to be carried out in a given state of the automaton is represented by placing a mark termed the token. More specifically, every time one character is inputted from an input text, reference is made to the state for which the token is placed. Besides, the token is necessarily generated in the initial state every time an input character code is fetched. The matching operation is effectuated by referencing a state transition table by using as the address therefore the ID number of the state at which the token has been placed together with the input character code. Consequently, when a plurality of tokens exist in the automaton of concern, the state transition table is referenced a corresponding number of times for one character as inputted. As a result of this, the matching throughput is lowered by one severalth.

Concerning the matching operation in the case where a plurality of tokens are involved in the matching processing for one character, description will be made below by referring to an automaton shown in FIG. 3. This automaton is designed for matching en bloc for "イッシ, ジエー, ズ" as well as spelling variants thereof "イッシ, - ジエ, - ズ6", "イッシ7, - ジエ, - ズ", "イッシ, - ジエ, イズ", "イッシ, - ジエ, - ズ", "イッシ, - ジエ, - ズ", "イッシ, - ジエ, イズ", "イッシ, ジエ-, ズ" and "イッシ, ジエ イ, ズ".

Upon inputting of "イッシ, ジエ-, ズ" as the input text, the token makes transition in a manner illustrated in FIG. 4. At first, when "イ" is inputted, a token 1 is newly generated from the state "0" which is the initial state. Since the transition due to "イ" is described in the state "0" (refer to FIG. 3), the matching is validated, whereby the token 1 is caused to make transition to the state "1".

Upon succeeding input of "ッ", a token 2 is newly generated in the state "0". However, since no description concerning the transition due to "ッ" is found in this state, the matching is invalidated, resulting in that the token 2 makes disappearance. Further, the token 1 moved to the state "1" is caused to make transition to the state "2" because the matching with "ッ" is validated in the state "1". It is thus apparent that the matching operation is performed twice for one character in this case.

Similarly, upon input of "シ", "ジ" and "エ", the token 1 makes transitions successively to the states "3", "5" and "6" in this order. In the meanwhile, tokens 3 to 5 are generated as well. However, they make disappearance because the matching are not validated.

In this manner, similar processing is performed for "イ" and "ズ" inputted in succession.

In the course of matching operation described above, the matching takes place fourteen times in response to the input of the text of seven characters.

A hitherto known character string matching means 102 designed for carrying out the character string matching processing described above is shown in FIG. 5. This character string matching means 102 is comprised of registers 211, 250 and 251, a state transition table 220, a matching result table 260, a selector 261, a gate 262, a multiplexer 263, buffers 280 and 281 and a comparator 252.

Now, matching operation of this character string matching means 102 will briefly be described.

An input text 204 is stored in the register 211 on a one-by-one character basis. A character code outputted from the register 211 is inputted to the state transition table 220 as the address information. The state transition table 220 is referenced by using the current state number 306 and the character code 302 as the address, whereby an ID number 303 of the transition-destined state to which transitions to be next made (hereinafter referred to as the succeeding state number) is outputted from the table.

In this character string matching means, the succeeding state number 303 is used as a token identifier. The succeeding state number 303 serving as the token identifier is stored in the buffer 260 or 281 via the gate 262 and the multiplexer 263, as the information indicating the position at which the token is present. When the succeeding state number outputted from the state transition table 220 is "0" (zero), i.e., when the initial state number exists, this means that there is no destination to which the token can be moved. Consequently, when the succeeding state number 303 is the initial state number "0", it is necessary to extinguish the token. The control to this end is performed through cooperation of the comparator 252 and the gate 262.

After having been stored in the register 250, the succeeding state number 303 is stored selectively in one of the buffers 280 and 281 via the gate 262 and the multiplexer 263. At that time, the token can be extinguished by controlling the gate 262. In this conjunction, decision as to whether or not the token is to be extinguished is made by the comparator 252.

More specifically, when the succeeding state number 303 is the initial state number "0" (zero), comparison with the state number "0" (initial state number) stored in the register 251 as performed by the comparator 252 results in equality. As a result of this, the gate 262 is closed, whereby the succeeding state number 303 is extinguished without being sent to the multiplexer 263. In contrast, unless the succeeding state number 303 is the initial state number "0" (zero), the succeeding state number 303 is sent out to the multiplexer 263 through the gate 262 to be thereby retained as the token.

There are stored in the buffer 280 and 281 at the start address thereof the initial state number as the initial value to thereby allow the succeeding state number 303 sent through the multiplexer 263 to be stored at the address succeeding to the initial state. In this manner, it is possible to make available the token without fail in the initial state.

The succeeding state number 303 is stored in either one of the buffer 280 or 281 to be read out therefrom as a current state number 305 for the succeeding character code matching.

In the selector 261, the buffer 280 or 281 in which the token, i.e., the succeeding state number 303, has been stored is selected, whereon the current state number 305 is sequentially read out from the buffer selected. Upon completion of the reading, a read end signal 307 is generated. There is established synchronism between the multiplexer 263 and the selector 261 such that the selector 261 selects the buffer 281 when the multiplexer 263 selects the buffer 280. On the other hand, when the buffer 281 is selected by the multiplexer 263, the buffer 280 is selected by the selector 261. In this manner, the token to be moved to the transition-destined state is stored as the succeeding state number 303 in the buffer which differs from the buffer in which the token in the transition-source state is stored (stored as the current state number).

Change-over between the buffers 280 and 281 is effected at a time point when the read operation from the buffer 280 or 281 selected by the selector 261 has been completed, i.e., at the timing at which the read end signal 307 is generated. Ordinarily, a character code is fetched from the text into the register 211 in synchronism with the register 250. The register 211 holds the character code until the read end signal 307 is generated and waits for the succeeding input until the tokens of the transition destinations, i.e., the current state numbers have been read out completely from the buffer. There is stored in the matching result table 260 a predetermined search term number identifying the search term in correspondence to the state where the search term terminates(hereinafter referred to as the termination state), while "0" (zero) is stored in the table 260 in the other states. Thus, the matching result 205 becomes meaningful only when the search term number outputted from the matching result table 260 in correspondence to the state number is other than "0".

A series of operations described above are repeated for each of the characters constituting the input text to thereby realize the character string matching processing.

As is appreciated from the foregoing, the state transition table is referenced once for the matching of one token according to the known technique. Accordingly, in the case of the exemplary operation illustrated in FIG. 4, the token matching is performed fourteen times for the input text composed of seven characters. In other words, the state transition table is referenced twice for one character on an average. Consequently, the matching throughput becomes lowered about a half when compared with the processing which can afford a single matching for one character, giving rise to a problem.

In the case of the two known techniques described above, it is required to make reference to the state transition table a number of times for the matching processing for a single character text. As a consequence, the matching processing cycle increases several times as long as the cycle time of the memory used as the state transition table. Thus, in order to implement the character string matching means of a high speed on the order of several ten megabytes per second, there is required the matching cycle on the order of several ten nanoseconds. This means that the inexpensive memory such as SRAM can no more be used but a high-speed memory such as DRAM must be employed. As an ultimate result, high costs will be involved in the implementation of the text search system, incurring a serious problem.

SUMMARY OF THE INVENTION

It is therefore an object of the present invention to make it possible to increase the matching throughput without need for resorting to the use of a high-speed memory for the state transition table and hence to provide high-speed text search method and system which can be implemented inexpensively.

For achieving the above object, there is provided according to an aspect of this invention a text search for deciding en bloc whether or not a plurality of search terms as designated exist in a text composed of characters given in the form of character codes, which system comprises character string storage means for storing a text, a filtering means for fetching character codes on a one-by-one character basis from a text read out from the character string storage means to thereby make decision as to whether or not the character code is included in the above-mentioned search terms and output only the character Codes included in the search terms, and a character string matching means for deciding by matching en bloc whether or not a plurality of search terms exist in a string of character codes outputted from the above-mentioned filtering means.

This aspect of the invention will be described below. The filtering means serves to extract only the characters designated in the search terms read out from the character string and output the extracted characters to the character string matching means. By virtue of this feature, the number of the characters inputted to the character string matching means can remarkably be decreased. Thus, the character string matching means can perform the matching in conformance with the processing throughput of the filtering means even when the matching speed of the character string matching means is low because the number of characters subjected to the matching processing is decreased. To say in another way, even when the character string matching means of a low matching speed is employed, the searching speed of the text search system can be protected against degradation.

The principle of the invention will be described below in conjunction with an example.

Assuming, by way of example, that "CMOS" is designated as a search term, there are registered "C", "M", "O" and "S" in the filtering means. In this connection, consideration will be made on the assumption that "HIGH-SPEED CMOS DATA BOOK" is fetched as a text from the character string storage means.

Every time one character is inputted from the text, the filtering means makes decision as to whether or not the character is included in the search terms and sends out only the character included in the search terms to the character string matching means.

In more concrete, upon inputting of a first character "H" of the text, this character is not delivered to the character string matching means because it is not the character code designated in the search term. Similarly, "I", "G", "H" and "-" are not sent out to the character string matching means, since they are not included in the search term. The succeeding character "S" which is included in the search term is sent out. The succeeding " " (space) is discarded, while succeeding character codes "C", "M", "O" and "S" are delivered to the character string matching means because they are included in the search term. Subsequently, "D", "A", "T", "A", " " (space) and "B" are not outputted, while the succeeding character codes "O" and "O" are outputted. The last character code "K" is inhibited from being outputted.

As a result of the filtering processing described above, only the character string "SCMOSOO" constituted by the characters included in the search term is delivered to the character string matching means.

In this manner, the text of twenty-five characters "HIGH-SPEED CMOS DATA BOOK" is filtered out to be a text of seven characters "SCMOSOO".

Thus, when compared with the case where filtering means is not adopted, the burden imposed to the character string matching means can be mitigated by a factor of $7/25$, i.e., about $1/4$. This means that the matching throughput is enhanced about four times in appearance. In other words, even when an inexpensive memory which requires four times as long an access time is used, the retrieval speed of the character string retrieval system is protected against degradation, whereby the text search system of a low cost can be provided.

Next, description will turn to another aspect of the present invention.

According to this aspect of the invention, there is provided a text search system for deciding en bloc whether or not a plurality of search terms as designated exist in a text composed of characters expressed in the form of character codes, which system comprises a character string storage means for storing a text, a filtering means for fetching character codes sequentially on a one-by-one character basis from a text read out from the character string storage means to thereby make decision as to whether or not a character string composed of two concatenate character codes, i.e., a character code as fetched and a character code fetched immediately before, is included in the search terms and output the concatenate character codes only when they are included in the search terms, and a character string matching, means for deciding by matching en bloc whether or not a plurality of search terms exist in a string of the character codes outputted from the filtering means.

The concept underlying this aspect of the invention will be elucidated below. The filtering means serves to fetch character codes on a one-by-one character code basis from a text read out from the character string storage means and decide whether or not a string of two concatenate characters composed of the character as fetched and a character fetched immediately before is included in the above-mentioned search terms, to thereby output the concatenate character string to the character string matching means only when the string of the concatenate characters is included in the search terms. More concretely, decision is made as to whether or not a string of two concatenate characters fetched currently and immediately before, respectively, is included in the search terms every time one character is fetched from the text, whereon the immediately preceding character is outputted only when the string of the two concatenate characters mentioned above is included in the search term, while the immediately preceding character is unconditionally outputted to the character string matching means in a succeeding character processing. Through the control performed in this manner, the string of concatenate characters included in the search term can be delivered to the character string matching means without fail.

By virtue of the filtering means described above, the number of characters inputted to the character string matching means can remarkably be decreased. Thus, the character string matching means of a low matching speed can perform the matching operation in conformance with the processing throughput of the filtering means, because the number of the character codes to be subjected to the matching processing is decreased. To say in another way, the search speed of the text search system can be protected against degradation even when a low-speed character string matching means is employed. As a result of this, the state transition table can be implemented by using an inexpensive memory such as a DRAM, whereby a high-speed text search system can be provided at a low cost.

In the following, the concept underlying the above-mentioned aspect of the invention will be elucidated in concrete in conjunction with an example.

Assuming, by way of example, that "SEAT" is designated as a search term and "SEAT RESERVATION SYSTEM" is fetched as an input text.

In the first place, a first character "S" of the text is fetched. Since there is no character code fetched immediately before in this case, this code is represented by a particular code "/" which is not used in the text. Accordingly, "/S" is checked whether it is included in the search term as a string of concatenate characters. Obviously, these character codes are not specified in the search term. Accordingly, "/" fetched immediately before is not outputted to the character string matching means 102.

Next, when "E" is inputted, it is checked whether or not a combination of "E" with the immediately preceding character, i.e., "SE", is included in the search term "SEAT". In this case, the immediately preceding character "S" is outputted to the character string matching means 102, because the concatenate character string "SE" is included in the search term. Thus, "E" is outputted unconditionally to the character string matching means 102 as the immediately preceding character in this character processing.

Similarly, upon fetching of "A", the character "E" fetched immediately before is unconditionally outputted to the character string matching means 102, whereon it is checked whether or not "EA" is included in the search term "SEAT". This concatenate character string "EA" is included in the search term as well. Consequently, "A" is unconditionally outputted to the character string matching means 102 as the immediately preceding character in the succeeding character processing.

Upon "T" being fetched in succession, the immediately preceding character "A" is unconditionally outputted, whereon the concatenate character string "AT" is checked whether it is included in the search term. Since it is included in the search term, the immediately preceding character is outputted unconditionally in the succeeding character processing.

Further, when " " (space) is fetched, the immediately preceding Character "T" is outputted, and it is checked whether the concatenate character string "T" is included in the search term. It is apparent that the concatenate character string "T" is not included in the search term. Accordingly, unconditional outputting of the immediately preceding character is inhibited, starting from the next character processing, until the decision becomes valid.

Similarly, "R", "E" and "S" are inputted, whereby corresponding concatenate character strings "R", "RE" and "ES" are checked. However, since all of them are not included in the search term, none is delivered to the character string matching means 102.

In response to the input of "E", the immediately preceding character "S" is outputted to the character string matching means 102 because the concatenate character string "SE" is included in the search term "SEAT".

As a consequence, in response to the input of the character code "R", the immediately preceding character "E" is unconditionally outputted to the character string matching means 102. However, since the decision is not validated at this time point, the immediately preceding character is prevented from being outputted from the succeeding character processing, until the decision becomes valid again.

Subsequently, "V" and "A" are inputted. However, they are not included in the search term. Consequently, none is outputted to the character string matching means 102.

Next, in response to the input of "T", the immediately preceding character "A" is outputted to the character string matching means 102 because "AT" is included in the search term.

Thus, when the succeeding "I" is fetched, the immediately preceding character "T" immediately preceding is outputted to the character string matching means 102. However, since the decision is not validated at this time point, no output is unconditionally delivered from the next character processing until the decision is validated.

For subsequent inputs of "I", "O", "N", " " (space), "S",

"Y", "S", "T", "E" and "M", they are discarded because the concatenate character strings thereof are not included in the search term.

As a result of the filtering processing in this manner, only a character string "SEATSEAT" consisting of character substrings each of two characters included in the search term is outputted.

In other words, the text of twenty-three characters "SEAT RESERVATION SYSTEM" is screened out to a text of eight characters "SEATSEAT". As a result of this, the burden imposed on the character string matching means is reduced by 8/23 or about by 1/3 when compared with the case where the filtering means is not employed. Consequently, the matching throughput is enhanced by a factor of about three, which in turn means that an inexpensive text search system can be provided in which an inexpensive memory whose access time is three times as low can be used without lowering the search speed of the text search system.

According to a further aspect or object of the present invention, it is contemplate to enhance the throughput of the filtering processing by operating a plurality of filtering means in parallel while avoiding a bottleneck of the filtering processing and ensuring the performance of the character string matching means to a possible maximum, i.e., to increase the search throughput of the text search method and system to a maximum limit.

The above objects can be achieved by providing a parallel filtering means mentioned below between a character string storage means and a character string matching means in a text search system for deciding en bloc whether or not a plurality of search terms as designated exist in a text composed of characters expressed in the form of codes.

The parallel filtering means is comprised of a distributing means for fetching a plurality of characters at one time from a text read out from the above-mentioned character storage means to thereby output divisionally the characters on a one-by-one character basis, a plurality of filtering means disposed in parallel with one another for fetching the character codes outputted from the above-mentioned distributing means and making decision as to whether or not the above-mentioned character codes are those included in the search terms, and collecting means for fetching the character codes outputted from the plurality of filtering means to thereby array the character codes and output them to the character string matching means.

This aspect of the invention will be elucidated below by reference to FIG. 28.

In the parallel filtering means 3000, the distributing means 3100 reads out a text from the character string storage means on a two-by-two character basis and sends the characters one by one to the filtering means 3200a and 3200b. In each of the filtering means 3200a and 3200b, decision is made for one input character as to whether or not it is included in the search terms. The result of decision is outputted to the collecting means 3300, which then arrays only the character codes that have been decided to be included in the search term as the result of the processings performed by the filtering means 3200a and 3200b, and the arrayed characters are then outputted to the character string matching means 102.

In this manner, the processing throughput of the filtering means can be enhanced twice as high in the equivalent sense, whereby a bottleneck otherwise presented by the filtering means can be evaded. As a result, the search throughput of the text search system can further be increased twice as high.

In the following-, the principle will be described by taking an example.

It is assumed, by way of example, that "BUS" is designated as the search term and that "HIGH-SPEED SCSI BUS CONTROLLER" is inputted as a text from the character string storage means.

The distributing means 3100 fetches first and second characters "HI" in a first step of operation and outputs the first character "H" to the filtering circuit 3200a while outputting the second character "I" to the filtering circuit 3200b. In the filtering circuits 3200a and 3200b, the input character codes "H" and "" are each affixed with a signal indicating that these character codes are not included in the search term and then sent to the collecting means 3300. The collecting means then performs the filtering processing en bloc on the character codes on the basis of the affixed information. More specifically, "H" and "I" are deleted and prevented from being sent to the character string matching means 102. The two concatenate characters "GH" as inputted are not sent to the character string matching means 102 either. Further, when two concatenate characters "-S" are inputted to the distributing means 3200, "-" is outputted to the filtering circuit 3200a while "S" is outputted to the filtering circuit 3200b. In the filtering circuit 3200a, the input character code "-" is affixed with a signal indicating that the character code "-" is not included in the search term and then sent out to the collecting means 3000. On the other hand, in the filtering circuit 3200b, the character code "S" is affixed with a signal indicating that it is included in the search term and then sent out to the collecting means 3300, which then performs the filtering processing en bloc on the basis of the affixed information, whereby "S" is delivered to the character string matching means 102.

In succession, two concatenate characters "PE" are inputted. Since these character codes are not included in the search term, they are not delivered to the character string matching means.

Subsequently, "ED", "S" , "CS", "I", "BU", "S" , "OO", "NT", "RO", "LL" and "ER" are successively input ted, and "S", "S", "BU" and "S" which are included in , the search term are outputted.

As will now be appreciated, as the result of the filtering processing described above, a character string "SSSBUS" consisting only of the characters included in the search term is delivered to the character string matching means as a result of fifteen filtering steps performed on the text of thirty characters "HIGH-SPEED SCSI BUS CONTROLLER".

In this manner, the thirty-character text "HIGH-SPEED SCSI BUS CONTROLLER" is filtered out to be the six-character text "SSSBUS" through fifteen filtering steps. The time required for the filtering operation is 50 nanoseconds/filtering step×15 steps=750 nanoseconds.

Further, since eight steps of character string matching processings are required for the matching of the six characters "SSSBUS", the processing time taken by the character string matching means is 100 nanoseconds/matching step×8 steps=800 nanoseconds.

Thus, the matching for the text of thirty characters "HIGH-SPEED SCSI BUS CONTROLLER" can be accomplished within 800 nanoseconds.

Parenthetically, in the case where a single filtering mans is provided, the text of thirty characters "HIGH-SPEED SCSI BUS CONTROLLER" can be reduced to six characters "SSSBUS" by the filtering means. In this filtering processing, the filtering table must be referenced once for each character of the input character codes. Thus, for filtering the text of thirty characters "HIGH SPEED SCSI BUS CONTROLLER", the filtering table reference processing will have to be performed thirty times. As a result, the processing time taken by the filtering means amounts to 50 nanoseconds/filtering step×30 steps=1500 nanoseconds.

It is thus apparent that the filtering processing which requires 1500 nanoseconds with the single filtering means can be realized within 750 nanoseconds. Consequently, the search time of 1500 nanoseconds taken in the text search system known heretofore can be reduced to 800 nanoseconds. In this manner, it is possible to prevent the filtering processing from becoming a bottleneck and increase the search throughput of the text search system about twice in the equivalent sense.

BRIEF DESCRIPTION OF THE DRAWINGS

FIG. 4 is a diagram for illustrating a token control method known heretofore.

FIG. 8 is a view illustrating a single filtering table.

FIG. 10 is a diagram showing another exemplary structure of filtering means.

FIG. 13 is a view illustrating a filtering table used in the filtering means shown in FIG. 12.

FIG. 17 is a view showing a concatenate filtering table corresponding to the structure shown in FIG. 16.

FIG. 19 is a diagram showing a modified structure of the filtering table shown in FIG. 17.

FIG. 24 is a view showing a structure of a filtering table corresponding to FIG. 23.

FIG. 30 is a view for illustrating operation of the distributing means shown in FIG. 29.

FIG. 32 is a view showing a structure of a filtering table.

FIG. 33 is a view for illustrating operation of the filtering means.

FIG. 34 is a block diagram showing a structure of a collecting means.

FIG. 35 is a block diagram showing a structure of a filtering control circuit.

FIG. 36 is a view for illustrating input/output relations in a filtering input/output decoder.

FIG. 37 is a view for illustrating operations of a character code register, a flag register, a character code buffer and a flag buffer.

FIG. 38 is a view for illustrating operations of a filtering control circuit and a character code selector.

DESCRIPTION OF THE PREFERRED EMBODIMENTS

Figure 1:
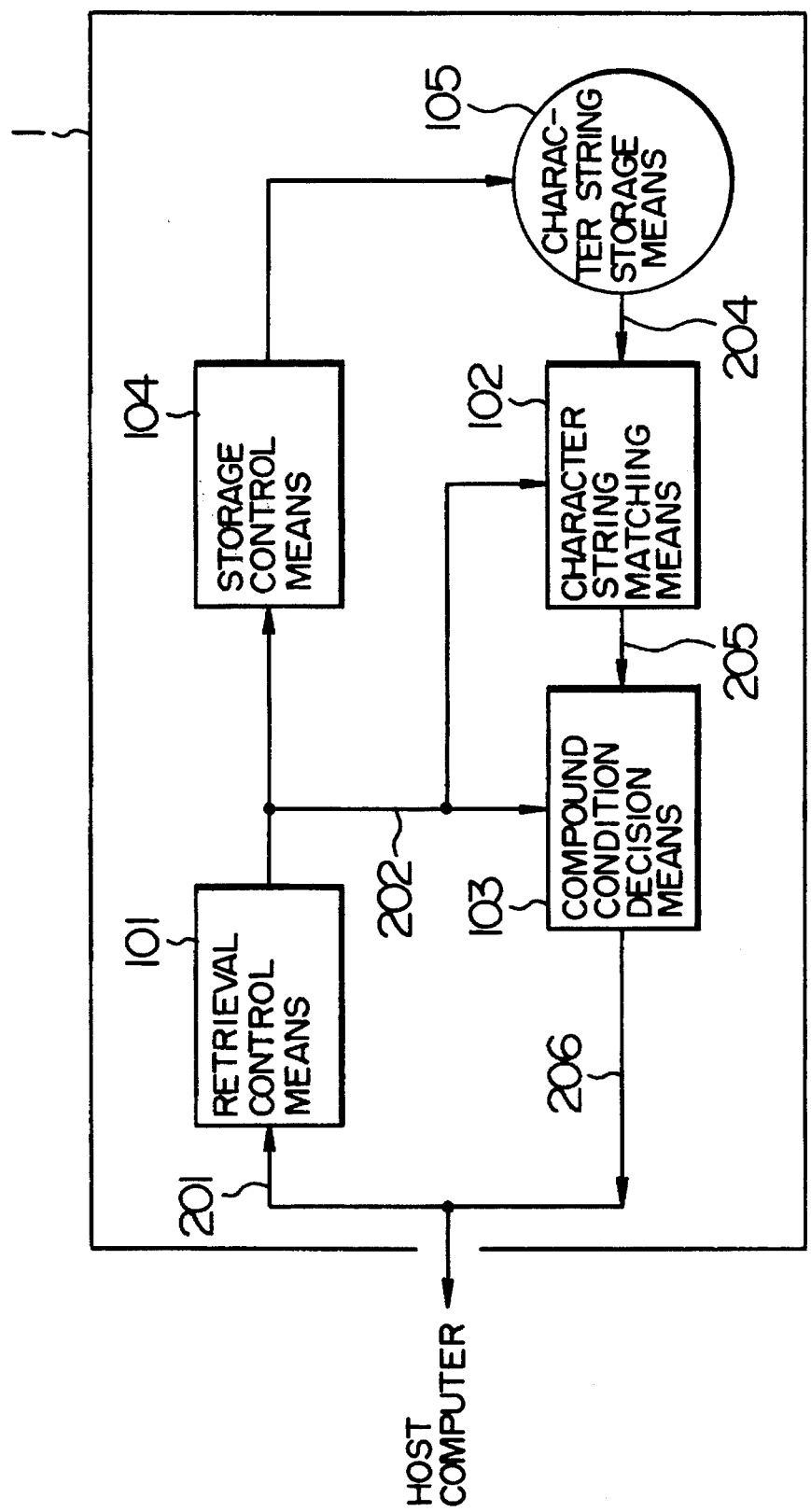
FIG. 1 is a diagram showing a structure of a character string retrieval system according to a technique known heretofore.
Figure 2:
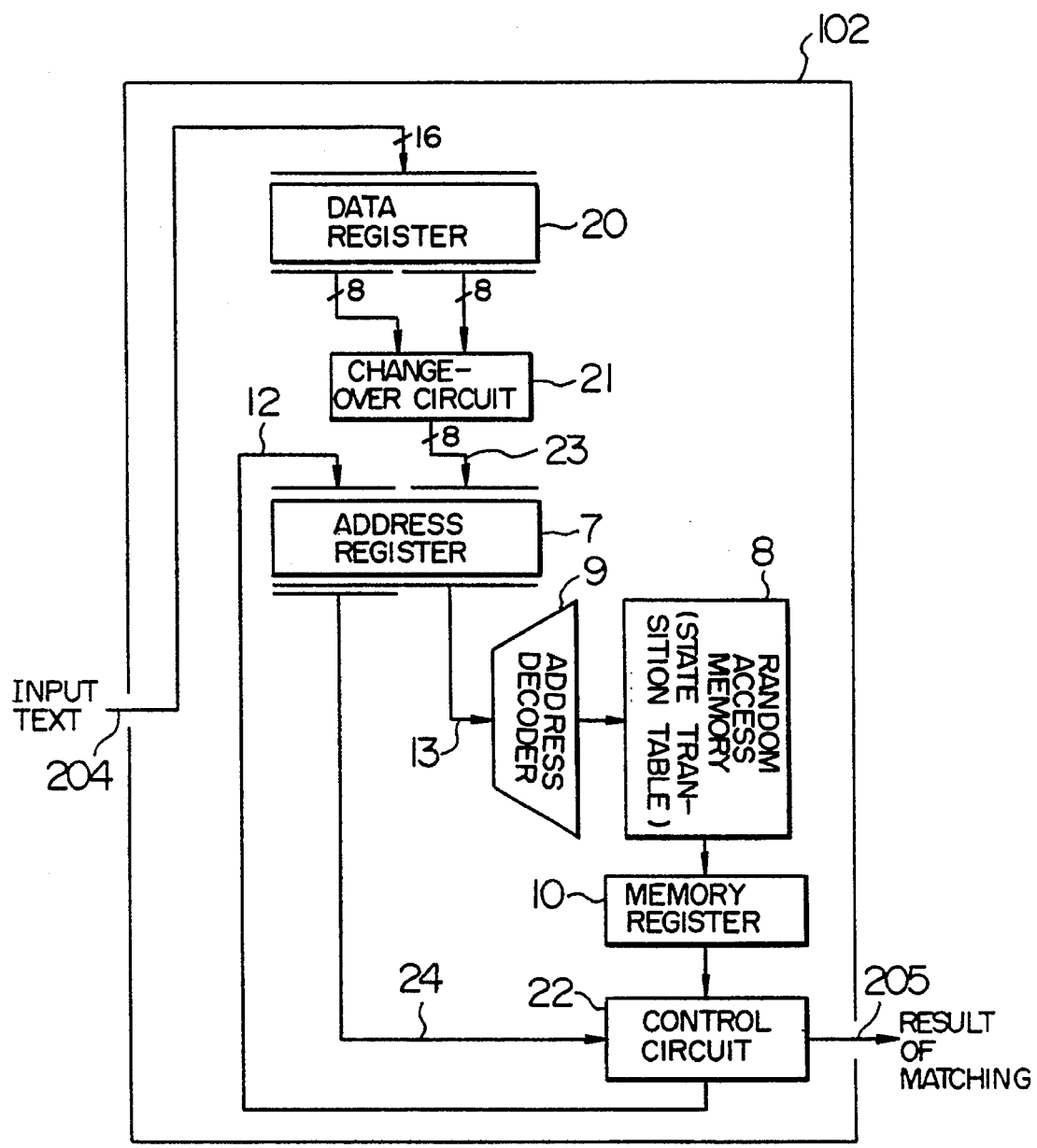
FIG. 2 is a diagram showing a structure of a character string matching means according to a technique known heretofore.
Figure 3:
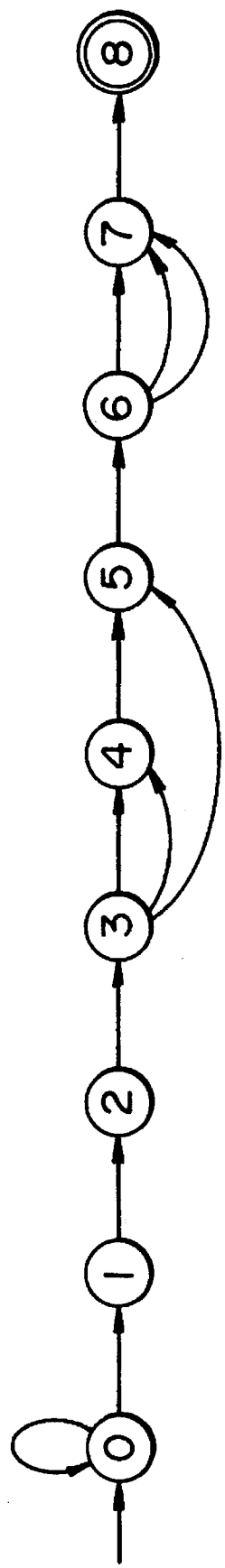
FIG. 3 is an automaton state transition diagram in a system known heretofore.
Figure 5:
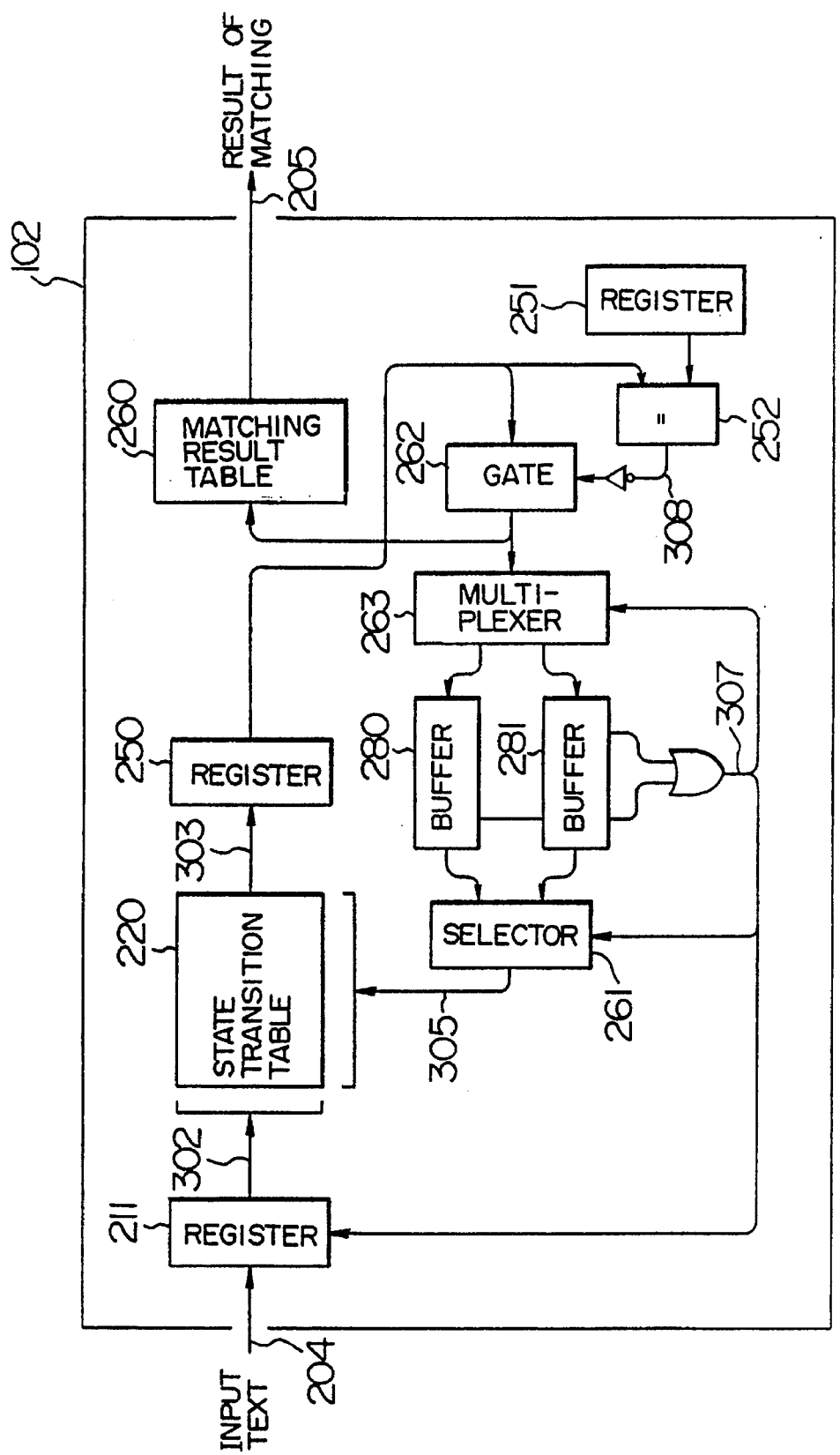
FIG. 5 is a diagram showing a structure of a character string retrieval system according to a technique known heretofore.
Figure 6:
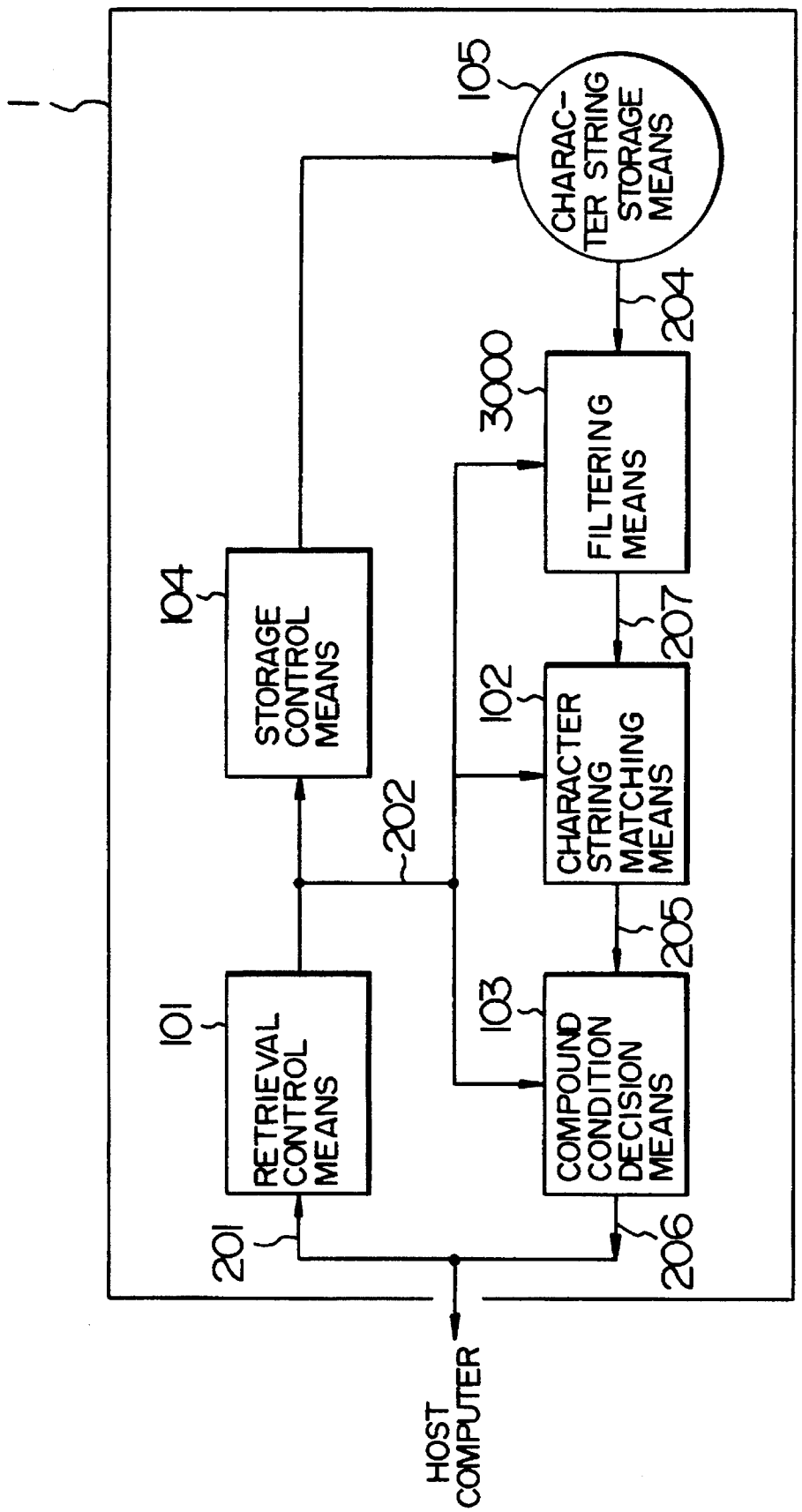
FIG. 6 is a diagram showing a structure of a text search system according to an embodiment of the present invention.

In the following, by reference to FIG. 6, description will be made of a first embodiment to which the principle of the present invention is applied. According to the instant embodiment, a filtering means 3000 is provided between a character string storage means 105 and a character string matching means 102 in a character string retrieval system 1 known heretofore for discarding those character codes which are not contained in a search term so that only the character codes included in the search term are sent to the character string matching means 102, for the purpose of sparing useless matching processing in the character string matching means 102 and thereby enhancing the matching throughput in the equivalent sense. In other words, it is contemplated as the object of the instant embodiment to provide a character string retrieval system of low costs while preventing a retrieving speed of the character string retrieval system from being lowered even in the case where the character string matching means 102 is used which is implemented by using a low-speed memory.

Figure 7:
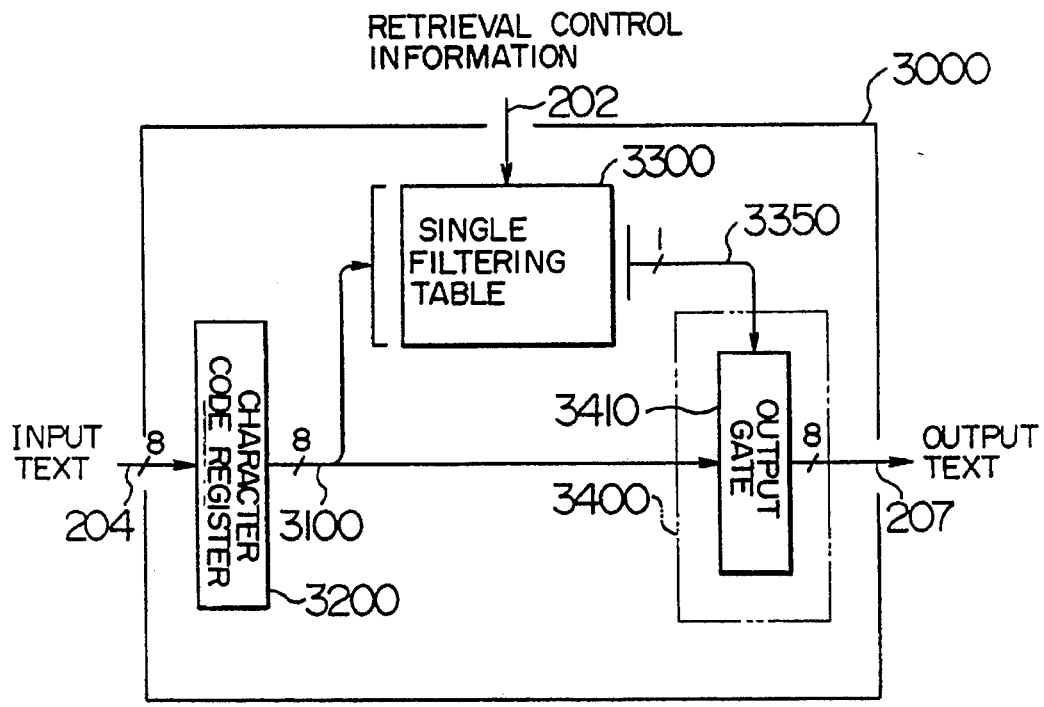
FIG. 7 is a diagram showing a structure of a filtering means.

An exemplary structure of the filtering means 3000 employed in the instant embodiment is shown in FIG. 7. The filtering means 3000 performs such filtering processing that upon every input of one character from a text, the filtering means 3000 compares that one character with a search term, makes decision as to whether or not a same character as the input one exists in the search term and outputs a character which is the same as that contained in the search term as a matched term to the character matching means 102, while outputs no character unless the same character exists in the search term. This filtering means is referred to as a single character filtering circuit because it performs the filtering processing on a single character basis.

The single character filtering circuit is comprised of a character code register 3200, a single filtering table 3300 and a single character output circuit 3400 constituted by an output gate 3410.

The single filtering table 3300 has such a structure as shown in FIG. 8 and is implemented by a one-dimensional memory which is accessed by using a character code as an address. In the table memory, there is stored "1" as a coincidence flag in correspondence to a character code included in a search term. Writing to the single filtering table 3300 is effected by a search control means 101 by using search control information 202 on the basis of a search term "CMOS" as designated.

Operation of the single filtering circuit shown in the figure will be described briefly.

At first, as the initialization, "1" is set in each of slots of the single filtering table 3300 which correspond to character codes contained in the search term while "0" being set to the other slots, respectively.

Assuming, by way of example, that "CMOS" is given as a search term, contents such as illustrated in FIG. 8 are set in the single filtering table 3300. In other words, "1" is set in each of the slots which correspond to the character codes "C", "M", "O" and "S", respectively, which constitute "CMOS".

The filtering operation is started by fetching character codes on a character-by-character basis into the character code register 3200 from an input text 204.

The single filtering table 3300 is accessed by using a character code 3100 outputted from the character code register 3200 as an address for reference, whereby a single coincidence signal 3350 is read out. For a character code which constitutes a part of a search term, "1" is outputted as the single coincidence signal 3100. At this time point, the output gate 3410 is opened, whereby the character code 3100 is outputted onto an output line 207 to be sent to the character matching means 102 of a succeeding stage. For a character code which is not included in the search term, "0" is outputted as the single coincidence signal 3350. At this time point, the output gate is closed, as a result of which no character code 3100 is outputted onto the output line 207 and thus no character code is sent to the character string matching means 102 of the succeeding stage.

Figure 9:
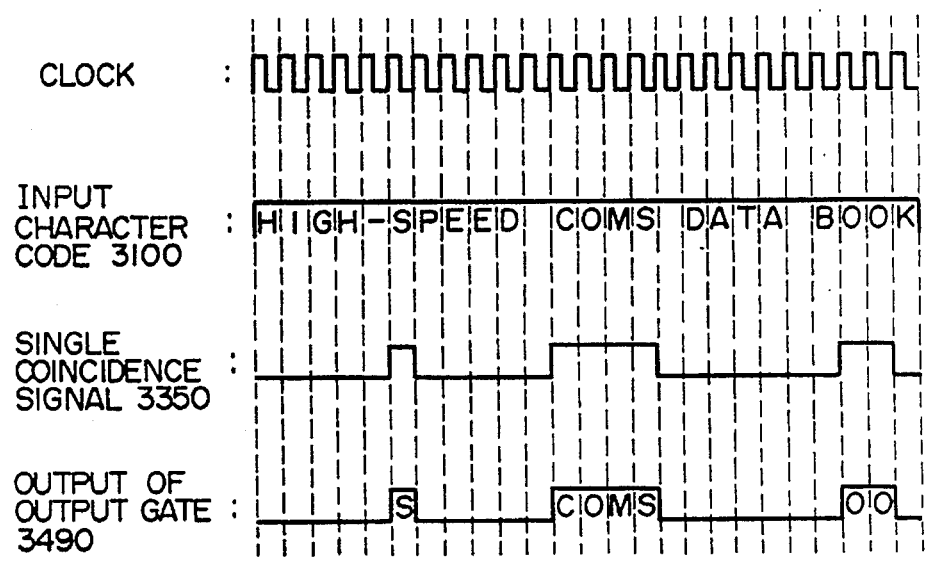
FIG. 9 is a timing chart for illustrating operation of the filtering means.

Assuming, by way of example, that "CMOS" is designated as a search term and "HIGH-SPEED CMOS DATA BOOK" is inputted as an input text, operation of the single filtering circuit will be described in concrete by reference to a timing chart shown in FIG. 9.

In the first place, "H" is fetched into the character code register 3200 from the input text 204 to be outputted therefrom as a character code 3100. As a consequence, the single filtering table 3300 is accessed with "H", whereby "0" is outputted as a value of the single coincidence signal 3350. Because the value of the single coincidence signal 3350 is "0", the character code "H" is not outputted from the output gate 3410.

The succeeding character "I", "G", "H" and "-" are similarly fetched into the character code register 3200. However, they are also inhibited from being outputted through the output gate 3410 because the single coincidence signal 3350 outputted from the single filtering table 3300 is "0".

When the succeeding character code "S" is fetched into the character code register 3200, the single coincidence signal 3350 outputted from the single filtering table 3300 assumes a value of "0", resulting in that "S" of the character code 3100 is outputted onto the output line 207 through the output gate 3410.

For the succeeding codes "P", "E", "E", "D" and " " (space), the single coincidence signal 3350 outputted from the single filtering table 3300 remains "0", whereby no character code is outputted onto the output line 207.

For the succeeding characters "C", "M", "O" and "S", the single coincidence signal 3350 assumes the value of "1", resulting in that "C", "M", "O" and "S" are outputted onto the output line 207 from the output gate.

For the subsequent codes " " (space), "D", "A", "T", "A", " " (space) and "B", the single coincidence signal 3350 delivered from the single filtering table 3300 again assumes the value of "0". Consequently, no code is outputted from the output gate 3410.

For the next characters "O" and "O", the single coincidence signal 3350 again assumes "1", whereby "O" and "O" are outputted from the output gate 3410.

Subsequently, for "K", the single coincidence signal 3350 again takes the value of "0". Thus, no code is outputted from the output gate 3410.

In this manner, seven characters "SCMOSOO" which are contained in the search term are extracted from the input text containing 25 characters "HIGH-SPEED CMOS DATA BOOK" to be outputted as an output text 207. As will now be appreciated, 18 out of 25 characters of the input text 204, i.e., about ¾ of the characters of the input text are discarded as the useless characters, which means that only about ¼ of the input characters are sent to the character string matching means 102. In this way, the character codes which are reduced from the input text by ¼ undergo the conventional processing in the character string matching means 102 and the compound condition decision means.

As is apparent from the foregoing, it is possible according to the instant embodiment to lower the processing speed of the character string matching means 102 to about ¼ of that of the filtering means 3000, which means that the memory used for a state transmission table in the character string matching means 102 can be implemented by an inexpensive memory whose access cycle may be about four times as low as that of a memory which will otherwise be required.

It will now be understood that according to the first embodiment of the present invention, the character string matching means 102 can be realized inexpensively simply by providing a small-scale filtering circuit, whereby a high-speed character string retrieval system can be provided at a low cost.

Next, description will turn to a second embodiment to which the principle of the present invention is applied.

With the instant embodiment, it is contemplated to prevent erroneous matching in the first embodiment.

In the case of the first embodiment, when "CMOS", for example, is designated as the search term with "HIGH-SPEED CMOS DATA BOOK" being inputted as the input text, "SCMOSOO" is outputted as the result of the filtering. In that case, there arises a problem that matching is performed by the character string matching means 102 for "SCMOS" which does not exist in the input text. For solving this problem, only when the characters existing in the search term make appearance in continuation in the text, the characters are outputted as they are, while upon occurrence of discontinuation, it becomes necessary to insert a delimiter mark (hereinafter referred to as delimiter) "/" at a place where the discontinuation takes place. To this end, the delimeter "/" corresponding to one character may be inserted when the output from the output gate 3410 is interrupted. Then, the output text will become "S/CMOS/00/", whereby erroneous matching of "SCMOS" is prohibited in the character string matching means 102.

A structure of the single filtering circuit incorporated in the filtering means 3000 according to the instant embodiment is shown in FIG. 10. This structure differs from that of the first embodiment only in respect to the single output circuit 3400.

The single output circuit 3400 according to the instant embodiment is comprised of a delimiter register 3430, a character code selector 3420, an output gate 3410, a flip-flop 3450 and an OR gate 3460.

In the character code selector 3420, an X-port is selected when the single coincidence signal 3350 is "1" while a Y-port is selected when the single coincidence signal is "0".

Figure 11:
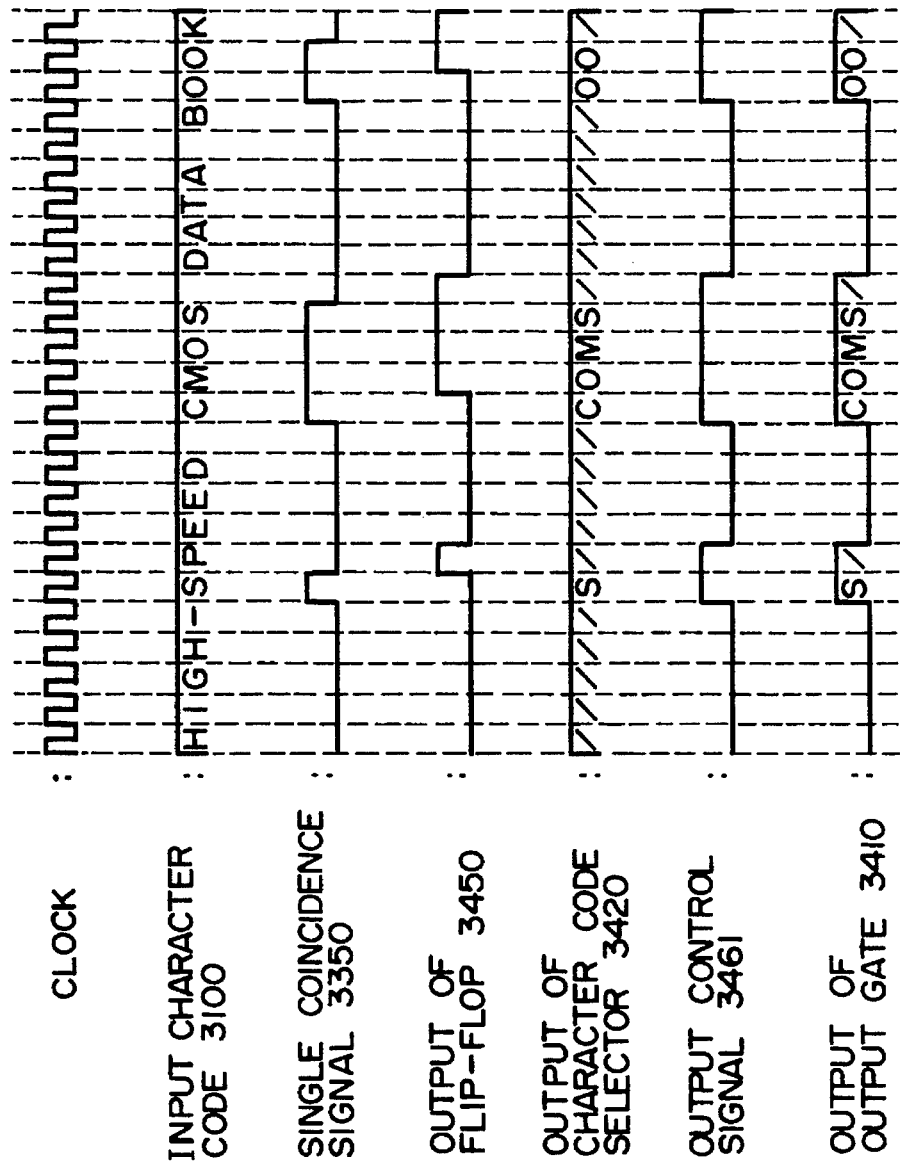
FIG. 11 is a timing chart for illustrating operation of the filtering means shown in FIG. 10.

Operation of the single filtering circuit 3000 will be elucidated by reference to a timing chart shown in FIG. 11 in conjunction with an exemplary case.

It is assumed, by way of example, that "CMOS" is designated as a search term and that the input text reads "HIGH-SPEED CMOS DATA BOOK".

As the initialization, a character code which is not used in the search term is set in the delimiter register 3430 on the basis of the retrieval control information 202. By way of example, a code "/" is set to this end. Further, "0" (zero) is set at the delay-type flip-flop 3450. In the single filtering table 3300, the single coincidence flag shown in FIG. 8 is set as with the case of the first embodiment.

At first "H" is fetched from the input text 204 to be placed in the character code register 3200 and at the same time the single filtering table 3300 is accessed with "H", whereby "0" is outputted as the value of the single coincidence signal 3350. Since the value of the flip-flop 3450 is also "0", an output control signal 3461 assumes "0". Accordingly, although the delimiter code "/" at the Y-port is selected in the character code selector 3420, no output of "H" can be delivered to the output line 207 through the output gate 3410.

Subsequent characters "I", "G", "H" and "-" are similarly fetched in the character code register 3200 in succession. However, no output is delivered from the output gate 3410 because the single coincidence signal 3350 outputted from the single filtering table 3300 is "0" and because the value set at the flip-flop 3450 is also "0".

When the succeeding character "S" is fetched in the character code register 3200, the single coincidence signal 3350 outputted from the single filtering table 3300 assumes a value of "1". As a result of this, the port X is selected in the character code selector 3420, whereby the character code 3100 "S" is sent out onto the output line 3480. The output gate 3410 is opened because the gate signal 3461 is "1", resulting in that "S" is outputted to the output line 207. Subsequently, the value of the single coincidence signal 3350, i.e., "1", is stored in the flip-flop 3450.

When the succeeding character "P" is fetched in the character code register 3200, the value for reference of the single filtering table becomes "0". As a result of this, the Y-gate is selected in the character code selector 3420, whereby the delimiter 3431 is outputted to the output gate 3410. At this time point, the value "1" of the preceding single coincidence signal 3350 has been placed in the flip-flop 3450. Accordingly, the output control signal 3461 assumes the value of "1". Thus, the delimiter 3431 is outputted onto the output line 207 from the output gate 3410. Thereafter, there is placed in the flip-flop 3450 the value of "0" as the reference output of the single filtering table 3300, i.e. as the value of the single coincidence signal 3350, whereby the flip-flop is reset to the initial value. Thus, the output gate is closed.

Further, for the succeeding codes "E", "E", "D" and " ", the single coincidence signal 3350 outputted from the single filtering table 3300 assumes "0", resulting in that no code is outputted onto the output line 207.

For the subsequent "C", "M", "O" and "S", the single coincidence signal 3350 assumes the value of "1". Consequently, the X-port is selected in the character code selector 3410, whereby the character code 3100 is outputted. Additionally, because the output gate 3410 is opened, the character codes "C", "M", "O" and "S" are outputted onto the output line 207.

When the subsequent code " " (space) is fetched in the character code register 3200, the value for reference in the single filtering table becomes "0". However, since the value held by the flip-flop 3450 is "1", the Y-gate is selected in the character code selector 3420. Thus, the delimiter 3431 is outputted onto the output line 207, as with the case of the processing for "P" described previously. Thereafter, "0" is stored in the flip-flop 3450, which thus resumes the initial value.

Furthermore, for the succeeding character codes "D", "A", "T ", "A", " " (space) and "B" the single coincidence signal 3350 delivered from the single filtering table 3300 again takes the value of "0". Accordingly, no character code is outputted through the output gate 3410.

For the succeeding characters "O" and "O", the single coincidence signal 3350 again assumes the value of "1". Consequently, "O" and "O" are sent out from the output gate 3410.

Thereafter, upon appearance of "K", the single coincidence signal 3350 assumes "0". However, since the value held in the flip-flop 3450 is "0", the delimiter 3431 is outputted onto the output line 207 similarly to the case of processing for "P" described previously.

As is apparent from the above description, the input text of 25 characters "HIGH-SPEED CMOS DATA BOOK" undergoes filtering to be screened out as a string of 10 characters "S/CMOS/OO". Thus, the matching processing can be performed without incurring erroneous matching even when"SCMOS" is designated as the search term.

It will now be understood that according to the instant embodiment, the filtering which precludes erroneous matching can be realized simply by adding a small quantity of circuit hardware to the first embodiment, whereby the character string matching means 102 can be implemented by using a memory of low price. Thus, there can be provided a high-speed character string retrieval system at a low cost.

Next, a third embodiment incarnating the principle of the present invention will be described.

With the instant embodiment, it is contemplated to provide a filtering means which can ensure a filtering function enhanced higher than that of the second embodiment owing to such arrangement that no character coincidence output is produced even upon coincidence between the other character than the leading one constituting a search term and an input text until the leading character of the search term make appearance.

It should be recalled that in the case of the second embodiment, when "CMOS" is designated as the search term with an input text "HIGH-SPEED CMOS DATA BOOK" being inputted, by way of example, there is outputted as the result of the filtering a character string "S/CMOS/OO/" containing the characters "S" and "OO", which do not coincide with the leading character of the search term. There is no possibility of these character strings coinciding with the search term even when they are sent to the character string matching means 102, because the leading character "C" of the search term is not found at the start of these character strings.

For preventing the character strings which do not coincide with the leading character of a given search term from being outputted as a result of the filtering, there are provided in the filtering table a coincidence flag indicating the leading character (this flag will hereinafter be referred to as the leading character coincidence flag) and a coincidence flag indicating the other character than the leading one (this flag will hereinafter be referred to as the trailing character coincidence flag). In the filtering operation, matching is first performed with only the leading character flag, wherein only when the leading character coincidence flag is set, the corresponding. character is sent out to the character string matching means 102. Once the leading character coincidence flag has been set, any character for which either the leading character coincidence flag or the trailing character coincidence flag is set is sent out to the character string matching mans 102. Subsequently, at the time point where both of the leading character coincidence flag and the trailing character coincidence flag are no more set, the filtering operation with the aid of only the leading character flag is regained.

Through the processing described above, there can no more be inputted "S" and "OO" to the character string matching means 102. In view of the specific processing for the leading character, the single filtering circuit according to the instant embodiment will be referred to as the single leading character filtering circuit.

Figure 12:
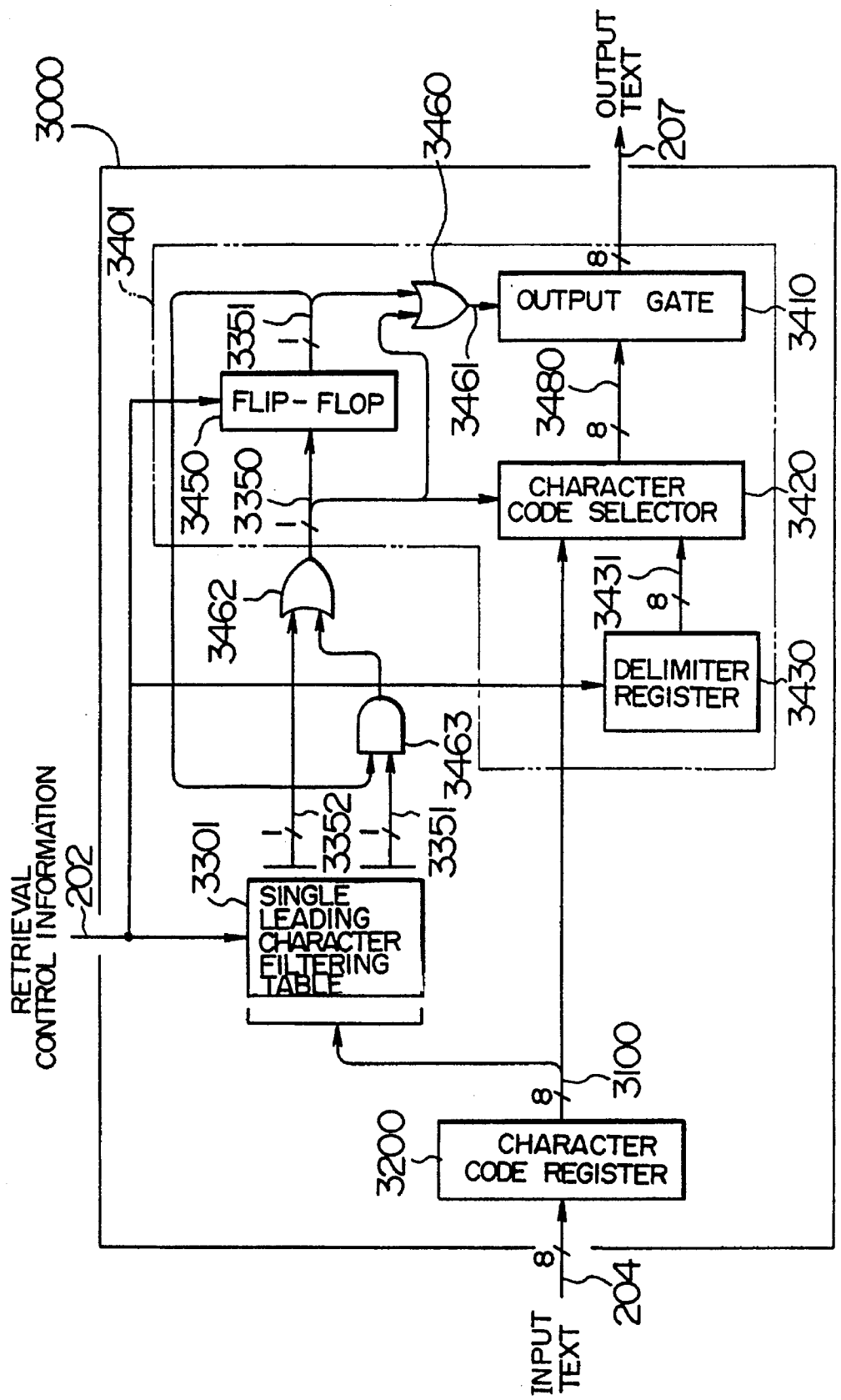
FIG. 12 is a diagram showing still another exemplary structure of the filtering means.

A structure of the filtering means 3000 according to the instant embodiment is shown in FIG. 12.

The filtering means according to the instant embodiment is comprised of a character code register 3200, a single leading character filtering table 3301, an OR gate 3462, an AND gate 3463 and a single output circuit 3401.

The single start filtering table 3301 have slots where the leading character coincidence flag and the trailing character coincidence flag are set, as shown in FIG. 13, and is accessed by using the character code as the address.

The single output circuit 3401 is comprised of a delimiter register 3430, a character code selector 3420, an output gate 3410, a flip-flop 3450 and an OR gate 3460.

Figure 14:
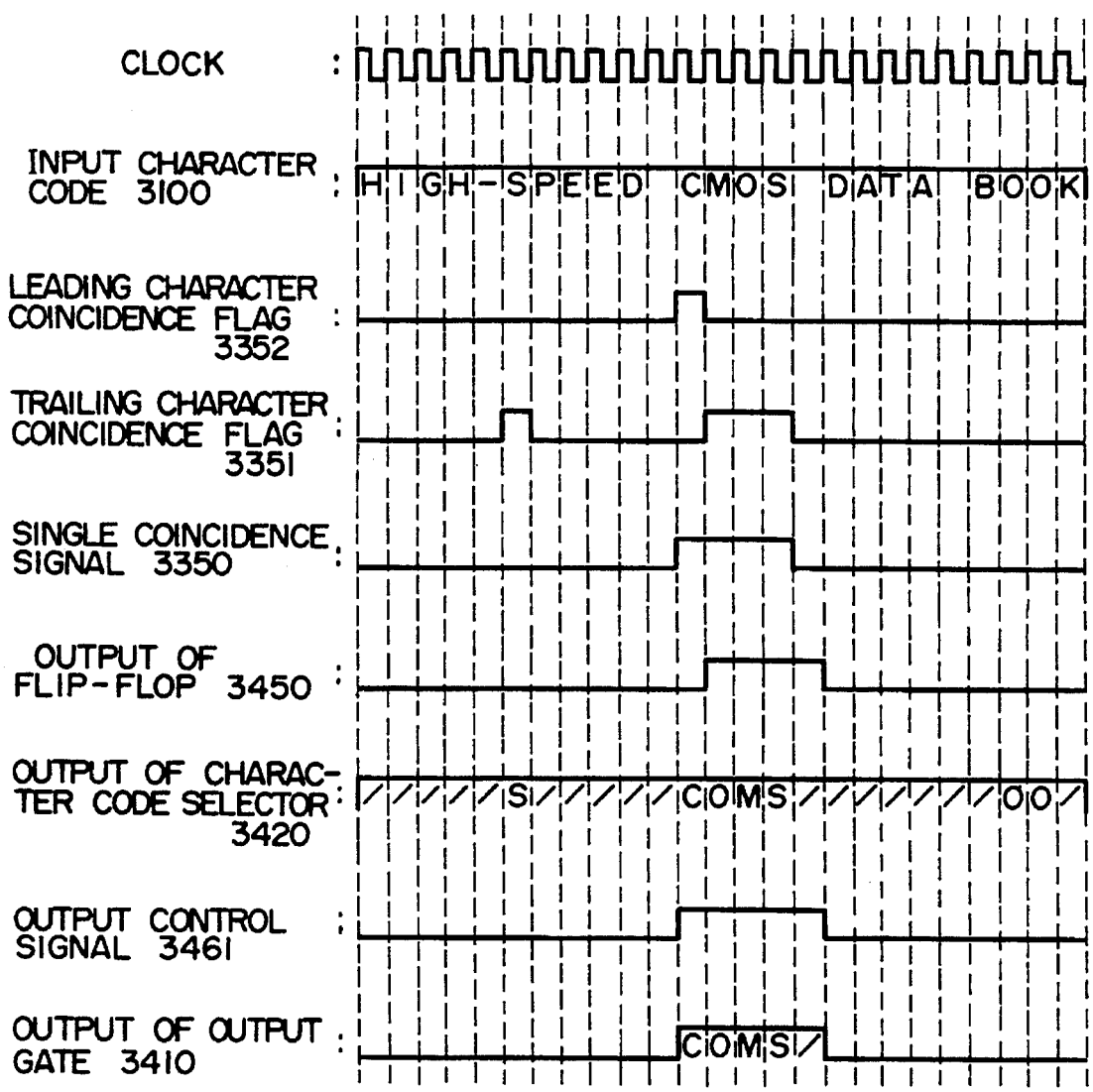
FIG. 14 is a timing chart for illustrating operation of the filtering means shown in FIG. 12.

In the following, operation of the single leading character filtering circuit according to the instant embodiment will be described in conjunction with an exemplary case by reference to a timing chart shown in FIG. 14.

It is assumed that the search term is "CMOS" and that the input text reads "HIGH-SPEED CMOS DATA BOOK".

As the initialization, those character codes which are not used in the search term are set in the delimiter register 3430 on the basis of the retrieval control information 202. To this end, the code "/", for example, may be set. Further, "0" (zero) is set at the flip-flop 3450. The single filtering table 3301 is placed with the contents shown in FIG. 13. More specifically, "1" is set for the leading character coincidence flag in the slot corresponding to the leading character "C" with "1" being set for the trailing character coincidence flags in the slots corresponding to the trailing characters "M", "O" and "S" while "0" is set for the leading character coincidence flags and the trailing character coincidence flags in the slots corresponding to the other characters than those mentioned above.

At first, "H" is fetched from the input text 204 into the character code register 3200 and at the same time the single leading character filtering table 3301 is accessed with "H", whereby the leading character coincidence flag 3352 and the trailing character coincidence flag 3351 are read out. However, since both the flags are "0", respectively, the single coincidence flag 3350 assumes "0". Further, since the value of the flip-flop 3450 is "0", the output control signal 3461 is also "0". As a result of this, even though the character code 3100 "H" at the X-port is selected by the character code selector 3420, the output gate 3410 does not deliver "H" to the output line 207.

The succeeding codes "I", "G", "H" and "-" are sequentially fetched into the character code register 3200. However, both of the flags are "0", respectively, with the value held at the flip-flop 3450 being "0", no character codes can be outputted through the output gate 3410.

Upon fetching of the succeeding character "S" to the character code register 3200, the trailing character coincidence flag 3351 of "1" is read out from the single leading character filtering table 3301. However, because the value "0" of the flip-flop 3450 is inputted to the AND gate 3463, the single coincidence signal 3350 assumes the value of "0" as well. Thus, no code is produced from the output gate 3410.

Subsequently, for "P", "E", "E", "D" and " " , (space), both the leading character coincidence flag 3352 and the trailing character coincidence flag 3351 read out from the single leading character filtering table 3300 are "0", respectively. Thus, no code is delivered onto the output line 207 either.

When the next character "C" is fetched,the leading character coincidence flag of "1" is read out from the single leading character filtering table 3301. Thus, the single coincidence signal 3350 also assumes "1". Consequently, the character code 3100 at the X-port is selected by the character code selector 3420, whereby open the output gate 3410 is opened, as a result of which "C" is outputted onto the output line 207. Subsequently, "1" is placed in the flip-flop 3450.

For the succeeding characters "M", "O" and "S" , respectively, the trailing character coincidence flag of "1" is read out. Since the value held by the flip-flop 3450 is also "1", the single coincidence signal 3350 assumes "1" as well. As a result of this, the character code 3100 of the X-port is selected by the character code selector 3420, and additionally the output gate 3410 is opened, whereby "C", "M", "O" and "S" are outputted onto the output line 207.

When the succeeding " " (space) is fetched into the character code register 3200, both the leading character coincidence flag 3352 and the trailing character coincidence flag 3351 of the single leading character filtering table assume "O", respectively. However, since the value held by the flip-flop 3450 is "1", the delimiter 3431 is selected by the character code selector 3420, resulting in that the code "/" is delivered onto the output line 207. Thereafter, "0" is placed in the flip-flop 3450, which thus resumes the initial value.

For the succeeding "D", "A", "T", "A", " " (space) and "B", the leading character coincidence flag 3352 and the trailing character coincidence flag 3351 both of "0" are again read out from the single starting character filtering table 3300. Consequently, no output is produced from the output gate 3410.

For the succeeding characters "O" and "O", the trailing character coincidence flag 3351 of "1" is read out. However, because the value of the flip-flop 3351 (3450) is "0", the single coincidence signal 3350 assumes the value of "1", resulting in that no output is produced from the output gate 3410.

For the last character "K", the single coincidence signal 3350 again becomes "0", whereby no output is delivered onto the output line 207.

As is apparent from the above description, the input text of 25 characters "HIGH-SPEED CMOS DATA BOOK" is filtered, whereby the five characters "CMOS/" are outputted. In other words, the character strings such as "S" and "OO", having the leading character which is out of coincidence is sieved out by the filtering means and inhibited from being inputted to the character string matching means 102. In this manner, according to the instant embodiment, the number of the characters contained in the output text is decreased to five characters, a half of ten characters contained in the output text obtained in the case of the second embodiment.

In other words, according to the instant embodiment, the filtering can be realized with a higher efficiency when compared with the second embodiment by virtue of use of the single leading character filtering table, whereby the character string matching means 102 can be implemented by using a less expensive memory, which means that a high-speed character string retrieval system of lower cost can be provided.

Figure 15:
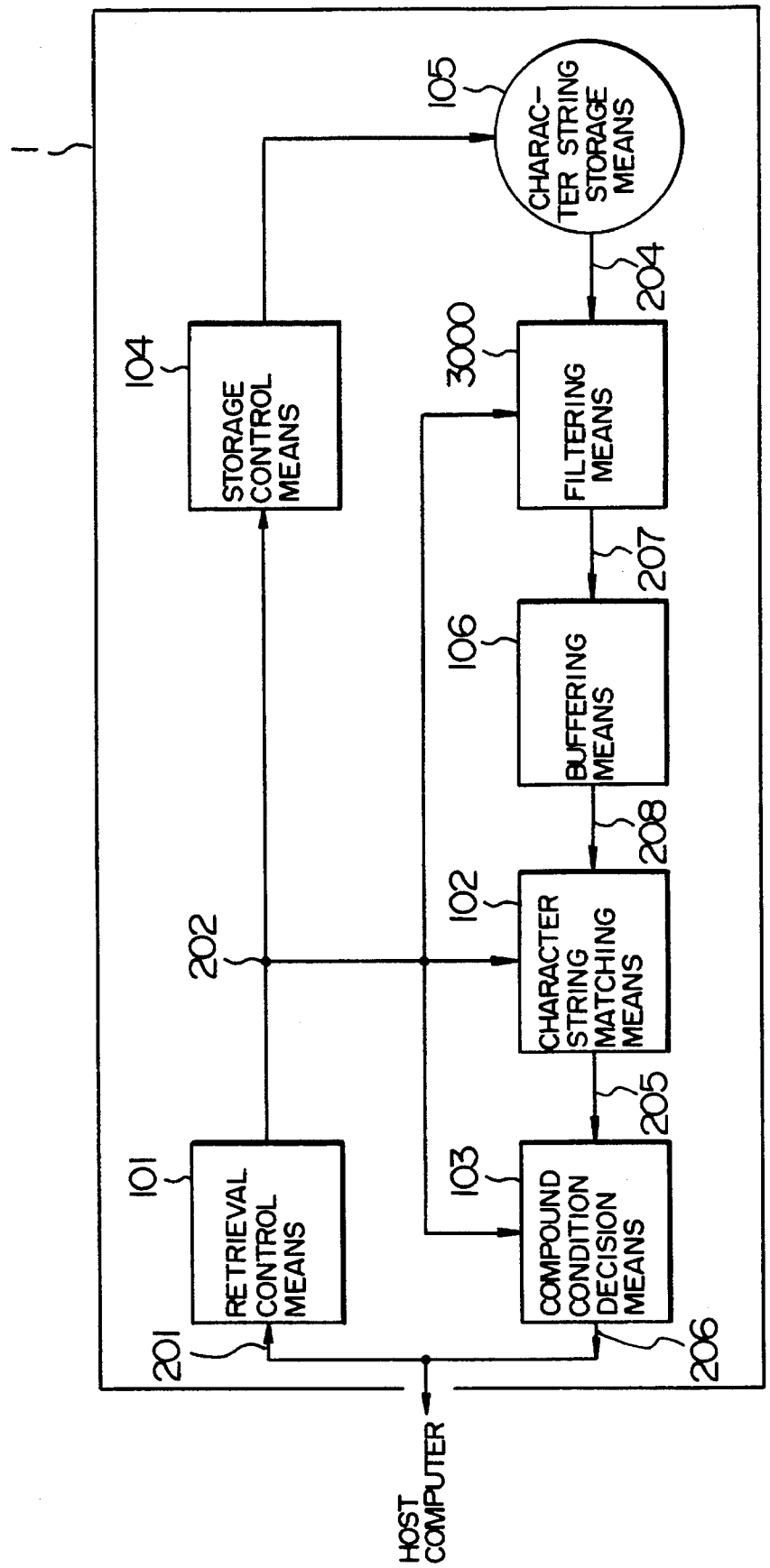
FIG. 15 is a diagram showing a structure of a character string retrieval system according to a further embodiment.

Next, a fourth embodiment incarnating the principle of the present invention will be described by reference to FIG. 15.

In the case of the first embodiment, the filtering means 3000 and the character string matching means 102 operate in synchronism with each other. Consequently, there arises a problem that operation of the filtering mans is inhibited until the processing performed by the character string matching means 102 has been completed.

To cope with the above problem, there is provided according to the instant embodiment a first-in/ first-out type buffering means 106 between the filtering means 3000 and the character string matching means 102 to thereby allow the filtering means 3000 and the character string matching means 102 to operate asynchronously with each other.

Operation of the buffering means 106 according to the instant embodiment will be described briefly.

The character cut out through the filtering means 3000 are stored in the buffering means 106 as an output text 207. The filtering means 3000 continues to store the characters until the buffering means 106 becomes full, whereupon the storing of the characters is stopped. The output text as stored is read out by the character string matching means 102. However, the read operation is stopped when the buffering means 106 becomes empty.

With the arrangement described above, the filtering means 3000 can execute the filtering processing without need for paying attention to the character string matching means 102 until the buffering means 106 becomes full.

In other words, the filtering means 3000 can perform the filtering processing on the text as inputted even when the character string matching means 102 is in the course of executing the matching operation. Thus, the filtering processing and the character string matching processing can simultaneously be performed in parallel with each other, whereby throughput of the retrieval can further be enhanced.

Parenthetically, the filtering means 106 may readily be implemented by using a FIFO (First-In/ First-Out) memory.

As will be appreciated, there can be provided a high-speed character string retrieval system which is capable of performing the character string matching with a high efficiency without reducing wastefully the throughput of the high-speed filtering means 3000.

In this way, the matching throughput can be enhanced simply by incorporating a small-scale filtering circuit without need for using a high-speed memory for the character string matching means, which in turn means that a high-speed character string retrieval system of low cost can be provided.

Another mode for carrying out the present invention will be described below.

Figure 16:
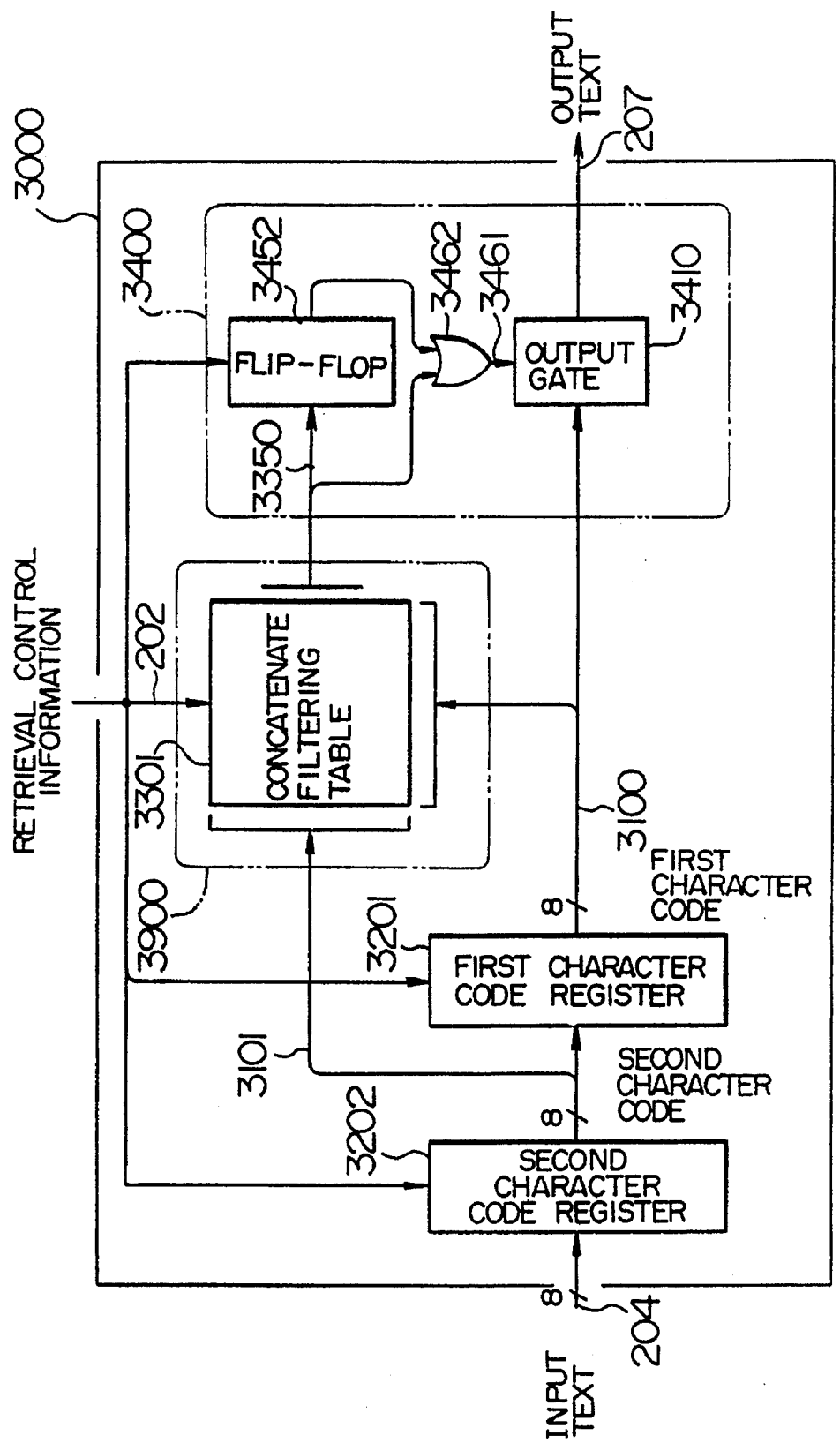
FIG. 16 is diagram showing another structure of filtering means.

Referring to FIG. 16, description will be made of a fifth embodiment incarnating the principle of the present invention. According to the instant embodiment, there is provided between a character string storage means 105 and a character string matching means 102 of a character string retrieval system disclosed in the cited reference a filtering means 3000 which is so designated that only when a character string read out from the character string storage means contains a character string of n concatenated characters (where n represents an integer not smaller than two) included in a search term, the character string mentioned above is sent to the character string matching means 102, for the purpose of omitting the use, less matching processing in the character string matching means 102 and thereby enhancing the matching throughput in the equivalent sense. In other words, it is contemplated as an object of the instant embodiment to provide an inexpensive character string retrieval system in which the retrieval speed is protected against degradation even when the character string matching means 102 implemented by using a low-speed memory is employed.

A structure of the filtering means 3000 employed in the instant embodiment is shown in FIG. 16. The filtering means 3000 responds to every fetching of one character from a text and makes decision as to whether the fetched character code and the one fetched immediately before are contained in the search term as a character string which consists of two characters in this case. Only when the concatenated character string is contained in the search term, the character fetched immediately before is outputted to the character string matching means 102, whereon in the succeeding character processing, such filtering processing is performed that the character fetched immediately before is outputted as it is. This filtering means will be referred to as the concatenate filtering circuit in view of the fact that the filtering processing is performed on a n-character basis.

The concatenate filtering circuit is comprised of a second character code register 3202 and a first character code register 3201 corresponding to two characters, respectively, a concatenate coincidence circuit 3900 including a concatenate filtering table 3300 and a concatenate character output circuit 3400.

On the other hand, the concatenate character output circuit 3400 is comprised of an output gate 3410, a flip-flop 3452 and an OR gate 3462.

The concatenate filtering table 3300 has a structure shown in FIG. 17 and implemented by a one-dimensional memory which is accessed by using as the address therefore a character code representing two concatenated characters. In this table, "1" is set as the coincidence flag in correspondence to concatenate character codes contained in the search term and, if otherwise, "0" is set.

Now, description will turn to operation in general of the concatenate filtering circuit shown in the figure.

At first, as the initialization, "1" is set to only the slots of the concatenate filtering table 3300 that correspond to the concatenate character strings contained in the search term on the basis of the retrieval control information.

Assuming, by way of example, that "SEAT" is given as a search term, contents such as illustrated in FIG. 17 are set in the concatenate filtering table 3301. In other words, "1s" are set in the slots corresponding to the concatenate character strings "SE","EA" and "AT", respectively, which constitute "SEAT".

Further, there is set in a first character code register 3201 and a second character code register 3202 a character which is not used in the search term such as, for example, "#" on the basis of the retrieval control information. The flip-flop 3452 is placed with "0".

The filtering operation is started by fetching character codes on a character-by-character basis in the second character code register 3202 from an input text 204. The second character code 3101 as fetched is stored in the first character code register 3201 immediately before the next character is fetched and outputted as the first character code 3100.

The concatenate filtering table 3301 is accessed with the first character code 3100 (more significant byte) and the second character code 3101 (less significant byte) as the address for reference, whereby the concatenate coincidence signal 3350 is read out. In the case of the concatenate character string which constitutes the search term, "1" is outputted as the concatenate coincidence signal 3350. If otherwise, "0" is outputted. When the concatenate coincidence signal 3350 is "1", an output select signal 3461 also assumes "1", resulting in that the output gate 3410 is opened, whereby the first character code 3100 stored in the first character code register 3201 is outputted onto the output line 207. In other words, the first character code 3100 is sent to the character string matching means 102 of a succeeding stage.

At this juncture, it should be mentioned that when "1" is outputted as the concatenate coincidence signal 3350, the flip-flop 3452 is set to "1" at the same time as the succeeding second character code is fetched. Consequently, upon processing of the succeeding character code, the output select signal 3461 assumes "1", as a result of which the output gate 3410 is opened independent of the concatenate coincidence signal 3350, whereby the first character code 3100 is delivered onto the output line 207.

When the concatenate coincidence signal 3350 is "0" and when the output of the flip-flop 3452 is "0", the output select signal 3461 also becomes "0", whereby the output gate 3410 is closed. Accordingly, the first character code 3100 is not outputted.

Next, operation of the concatenate filtering circuit will be described in concrete by reference to a timing chart shown in FIG. 18.

Assuming, by way of example, that "SEAT" is designated as a search term and "SEAT RESERVATION SYSTEM" is inputted as an input text.

As the initialization, a specific code "#" which is not used in the search term is placed in the first character code register 3201 and the second character code register 3202, respectively. Further, "0" is set at the flip-flop 3452. In the concatenate filtering table 3301, "1" is placed in the slots corresponding to "SE", "EA" and "ET", respectively, which represent the concatenate character strings constituting the search term, while "0" is placed in the other slots, respectively.

In the first place, the first character "S" of the text is fetched into the second character code register 3202, while "#" outputted from the second character code register 3202 is fetched into the first character code register 3201. Accordingly, the concatenate filtering table 3301 is accessed with "#S" as the address for reference. As a result of this, "0" is outputted as the concatenate coincidence signal 3350 from the concatenate filtering table 3301. Since the output select signal 3461 then becomes "0", the first character code 3100 which is "#" is inhibited from being delivered to the character string matching means 102 from the output gate 3410.

Next, upon fetching of "E", the concatenate filtering table 3301 is accessed with the address for reference which is given by a combination of "E" with the immediately preceding character, i.e., with "SE". In this case, "1" is outputted as the concatenate coincidence signal 3350 from the concatenate filtering table 3301 with the output select signal 3461 assuming "1", indicating that "SE" is included in the search term. Consequently, the first character code 3100 of "S" stored in the first character code register 3201 is outputted to the character string matching means 102 from the output gate 3410. At this time, the concatenate coincidence signal 3350 of "1" is held by the flip-flop 3452, to allow the first character code 3100 to be outputted in the succeeding character processing regardless of whether or not the first character code is included in search term.

Similarly, upon fetching of "A", the concatenate filtering table 3301 is accessed with the concatenate character string "EA" which represents the combination of "A" with the immediately preceding character. In this case, "1" is outputted as the concatenate coincidence signal 3350 with the output select signal 3461 assuming "1". Consequently, the first character code 3100 of "E" is sent out to the character string matching means 102 from the output gate 3410. At this time point, the concatenate coincidence signal 3350 of "1" is held by the flip-flop 3452 as in the case of the preceding step, whereby the first character code 3100 is also outputted in the next character processing step.

Upon fetching of succeeding "T", the concatenate filtering table 3301 is accessed with a concatenate character string "A". Thus, the concatenate coincidence signal 3350 and the output select signal 3461 assume respective values of "1". Consequently, "A" which is the first character code 3100 is outputted to the character string matching means 102 through the output gate 3410, while the concatenate coincidence signal of "1" is held by the flip-flop 3452. Thus, the first character code 3100 is outputted also in the succeeding processing.

When the succeeding code " " (space) is fetched, the concatenate filtering table 3301 is accessed with a concatenate character string "T ", as a result of which "0" is outputted as the concatenate coincidence signal 3350. However, because the output of the flip-flop 3452 is "1", the output select signal 3461 assumes the level of "1". As a consequence, the first character code 3100 of "T" is outputted to the character string matching means 102 through the output gate 3410. Further, the concatenate coincidence signal of "0" is held at the flip-flop 3452. Thus, starting from the succeeding processing, the first character code 3100 can no more be outputted until the concatenate character string included in the search term makes appearance.

In the similar manner, "R", "E" and "S" are fetched and the concatenate character strings "R", "RE" and "ES" corresponding to the fetched characters are checked. However, all of the corresponding concatenate coincidence signals 3350 outputted from the concatenate filtering table 3301 become "0". In other words, since they are not included in the search term, no output is produced to the character string matching means 102.

Upon fetching of "F" in succession, the concatenate filtering table 3301 is accessed with the concatenate character string "SE", whereby the concatenate coincidence signal 3350 of "1" is outputted and the output select signal 3461 assumes "1". Consequently, the first character code 3100 of "S" is delivered to the character string matching means 102 from the output gate 3410, while the concatenate coincidence signal 3452 of "1" is held by the flip-flop 3452. Thus, the first character code 3100 is outputted also in the succeeding processing.

Next, when "R" is fetched, the concatenate filtering table 3301 is accessed with a concatenate character string of "ER", whereby the concatenate coincidence signal 3350 of "0" is outputted. However, because the output of the flip-flop 3452 is "1", the first character code 3100 of "E" is outputted to the character string matching means 102.

Thereafter, "V" and "A" are fetched. However, since the corresponding concatenate character string renders the concatenate coincidence signal 3350 to be "0", no output is produced for the character string matching means 102.

Next, upon fetching of "T", the concatenate character string "AT" renders the corresponding concatenate coincidence signal 3350 to be "1". Consequently, the first character code 3100 of "A" is outputted to the character string matching means 102.

Thus, when the succeeding character code "T" is fetched, the concatenate coincidence signal 3350 for the concatenate character string "TT" is "0". Because the output of the flip-flop 3452 is "1" at this time point, the first character code 3100 of "T" is outputted to the character string matching means 102.

Further, succeeding characters "O", "N", " " (space), "S", "Y", "S", "T", "E" and "M" as fetched are all discarded because the corresponding concatenate character strings are not included in the search term.

As the overall result of the filtering processings described above, only a character string "SEATSEAT" which consists of character substrings of two characters included in the search term is transferred to the character string matching means from the filtering means.

In the case of the instant embodiment, all the combinations of the concatenate character strings which are placed in the concatenate filtering table are set. For example, in the case of the search term "SEAT" described above, the concatenate character strings of "SE", "EA" and "AT" are set. Of these concatenate character strings, the string "EA" need not be designated because it is covered by the concatenate character string "SE" and the concatenate character string "A". In contrast, when an input text "EAST" is inputted, the concatenate character string "EA" is detected and outputted to the character string matching means 102. Under the circumstances, it becomes necessary to decrease to a possible minimum the concatenate character strings which are to be set in the concatenate filtering table and which cover one another. Elimination of all the concatenate character strings covering one another from the concatenate character strings to be set is impossible because there is a case in which the number of characters constituting the search term is an odd number. For example, in the case of "SPEED", it is required to set the concatenate character strings to be "SP", "EE" and "ED".

FIG. 19 shows an exemplary structure of the concatenate filtering table in which the concatenate character string "EA" is not set for the search term "SEAT". In this case, operation of the concatenate filtering circuit is illustrated in concrete in a timing chart of FIG. 11.

Figure 18:
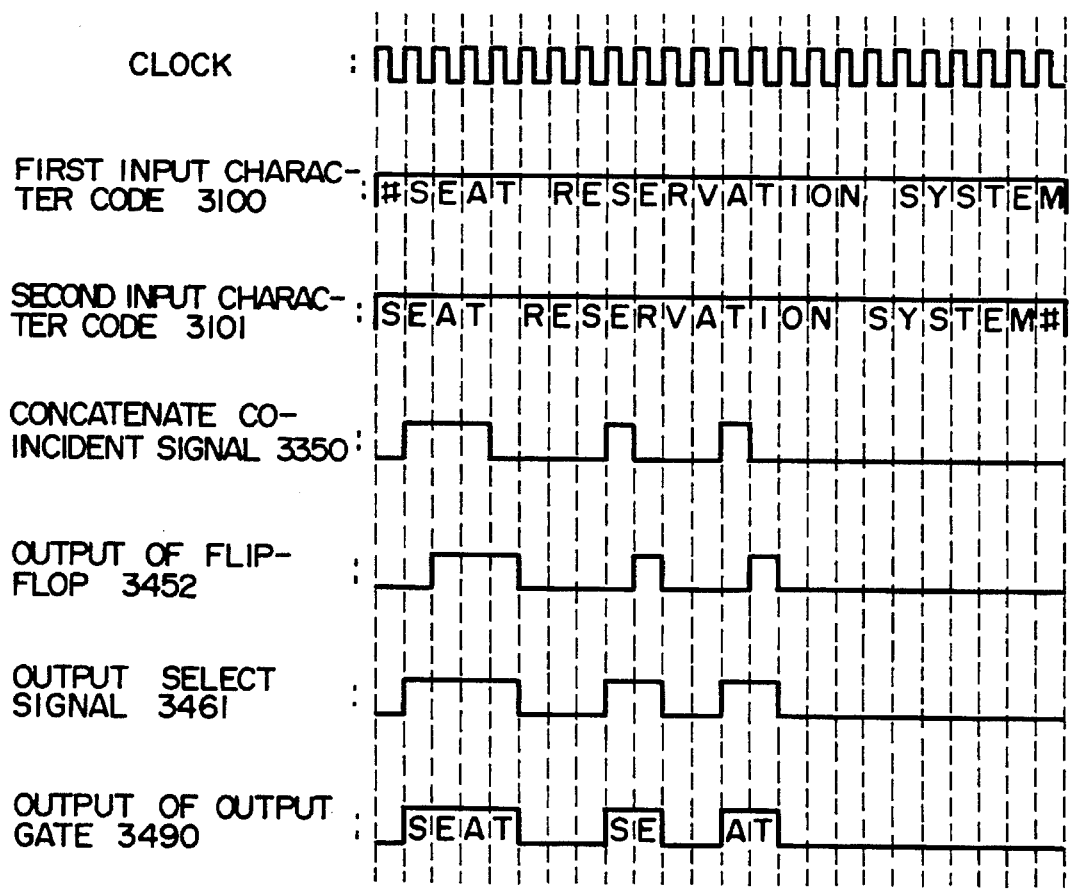
FIG. 18 is a timing chart for illustrating operation of the filtering means shown in FIG. 16.
Figure 20:
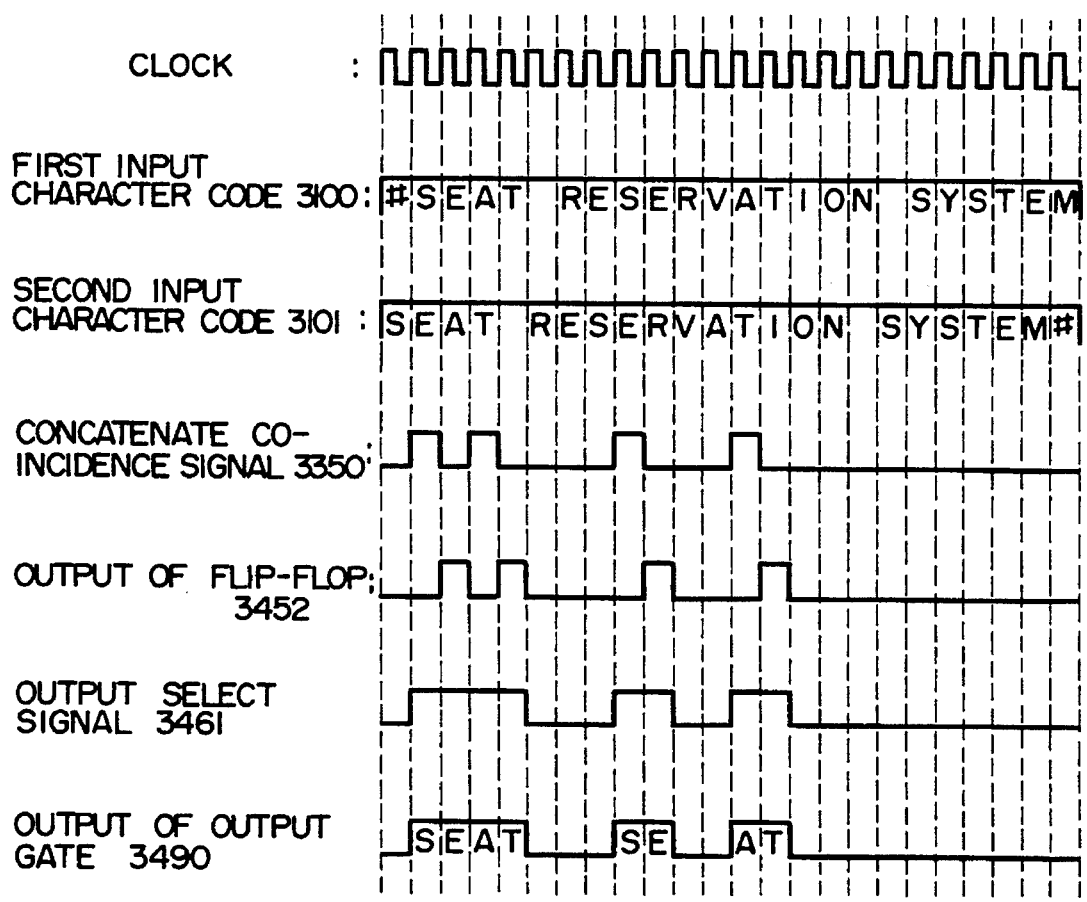
FIG. 20 is a time chart for illustrating function of the filtering table shown in FIG. 19.

In the case of this example, it is assumed that the input text reading "SEAT RESERVATION SYSTEM" is inputted as in the case of the example illustrated in the timing chart of FIG. 18.

Difference from the operation illustrated in FIG. 18 is seen in that when "E" is inputted as the first input character with "A" being inputted as the second character, the concatenate coincidence signal 3350 assumes the value of "0". Since the output select signal 3461 is generated by ORing the output of the flip-flop 3452 and the coincidence signal 3350, the output select signal 3461 at this time point is "1", because the value held by the flip-flop 3452 at this time point is "1". As can be sen from the timing chart, the filtering processing can be performed similarly to the case illustrated in FIG. 18.

As will be appreciated from the foregoing, the text of 23 characters "SEAT RESERVATION SYSTEM" is screened out as a text of 8 characters "SEATSEAT" by means of the concatenate filtering circuit 3000. As a result, the burden imposed to the character string matching means is reduced by 8/23 or to about ⅓ when compared with the case where the filtering means is not employed. This means that the matching throughput is increased by a factor of about three in appearance. Thus, the inexpensive character string retrieval system can be realized without incurring degradation in the retrieval speed even when an inexpensive memory whose access time is thrice as long is used.

As will be understood from the above description, the character string matching means 102 can be implemented inexpensively by providing only a small-scale filtering circuit, whereby a high-speed character string retrieval system can be provided at a low cost.

In the exemplary embodiment described above, it has been assumed that the concatenate character string consists of two characters. It will however be understood that concatenate character string consisting of n characters can be disposed of by providing n character registers and preparing correspondingly the table.

Next, description will turn to a sixth embodiment incarnating the principle of the present invention.

The instant embodiment is directed to an improvement of the fifth embodiment.

In the case of the fifth embodiment, when "SEAT" and "EATS", for example, are designated as the search terms with "SEAT RESERVATION SYSTEM" being inputted as the input text, "SEATSEAT" is outputted as the result of the filtering. In that case, there arises a problem that matching is performed by the character string matching means 102 for "EATS" which does not exist in the input text. For solving this problem, only when the characters existing in the search term make appearance in continuation or concatenation in the text, the characters are outputted as they are, while upon occurrence of discontinuation, it becomes necessary to insert a delimiter mark (hereinafter referred to as delimiter) "/" at a place where the discontinuation takes place. To this end, the delimiter "/" corresponding to one character may be inserted when the output from the output gate 3410 is interrupted. Then, the output text will become "SEAT/SE/AT", whereby erroneous matching of "EATS" is prohibited in the character string matching means 102.

Figure 21:
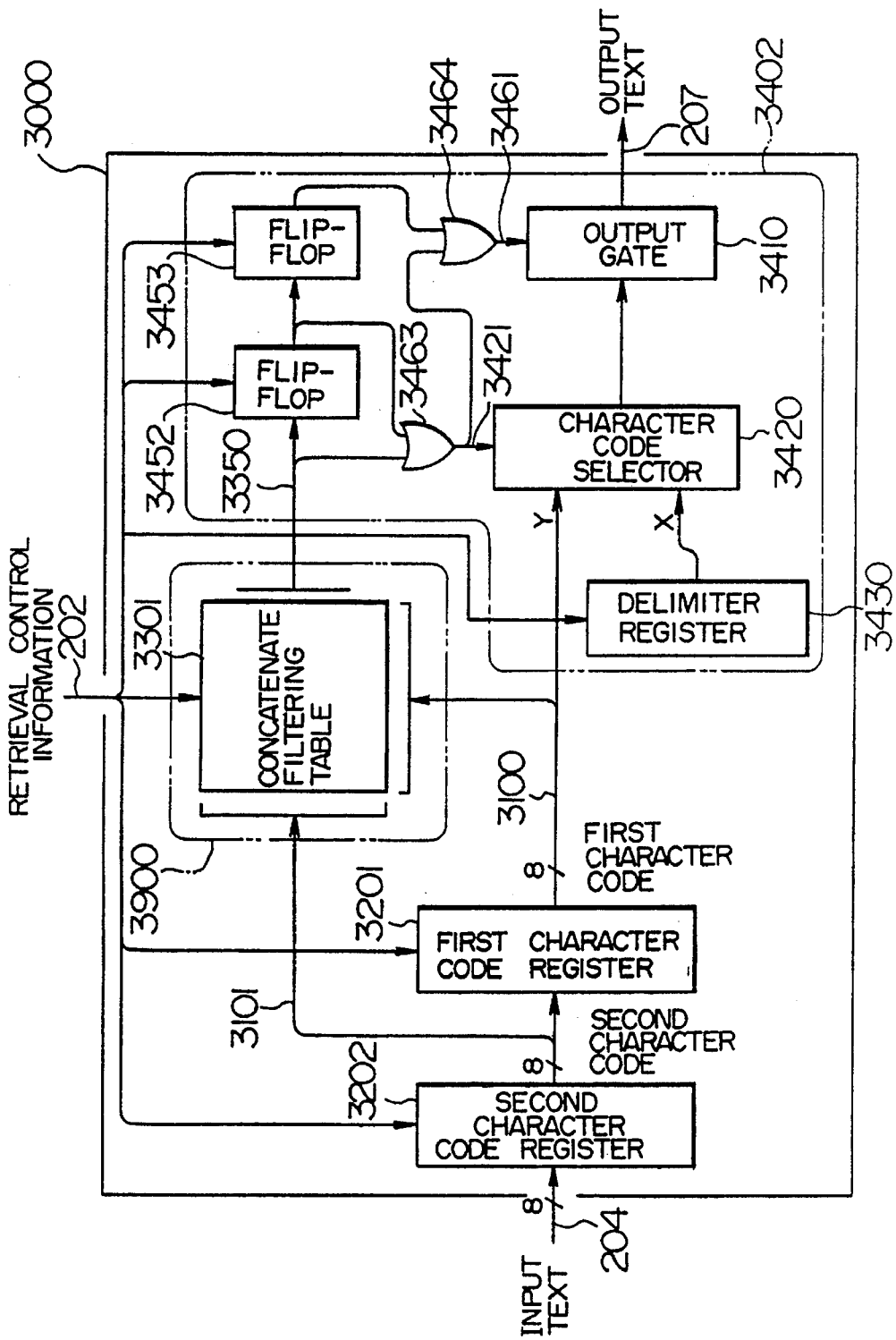
FIG. 21 is a diagram showing another structure of filtering means.

A structure of the concatenate filtering circuit incorporated in the filtering means 3000 according to the instant embodiment is shown in FIG. 21. This structure differs from that of the first embodiment only in respect to the concatenate output circuit 3402.

The concatenate output circuit 3402 according to the instant embodiment is comprised of a delimiter register 3430, a character code selector 3420, an output gate 3410, flip-flops 3452 and 3453 and OR gates 3463 and 3464.

In the character code selector 3420, an X-port is selected when a character code select signal 3421 is "0" while a Y-port is selected when the character code select signal 3421 is "1".

Figure 22:
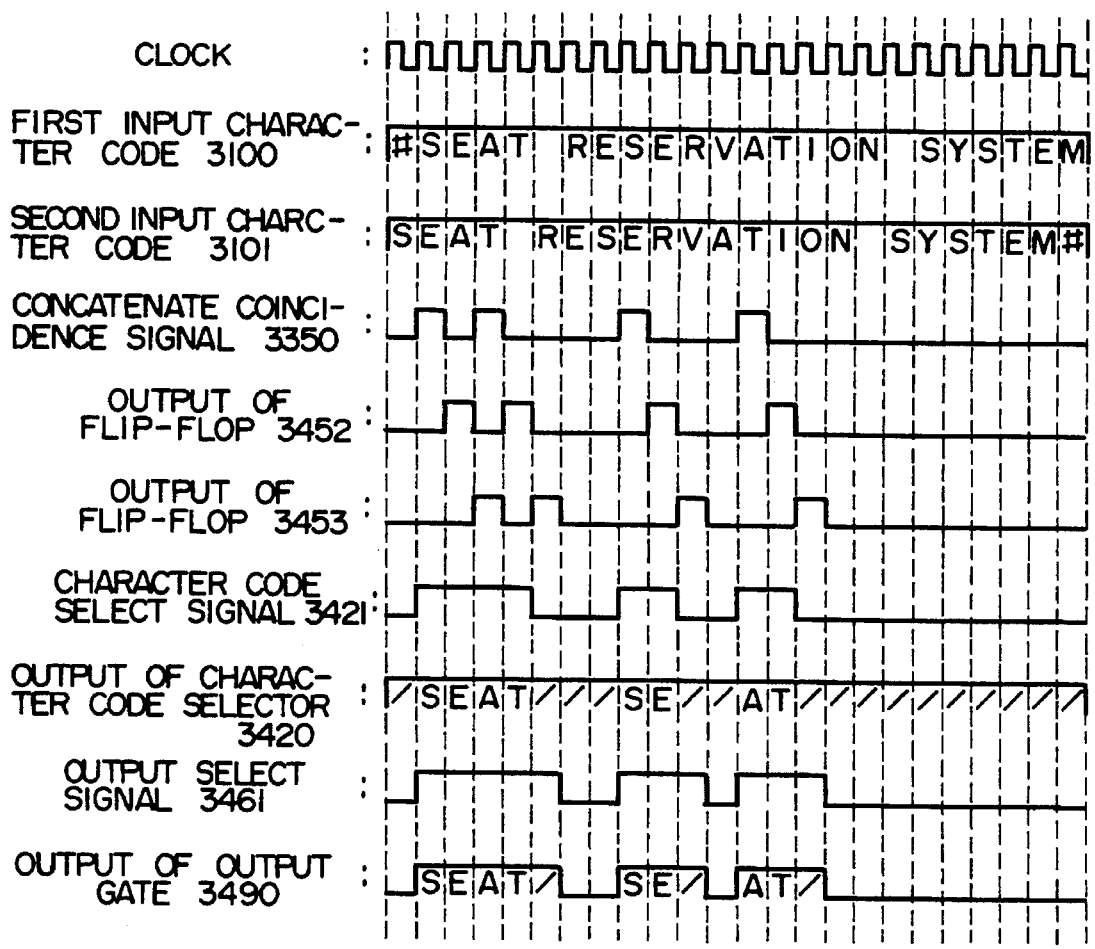
FIG. 22 is a timing chart for illustrating operation of the structure shown in FIG. 21.

Operation of the concatenate filtering circuit 3000 will be elucidated by reference to a timing chart shown in FIG. 22 in conjunction with an exemplary case.

It is assumed, by way of example, that "SEAT" is designated as a search term and that the input text reads "SEAT RESERVATION SYSTEM".

As the initialization, a character code which is not used in the search term is set in the delimiter register 3430 on the basis of the retrieval control information 202. By way of example, a code "#" may be set to this end. Further, "#" is set at the first character code register 3201 and the second character code register 3202. On the other hand, "0" (zero) is set at the flip-flop 3452 as well as at the flip-flop 3453. In the concatenate filtering table 3900, the concatenate coincidence flag shown in FIG. 17 is set as with the case of the first embodiment.

In the first place, the first character "S" of the text is fetched into the second character code register 3202, while the code "#" outputted from the second character code register 3202 is fetched into the first character code register 3201. Accordingly, the concatenate filtering table 3301 is accessed with "#S" as the address for reference. As a result of this, "0" is outputted as the concatenate coincidence signal 3350 from the concatenate filtering table 3301, as a result of which the character code select signal 3421 and the output select signal 3461 assume "0", respectively. Accordingly, the delimiter at the X-port is selected in the character code selector 3420. However, since the output gate 3410 is closed no output is delivered to the character string matching circuit 102.

Next, upon fetching of "E", the concatenate filtering table 3301 is accessed with the address for reference which is given by "SE". In this case, "1" is outputted as the concatenate coincidence signal 3350 with the character code select signal 3421 and the output select signal 3461 assuming "1", respectively, indicating that "SE" is included in the search term. Consequently, the Y-port of the character code selector 3420 is selected, whereby the first character code 3100 of "S" is outputted to the output gate 3410. Further, since the output select signal 3461 is "1", the output gate 3410 is opened, whereby "S" is delivered to the character string matching means 102.

At that time, the concatenate coincidence signal 3350 of "1" is held by the flip-flop 3452. Consequently, in the succeeding character processing step, the Y-port is selected in the character code selector 3420, whereby the output gate 3410 is opened. Thus, the first character code 3100 is outputted regardless of the decision whether or not the first character code 3100 is included in the search term.

Similarly, upon fetching of "A", the concatenate filtering table 3301 is accessed with the concatenate character string "EA". In this case, "1" is outputted as the concatenate coincidence signal 3350 with the output select signal 3461 assuming "1". Consequently, the Y-port of the character code selector 3420 is selected, whereby the first character code 3100 of "E" is sent out to the character string matching means 102 from the output gate 3410.

At this time point, the concatenate coincidence signal 3350 of "1" is held by the flip-flop 3452 and further by the flip-flop 3453 as in the case of the preceding processing step, whereby the Y-port of the character code selector 3420 is selected, resulting in that the first character code 3100 is outputted also in the succeeding processing.

Next, upon fetching of "T", the concatenate filtering table 3301 is accessed with a concatenate character string "AT". Thus, the concatenate coincidence signal 3350 and the output select signal 3461 assume respective values of "1". Consequently, the Y-port of the character code selector 3420 is selected, whereby "A" which is the first character code 3100 is outputted to the character string matching means 102 through the output gate 3410. Thus, "1" continues to be held by the flip-flops 3452 and 3453, whereby the first character code 3100 is outputted also in the succeeding processing.

When the succeeding code " " (space) is fetched, the concatenate filtering table 3301 is accessed with a concatenate character string "T ", as a result of which "0" is outputted as the concatenate coincidence signal 3350. However, because the output of the flip-flop 3452 is "1", the output select signal 3461 assumes the level of "1". As a consequence, the Y-port of the character code selector 3420 is selected, whereby the first character code 3100 of "T" is outputted to the character string matching means 102 through the output gate 3410. Further, the concatenate coincidence signal of "0" is held at the flip-flop 3452, while the flip-flop 3453 is placed with "1" outputted from the flip-flop 3452. Thus, starting from the next processing, the Y-port of the character code selector 3420 is selected, whereby the first character code 3100 is inhibited from being outputted until the concatenate character string included in the search term makes appearance. However, the output gate for which the output select signal 3461 is "1" continues to be opened.

Next, upon fetching of "R", the concatenate filtering table 3301 is accessed with a concatenate character string "R", whereby "0" is outputted as the concatenate coincidence signal 3350. Although the output of the flip-flop 3452 is "0", the output of the flip-flop 3453 is "1". Consequently, the output select signal 3461 assumes the value "1". Thus, the delimiter at the X-port is selected in the character code selector 3420 to be subsequently outputted to the character string matching means 102 from the output port 3410. At the same time, "0" outputted from a flip-flop 3452 is held by the flip-flop 3453. As a result of this, no output is produced from the output gate 3410 in the processings which follow, until the concatenate character string included in the search term makes appearance.

Owing to the control in the manner described above, there is realized insertion of the delimiter at interruptions of the output text 207.

In the similar manner, "R" and "S" are fetched and the concatenate character strings "RE" and "ES" corresponding to the fetched characters are checked. However, all of the corresponding concatenate coincidence signals 3350 are "0s", respectively. Accordingly, no output is produced to the character string matching means 102.

Upon fetching of "E" in succession, the concatenate filtering table 3301 is accessed with the concatenate character string "SE", whereby the concatenate coincidence signal 3350 of "1" is outputted, and the output select signal 3461 assumes "1". Consequently, the Y-port of the character code selector 3420 is selected, whereby the first character code 3100 of "S" is delivered to the character string matching means 102 from the output gate 3410, while the concatenate coincidence signal 3350 of "1" is held by the flip-flop 3452. Thus, the first character code 3100 is outputted also in the succeeding processing.

Next, when "R" is fetched, the concatenate filtering table 3301 is accessed with a concatenate character string of "ER", whereby the concatenate coincidence signal 3350 of "0" is outputted. However, because the output of the flip-flop 3452 is "1", the first character code 3100 of "E" is outputted to the character string matching means 102. At this time point, the output "1" of the flip-flop 3452 is held by the flip-flop 3453, while the flip-flop 3452 is placed with "0" of the concatenate coincidence signal 3350. Next, "V" is fetched and "0" is outputted as the concatenate coincidence signal 3350. Since the output of the flip-flop 3452 is "0" with that of the flip-flop 3453 being "1", the output select signal 3461 assumes the value "1". Accordingly, the delimiter at the X-prot is selected in the character code selector 3420 to be subsequently outputted to the character string matching means 102 through the output gate 3410. At the same time, "0" is held at the flip-flop 3453.

Thereafter, "A" is fetched. However, since the corresponding concatenate character string renders the concatenate coincidence signal 3350 to be "0", no output is produced for the character string matching means 102.

Next, upon fetching of "T", the concatenate character string "AT" renders the corresponding concatenate coincidence signal 3350 to be "1". Consequently, the first character code 3100 of "A" is outputted to the character string matching means 102 and "1" is held at the flip-flop 3452. Thus, when the succeeding character code "T" is fetched, the concatenate coincidence signal 3350 for the concatenate character string "TT" becomes "0". Because the output of the flip-flop 3452 is "1" at this time point, the first character code 3100 of "T" is outputted to the character string matching means 102. Additionally, the flip-flop 3452 is set to "0" while the flip-flop 3453 is placed with "1".

Consequently, upon fetching of "O", the concatenate coincidence signal 3350 for the concatenate character string "IO" becomes "0" (zero). However, because the output of the flip-flop 3452 is "0" with that of the flip-flop 3453 being "1", the delimiter is outputted to the character string matching means 102.

Further, succeeding characters "N", " " (space), "S", "Y", "S", "T", "E" and "M" as fetched are all discarded because the corresponding concatenate character strings are not included in the search term.

As is apparent from the above description, the input text reading "SEAT RESERVATION SYSTEM" undergoes filtering to be outputted as "SEAT/SE/AT/". Thus, the matching processing can be performed properly even when the search term "EATS" is designated as the search term.

In other words, the filtering which precludes erroneous matching can be realized simply by adding a small quantity of circuit hardware to the fifth embodiment, whereby the character string matching means 102 can be implemented by using a memory of low price. Thus, there can be provided a high-speed character string retrieval system at a low cost.

Next, a seventh embodiment incarnating the principle of the present invention will be described.

With the instant embodiment, it is contemplated to provide a filtering means which can ensure a filtering function enhanced higher than that of the sixth embodiment owing to such arrangement that any coincident concatenate character string is inhibited from being outputted even upon coincidence between the other concatenate character string than the leading one constituting a search term and an input text, until the leading concatenate character string of the search term makes appearance.

It should be recalled that in the case of the sixth embodiment, when "SEAT" is designated as the search term with an input text "SEAT RESERVATION SYSTEM" being inputted, there is outputted as the result of the filtering a character string "SEAT/SE/AT/", which contains the character string "AT" which do not coincide with the leading concatenate character string of the search term. There is no possibility of this character string coinciding with the search term even when it is sent to the character string matching means 102, because the leading concatenate character string "SE" of the search term is not found at the start of the above-mentioned character string.

For preventing the useless transfer mentioned above, there is additionally provided in the filtering table a coincidence flag indicating the leading concatenate character string (this flag will hereinafter be referred to as the leading flag). On the other hand, the coincidence flag used hereinbefore will be referred to as the designation flag since it indicates the concatenate character string designated in the search term. In the filtering operation, matching is first performed with only the leading flag, wherein only when the leading flag is set, the corresponding concatenate character string is sent out to the character string matching means 102. Once the leading flag has been set, any character for which either the leading flag or the designation flag is set is sent out to the character string matching means 102. Subsequently, at the time point where both of the leading flag and the designation flag are no more set, the filtering operation with the aid of only the leading flag is regained.

Through the processing described above, there can no more be inputted "AT" to the character string matching means 102. In view of the specific processing for the leading concatenate character string, the concatenate filtering circuit according to the instant embodiment will be referred to as the concatenate leading string filtering circuit.

Figure 23:
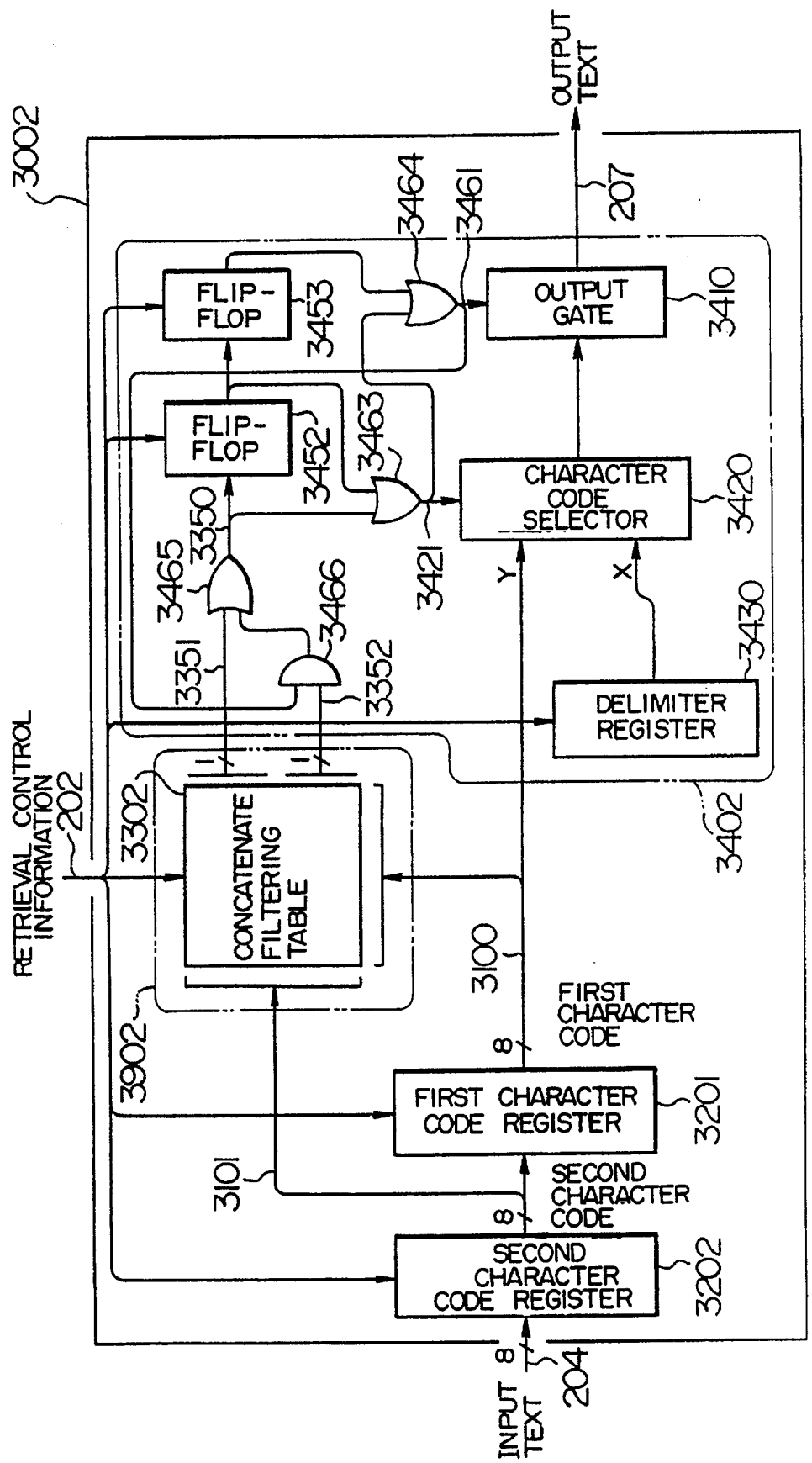
FIG. 23 is a diagram showing yet another structure of the filtering means.
Figure 25:
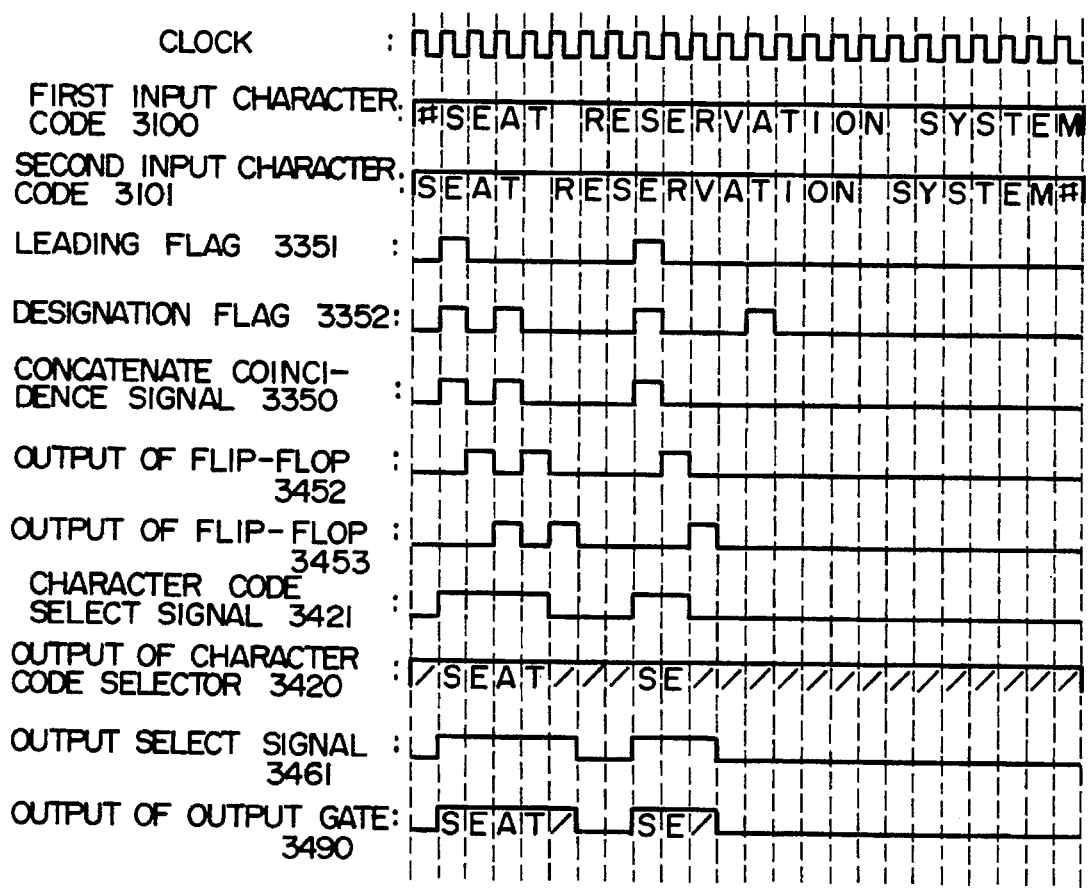
FIG. 25 is a timing chart for illustrating operation of the filtering means shown in FIG. 23.

A structure of the filtering means 3002 according to the instant embodiment is shown in FIG. 23.

The concatenate filtering circuit according to the instant embodiment is comprised of a second character code register 3202, a first character code register 3201, a concatenate filtering table 3302 and a concatenate character output circuit 3402.

The concatenate output circuit 3402 is comprised of a delimiter register 3430, a character code selector 3420, an output gate 3410, flip-flops 3452 and 3453, OR gates 3462, 3463, 3466 and 3465, and AND gates 3466.

In the character code selector 3420, an X-port thereof is selected when a character code select signal 421 is "0", while a Y-port is selected when the character code select signal is "1".

The concatenate filtering table 3302 has slots in which the leading flag and the designation flag are stored in such a manner as shown in FIG. 24 and is adapted to be accessed by using the character code as the address.

In the following, operation of the concatenate leading string filtering circuit according to the instant embodiment will be described in conjunction with an exemplary case by reference to a timing chart shown in FIG. 24.

It is assumed that the search term is "SEAT" and that the input text reads "SEAT RESERVATION SYSTEM".

As the initialization, the character code which is not used in the search term is set in the delimiter register 3430 as a delimiter code. To this end, the code "/", for example, may be set. Additionally, the code "#" is set in the first character code register 3201 and the second character code register 3202, respectively. Further, "0" (zero) is set at the flip-flops 3452 and 3453.

The concatenate filtering table 3302 is initialized such that "1" is set for the designation flag in the slots corresponding to the concatenate character strings contained in the search term with "0" being set for the designation flags in the other slots. Besides, "1" is set for the leading flag in the slot corresponding to the leading concatenate character string of the search term while "0" is set for the leading flag in the other slots.

In the case of the instant embodiment, since the search term is assumed to be "SEAT", the concatenate filtering table 3302 is entered with such contents as illustrated in FIG. 24. More specifically, the trailing concatenate character coincidence flags in the slots corresponding to the concatenate character strings "SE" and "AT" which constitute "SEAT" is set to "1" while the other trailing concatenate character coincidence flags are set to "0". Furthermore, the leading concatenate character coincidence flag in the slot corresponding to the leading concatenate character string "SE" of the term "SEAT" is set to "1" with the other leading concatenate character coincidence flags being set to "0".

Upon completion of the initialization described above, operation is performed as follows.

In the first place, the first character "S" of the text is fetched into the second character code register 3202, while "#" outputted from the second character code register 3202 is fetched into the first character code register 3201. Accordingly, the concatenate filtering table 3301 is accessed with "#S" as the address for reference. As a result of this, the leading concatenate character coincidence flag 3351 and the trailing concatenate character coincidence flag 3352 both being "0" are outputted from the concatenate filtering table 3302. Consequently, the concatenate coincidence signal 3351 of "0" is outputted, while the character code select signal 3421 and the output select signal 3461 assume, respectively, "0". Accordingly, although the delimiter at the X-port is selected in the character code selector 3420, no output is produced to the character string matching means 102, because the output gate 3410 is closed.

Next, upon fetching of "E", the concatenate filtering table 3302 is accessed with "SE" as the address for reference. In this case, "1" is outputted as the leading concatenate character coincidence flag, whereby the concatenate coincidence signal 3350 of "1" is outputted. Thus, the character code select signal 3421 and the output select signal 3461 assume the value of "1", indicating that "SE" is included in the search term. Consequently, the Y-port of the character selector 3420 is selected, whereby the first character code 3100 of "S" is outputted to the output gate 3410. Further, since the output select signal 3461 is "1", the output gate 3410 is opened to allow "S" to be outputted to the character string matching means 102.

At this time point, the flip-flop 3452 holds the concatenate coincidence signal 3350 of "1". Accordingly, in the next character processing, the Y-port is selected in the character code selector 3420 to open the output gate 3410, as a result of which the first character code 3100 is outputted regardless of the decision as to whether or not it is included in the search term.

Similarly, upon fetching of "A", the concatenate filtering table 3302 is accessed with the concatenate character string "EA". In this case, "0" is outputted as the concatenate coincidence signal 3350 because the leading concatenate character coincidence flag and the trailing concatenate character flag are "0", respectively. At this time point, however, "1" is held by the flip-flop 3452t whereby the first character code 3100 of "E" is outputted to the character string matching means 102 through the output gate 3410, because the Y-port of the character selector 3420 is selected.

At this time point, "1" stored in the flip-flop 3452 is placed in the flip-flop 3453, while the flip-flop 3452 holds the concatenate coincidence signal 3350 of "0".

Upon fetching of succeeding "T", the concatenate filtering table 3302 is accessed with a concatenate character string "AT", whereby the leading flag of "0" and the designation flag of "1" are outputted. Since the flip-flop 3453 holds "1" at this time point, both the concatenate coincidence signal 3350 and the output select signal 3461 assume the value "1". Consequently, the Y-port of the character code selector 3420 is selected, whereby the first character code 3100 of "A" is outputted to the character string matching means 102 through the output gate 3410. Thus, the flip-flop 3452 holds "1" while the flip-flop 3453 holds "0" to thereby allow the first character code 3100 to be outputted also in the next processing.

When the succeeding code "0" (space) is fetched, the concatenate filtering table 3302 is accessed with a concatenate character string "T ", as a result of which the leading flag and the designation flag each of "0" are outputted. Thus, the concatenate coincidence signal 3350 is "0". However, because the output of the flip-flop 3452 is "1", the output select signal 3461 assumes the value of "1". As a consequence, the first character code 3100 of "T" is outputted to the character string matching means 102 through the output gate 3410. Further, the concatenate coincidence signal 3350 of "0" is held at the flip-flop 3452, while the flip-flop 3453 is placed with "1" outputted from the flip-flop 3452. Thus, starting from the next processing, the Y-port of the character code selector 3420 is selected, whereby the first character code 3100 is inhibited from being outputted until the concatenate character string included in the search term makes appearance. However, the output gate remains opened for the output select signal 3461 of "1". Subsequently, "R", "E" and "S" are fetched successively as in the case of the sixth embodiment, whereon the corresponding concatenate character strings "R", "RE" and "ES" are checked, respectively. However, because the concatenate coincidence signal 3450 is "0" for all these strings, no output is delivered to the character string matching means 102.

Upon fetching of the next character "E", the concatenate filtering table 3302 is accessed with the concatenate character string "SE",whereby the concatenate coincidence signal 3350 of "1" is outputted and the output select signal 3461 assumes "1". Consequently, the Y-port of the character code selector 3420 is selected, whereby the first character code 3100 of "S" is delivered to the character string matching means 102 from the output gate 3410, while the concatenate coincidence signal 3350 of "1" is held by the flip-flop 3452. Thus, the first character code 3100 is outputted also in the succeeding processing.

Next, when "R" is fetched, the concatenate filtering table 3302 is accessed with a concatenate character string of "ER", whereby the concatenate coincidence signal 3350 of "0" is outputted. However, because the output of the flip-flop 3452 is "1", the first character code 3100 of "E" is outputted to the character string matching means 102. At this time point, the output "1" of the flip-flop 3452 is held by the flip-flop 3453, while the flip-flop 3452 is placed with "0" of the concatenate coincidence signal 3350.

Next, "V" is fetched and "0" is outputted as the concatenate coincidence signal 3350. Since the output of the flip-flop 3452 is "0" with that of the flip-flop 3453 being "1", the output select signal 3461 assumes the value of "1". Accordingly, the delimiter at the X-prot is selected in the character code selector 3420 to be subsequently outputted to the character string matching means 102 through the output gate 3410. At the same time, "0" is held at the flip-flop 3453.

Thereafter, "A" is fetched. However, since the corresponding concatenate character string renders the concatenate coincidence signal 3350 to be "0", no output is produced for the character string matching means 102.

Next, upon fetching of "T", the concatenate character string "AT" renders the corresponding concatenate coincidence signal 3350 to be "0", because the leading flag is "0". Consequently, no output is delivered to the character string matching means 102.

Further, succeeding characters "I", "N", " " (space), "S", "Y","S", "E" and "M" as fetched are all discarded because the corresponding concatenate character strings are not included in the search term.

As is apparent from the above description, the input text reading "SEAT RESERVATION SYSTEM" undergoes filtering to be outputted as "SEAT/SE/AT/". Thus, the matching processing can be performed without incurring erroneous matching even when "EATS" is designated as the search term.

In other words, according to the instant embodiment, the filtering which precludes erroneous matching can be realized simply by adding a small quantity of circuit hardware to the fifth embodiment, whereby the character string matching means 102 can be implemented by using a memory of low price. Thus, there can be provided a high-speed character string retrieval system at a low cost.

As is apparent from the above description, the input text of 23 characters "SEAT RESERVATION SYSTEM" is filtered, whereby the eight characters "SEAT/SE/" are outputted. In other words, the character strings having the leading character string such as "AT" which is out of coincidence is sieved out by the filtering means and inhibited from being inputted to the character string matching means 102. In this manner, the number of the characters contained in the output text is decreased to eight characters in contrast to the sixth embodiment in which the output text contains eight characters.

In other words, according to the instant embodiment, the filtering can be realized with a higher efficiency when compared with the sixth embodiment by virtue of the use of the concatenate leading string filtering table 3302, whereby the character string matching means 102 can be implemented by using a less expensive memory, which means that a high-speed character string retrieval system of lower cost can be provided.

Next, an eighth embodiment incarnating the principle of the present invention will be described.

Figure 26:
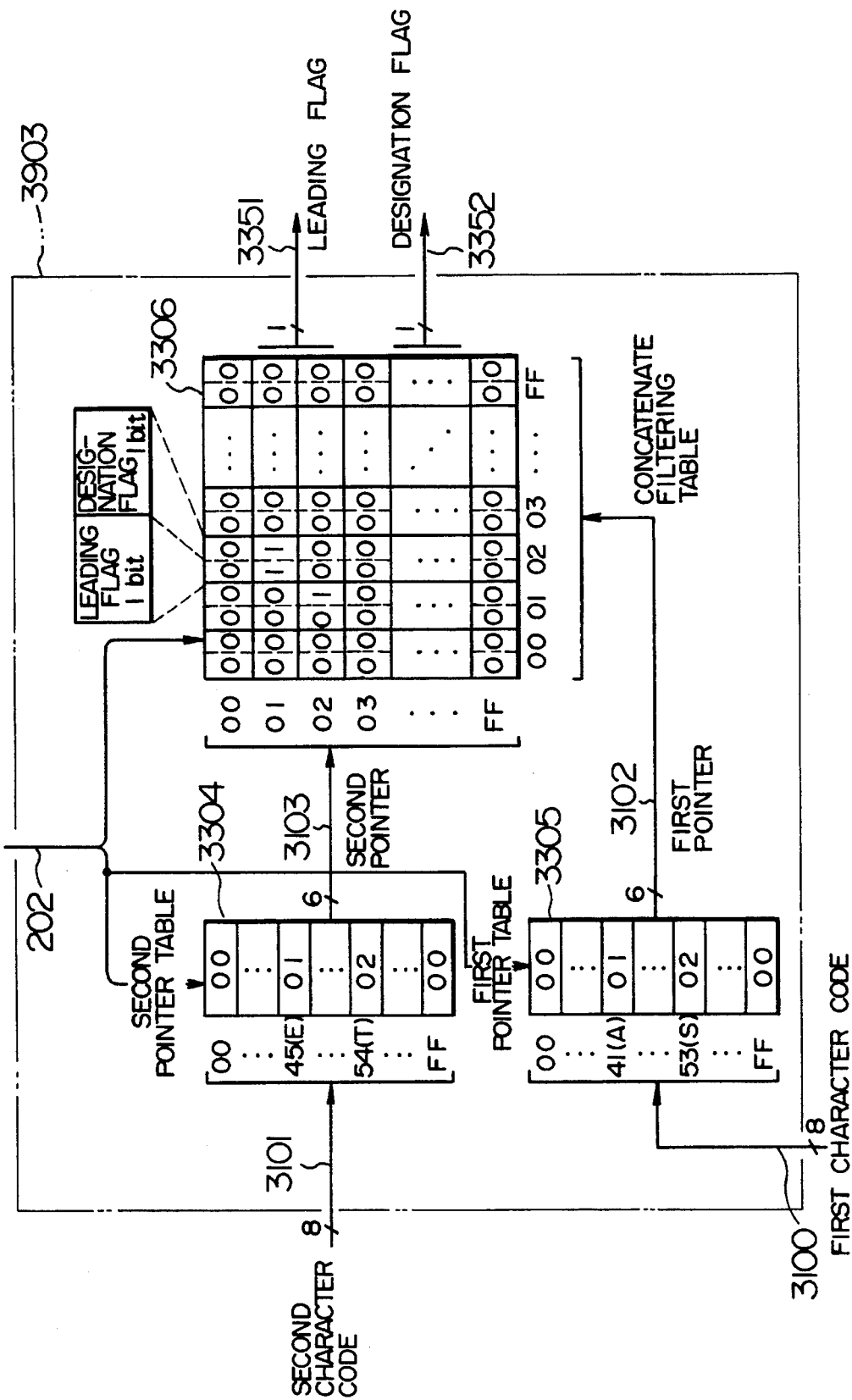
FIG. 26 is a diagram showing a concatenate coincidence circuit according to a further embodiment.

The instant embodiment differs from the seventh embodiment only in respect to the concatenate coincidence circuit. More specifically, with the instant embodiment, it is contemplated to eliminate a disadvantage that the concatenate filtering table used in the concatenate coincidence circuit is of an enormous size and provide a filtering means which can be implemented with a small hardware quantity for the memory. In the case of the concatenate filtering table according to the fourth embodiment, the slots have to be provided in a number corresponding to that of all the concatenate character strings. Accordingly, in the case of a character code of one byte, the number of slots as required amounts to 256×256, i.e., 64K slots (131K bits) because there are 256 slots for one character. However, in practical applications, only a part of these slots is used, and thus the information is written very sparsely in the concrete filtering table. Under the circumstances, it is taught that the character codes designated in the search term are converted into serial numbers through code transformation or conversion to thereby allow the slots to be used compactly, starting from the first slot address, for the purpose of decreasing the number of the slots to be prepared. A concatenate coincidence circuit 3903 to this end is shown in FIG. 26.

The concatenate coincidence circuit 3903 is comprised of a first pointer table 3305, a second pointer table 3304 and a concatenate filtering table 3306.

The first pointer table 3305 is used for the code conversion of a first character code 3100, i.e., conversion to a first pointer 3102. To this end, the addresses of the first pointer table 3305 are in correspondence with the first character codes 3100, wherein the first pointer 3102 of six bits is outputted upon accessing the table.

The second pointer table 3304 is used for code conversion of the second character code 3101, i.e., conversion to the first pointer 3102. To this end, the addresses of the second pointer table 3304 are in correspondence with the second character codes 3101, wherein the second pointer of six bits is outputted for making access to the table.

The concatenate filtering table 3306 is addressed with the first pointer 3102 and the second pointer 3103, wherein the first pointer 3102 is accessed with six more significant bits with the second pointer 3103 being accessed with six less significant bits. In other words, the concatenate filtering table 3306 has the addresses each of 12 bits. Accordingly, the number of the slots is 4 K.

Thus, the amount of memory used in the concatenate coincidence circuit 3903 is 11K bits.

Figure 29:
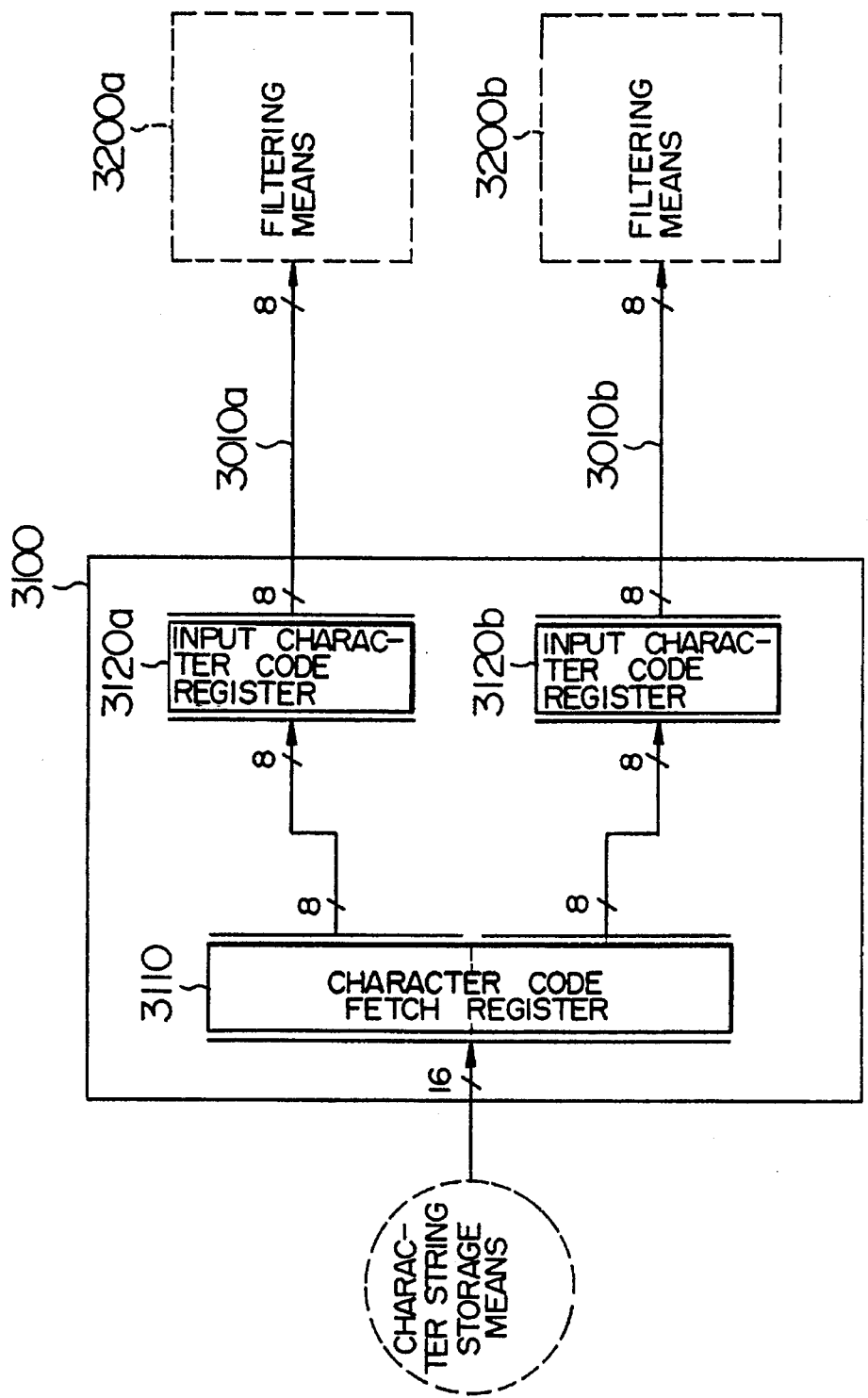
FIG. 29 is a block diagram showing a structure of a distributing means shown in FIG. 28.

A concrete example concerning the use of the table for the search term "SEAT" which is employed in the seventh embodiment is illustrated in FIG. 29. In the case of this example, the above-mentioned table is arranged for concatenate character strings "SE" and "AT" of a search term "SEAT".

Description will first be directed to a method of setting the first pointer table 3305. In this first pointer table 3305, the serial numbers of "S" and "A" which are first characters in concatenate character strings "SE" and "AT", respectively, are set. In the case of this example, the serial numbers representing "S" and "A" are "02" and "01", respectively. Each of these serial numbers is outputted as the first pointer 3102.

Next, a method of setting the second pointer table 3304 will be elucidated. In the second pointer table 3304, there are placed the serial numbers for "E" and "T" which are the second characters of the concatenate character strings "SE"

and "AT", respectively. In the case of the instant example, the serial numbers of "E" and "T" are represented by "01" and "02", respectively. Each of the serial numbers is outputted as the second pointer 3102.

In the concatenate filtering table 3306, there are set the leading flag and the designation flag in the slots indicated by the first pointer 3102 and the second pointer 3103 which correspond to the concatenate character strings "SE" "AT", respectively. For the concatenate character string "SE", the leading flag and the designation flag are set to "1" in the slots corresponding to the first pointer 3102 of "02" and the second pointer 3103 of "01", respectively. For the concatenate character string "AT", the leading flag is set to "0" with the designation flag being set to "1" in the slots corresponding to the first pointer 3102 of "01" and the second pointer 3103 of "02", respectively.

In the table settings described above, when "S" is first inputted as the input character, which is then followed by inputting of "E", the first character code 3100 becomes "S" with the second character code 3101 being "E".

At this time point, the first pointer table 3305 is addressed with "S" to thereby output "02" as the first pointer 3102. At the same time, the second pointer table 3304 is addressed with "E" to thereby output "01" as the second pointer 3103. Consequently, the concatenate filtering table 3306 is addressed with "02" of the first pointer 3102 and "01" of the second pointer 3103, whereby the leading flag and the designation flag each of "1" are outputted.

By operating the concatenate coincidence circuit 3903 in this manner, the concatenate leading filtering circuit can be realized similarly to the seventh embodiment. As will be appreciated from the above description, the memory quantity of 131K bits used in the fourth embodiment can be decreased by a factor of 1/10 to 11K bits. Thus, there can be provided a character string retrieval system which is more compact and less expensive than that of the fourth embodiments.

In the above description of the eighth embodiment, description has been made on the assumption that the character code of the concatenate character string consisting of two characters undergoes the code conversion from the character code to the serial number. It should however be understood that similar processing can be adopted for the concatenate character string consisting of n characters in more general terms.

Next, description will be made of a ninth embodiment which incarnates the principle of the present invention.

The instant embodiment differs from the seventh embodiment only in respect to the concatenate coincidence circuit, and it is intended with the instant embodiment to solve the problem that the size of the concatenate filtering table using the concatenate coincidence circuit becomes enormous and provide a filtering means which can operate with a small capacity of memory, as in the case of the eighth embodiment.

In the case of the eighth embodiment, the table becomes sparse as the types of the character codes as used increases, as with the case of the seventh embodiment.

Figure 27:
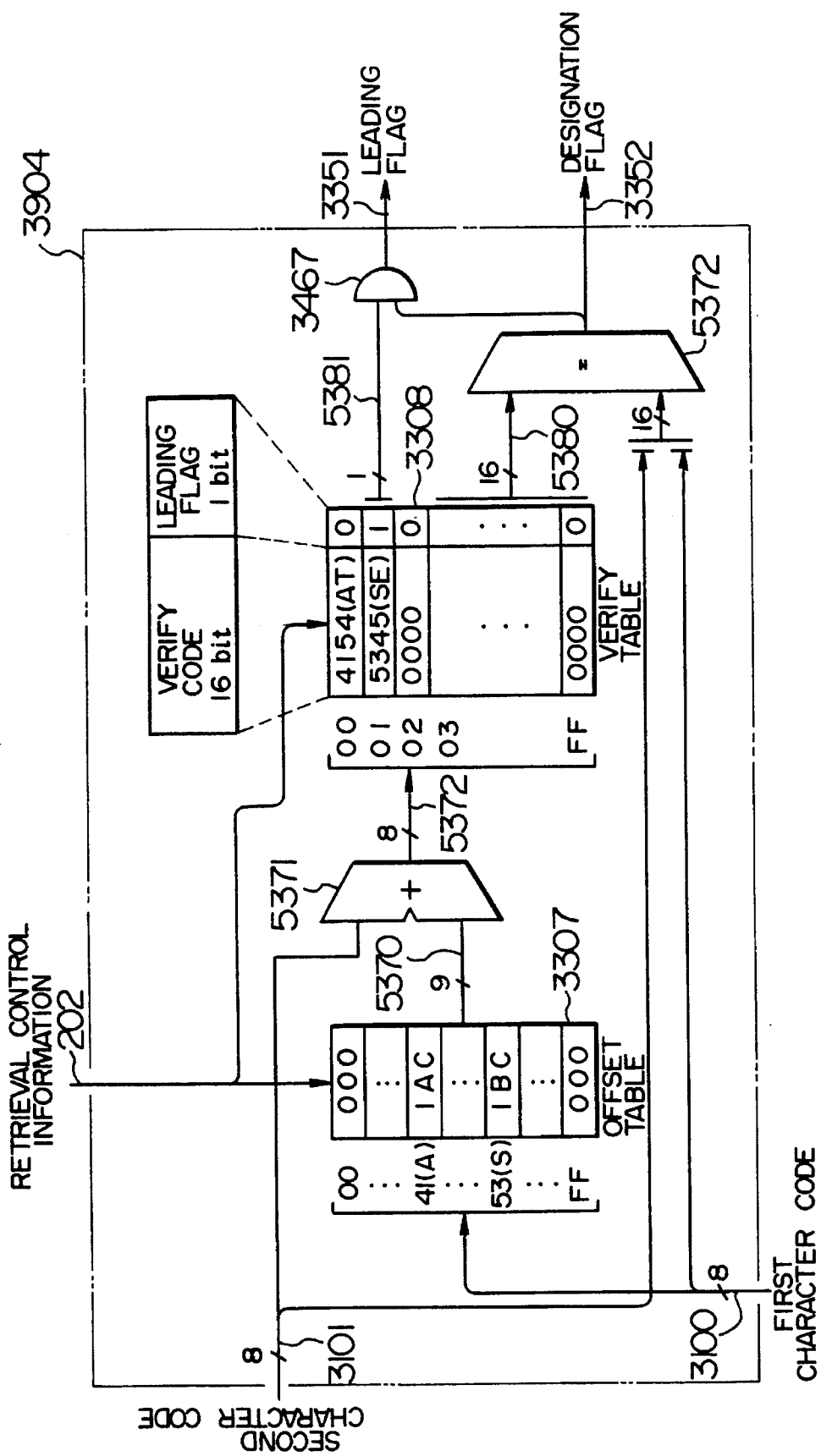
FIG. 27 is a diagram showing another structure of concatenate coincidence circuit.

For further enhancing the use efficiency of the table, it is necessary to decrease the slots to a number which corresponds to the number of types of the concatenate character strings. Such concatenate coincidence circuit 3904 is shown in FIG. 27. The concatenate coincidence circuit 3904 is comprised of an offset tale 3307, a verify table 3309, an adder 5371, a comparator 5372 and an AND gate 3351.

The address of the offset table 3307 is represented by a first character code, wherein an offset of 9 bits is placed in the corresponding slots. This offset represents a value resulting from subtraction of a second character code from the address at which a concatenate character string is placed.

The address of the verify table 3308 is given by a sum value obtained by adding together the offset 5370 and a second character code 3101. There are set in a corresponding slot a verify record of sixteen bits and a leading flag. As the verify code, a concatenate character string constituting a part of a search term is used.

Thus, the memory capacity as used by the concatenate coincidence circuit 3904 is 7K bits.

A concrete example of use of the table for a search term "SEAT" used in the eighth embodiment is illustrated in FIG. 27. In this case of the instant embodiment, the table is set for the concatenate character strings "SE" and "AT" of the search term "SEAT".

Description will be directed to the setting of the offset table 3307 and the verify table 3308. The concatenate character strings "SE" and "AT" are set separately because they differ from each other with regard to the first character.

In the first place, the concatenate character string "AT" will be considered. Since the first character is "A", the offset of the address of the offset table which corresponds to "A" is determined. At this time pint, the concatenate character string "AT" is placed in the slot of the verify table which has the address "00". Since the concatenate character string "AT" is not the leading concatenate character string, the leading flag is set to "0". Thus, a value "1AC" obtained by subtracting the character code "54" of the second character "T" from "0" is set as the offset.

Next, the concatenate character string "SE" will be considered. Since the first character is "S", the offset of the address of the offset table which corresponds to "S" is determined. At this time point, the concatenate character string "SE" is placed as the verify code in the slot of the verify table which has the address "01". Since the concatenate character string "SE" is the leading concatenate character string, the leading flag is set to "1". Thus, a value "1BC" obtained by subtracting the character code "45" of the second character "E" from "1" is set as the offset, while "0" is set in the other slots.

Further, for the concatenate character strings having first same characters, respectively, e.g., as in the case of "SE" and "SA", the address of the verify table which is not used for "SA" having the second character which is the most significance is checked to determine the offset. On the basis of the address mentioned above, it is checked whether or not the address of the verify table which corresponds to a value obtained by adding the first mentioned address with an absolute value of difference between the second character codes of "SE" and "SA", i.e., a value obtained by subtracting "A" from "E", is used. When the address of concern is not occupied, the concatenate character string "SE" is set at this address as the verify code, and the leading flag is set to "1" when the concatenate character string is the leading one while otherwise to "0". On the other hand, unless the address of concern is occupied, the address of the verify table for "SA" set first in the table and having the second character which is of the most significance is altered. This processing is repetitively executed until all the concatenate character strings having the same leading character have been set.

In the state set in the manner described above, it is assumed that "S" is first inputted as the input character, which is then followed by the inputting of "E". Then, the first character code 3100 represents "S" while the second character code 3101 represents "E". On this condition, the offset table 3307 is addressed with "S", whereby "1BC" is outputted as the offset. Subsequently, the second character code "E" and the offset "1BC" are added together by the adder 5371, as a result of which "01" is outputted as the address of the verify table 3308. Consequently, "SE" is outputted from the verify table 3308 as the verify code 5380 while "1" is outputted as the leading flag 5381. At this time point, comparison is performed by the comparator 5372 to determine whether or not equality exists between the verify code and a sixteen-bit code which includes the first character code 3100 as a more significant byte and the second character code 3101 as a less significant byte. Since the equality is determined, "1" is outputted as the designation flag. Furthermore, "1" is outputted as the leading flag 3351.

By operating the concatenate coincidence circuit 3904 in this manner, a leading concatenate string filtering circuit can be realized as in the case of the eighth embodiment. Thus, the memory capacity of 11K bits used in the fourth embodiment can be diminished by a factor of about ½ to 7K bits, whereby a less expensive and more compact character string retrieval system can be provided when compared with that of the eighth embodiment.

In this way, there can be presented a high-speed character string retrieval system of low cost by providing only a small-scale filtering circuit, which system can enjoy an enhanced matching throughput notwithstanding of the fact that a high-speed memory is not used in the character string matching means.

Another mode for carrying out the present invention will be described below.

According to the instant embodiment, parallel filtering means 3000 are provided between a character string storage means 105 and a character string matching means 102 in a character string retrieval system 1, wherein a plurality of filtering circuits are operated in parallel for discarding those character codes with are not contained in a search term, for the purpose of enhancing the throughput of the filtering processing and hence the matching throughput in the equivalent sense.

Figure 28:
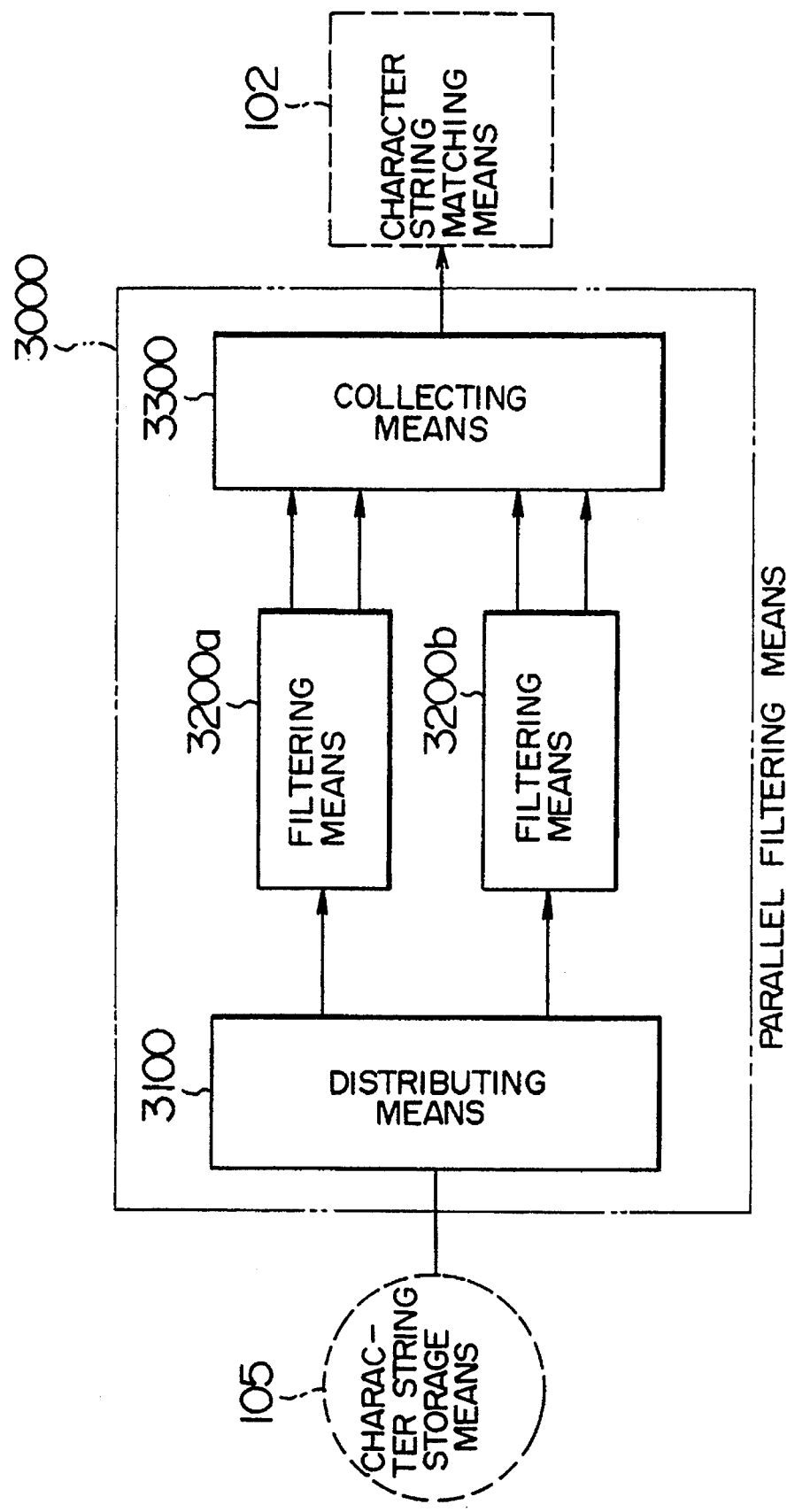
FIG. 28 is a diagram showing a structure of a parallel filtering means according to a still further embodiment.

An exemplary structure of the parallel filtering means 3000 employed in the instant embodiment is shown in FIG. 28.

The parallel filtering mans 3000 is comprised of a distributing means 3100, filtering means 3200a and 3200b and a collecting means 3300.

At first, operation of the parallel filtering means 3000 will be described in brief.

The distributing means 3100 fetches a text from the character storage means 105 on a two-by-two byte basis and sends the bytes to the two filtering means 3200a and 3200b each on a one-byte basis.

In each of the filtering means 3200a and 3200b in the instant embodiment, every time a character is inputted from the distributing means 3100, the character is compared with a search term to thereby make decision as to whether the character is same as one contained in the search term, and the result of the comparison is outputted to the collecting means 3300 as a coincidence flag together with the character code. More specifically, when an input character code coincides with a character included in a search term, a coincidence flag for that one character is set to "1" and outputted. If otherwise, the coincidence flag is set to "0".

The collecting means 3300 performs output control processing for two characters en bloc on the basis of the character codes and the coincidence flags outputted from the filtering means 3200a and 3200b.

The parallel filtering means 3000 operates as briefed above.

Next, description in concrete will be made of structures and operations of the distributing means 3100, the filtering means 3200a and 3200b and the collecting means 3300.

A structure of the distributing means 3100 according to the instant embodiment is shown in FIG. 29. The distributing means in the instant embodiment is shown in FIG. 29. The distributing means 3100 in the instant embodiment is comprised of a character code fetching register 3110 and input character code registers 3120a and 3120b.

The distributing means 3100 fetches a text from the character string storage means 105 by two bytes at one time and stores them in the character code fetch register 3110. In a succeeding step, one more significant byte of the two bytes stored in the character code fetch register 3110 is stored in the input character code register 3120a, while the one less significant byte is stored in the input character code register 3120b, which bytes are then outputted to the filtering means 3200a and 3200b via data lines 3010a and 3010b, respectively, whereon two succeeding bytes are newly fetched into the character code fetch register 3110.

FIG. 30 illustrates, by way of example, operation of the distributing means 3100 on the assumption that a text reading "HIGH]-SPEED SCSI BUS CONTROLLER" is inputted.

At first, through a first input operation, two leading bytes "HI" are placed in the character code fetch register 3110. Next, immediately before a second input operation, the first byte "H" of the two bytes "HI" stored in the character code fetch register 3110 is stored in the input character code register 3120a, while the second byte "I" is stored in the input character code register 3120b, whereon both bytes are outputted to the filtering means 3200a and 3200b via the data lines 3010a and 3010b, respectively. In the second input operation, succeeding two bytes "GH" are newly fetched by the character code fetch register 3110. Subsequently, the distributing means 3100 fetches the text on a two-by-two byte basis and outputs the text to the filtering means 3200a and. 3200b sequentially on a one-by-one byte basis through the similar procedure. Now, the structure and operation of the distributing means 3100 can be understood from the above.

Next, description will turn to the structure and operation of the filtering means 3200a and 3200b.

Since each of the filtering means 3200a and 3200b is constituted by a same circuit, it will be sufficient to describe the structure and operation of the filtering means 3200a as the representative.

Figure 31:
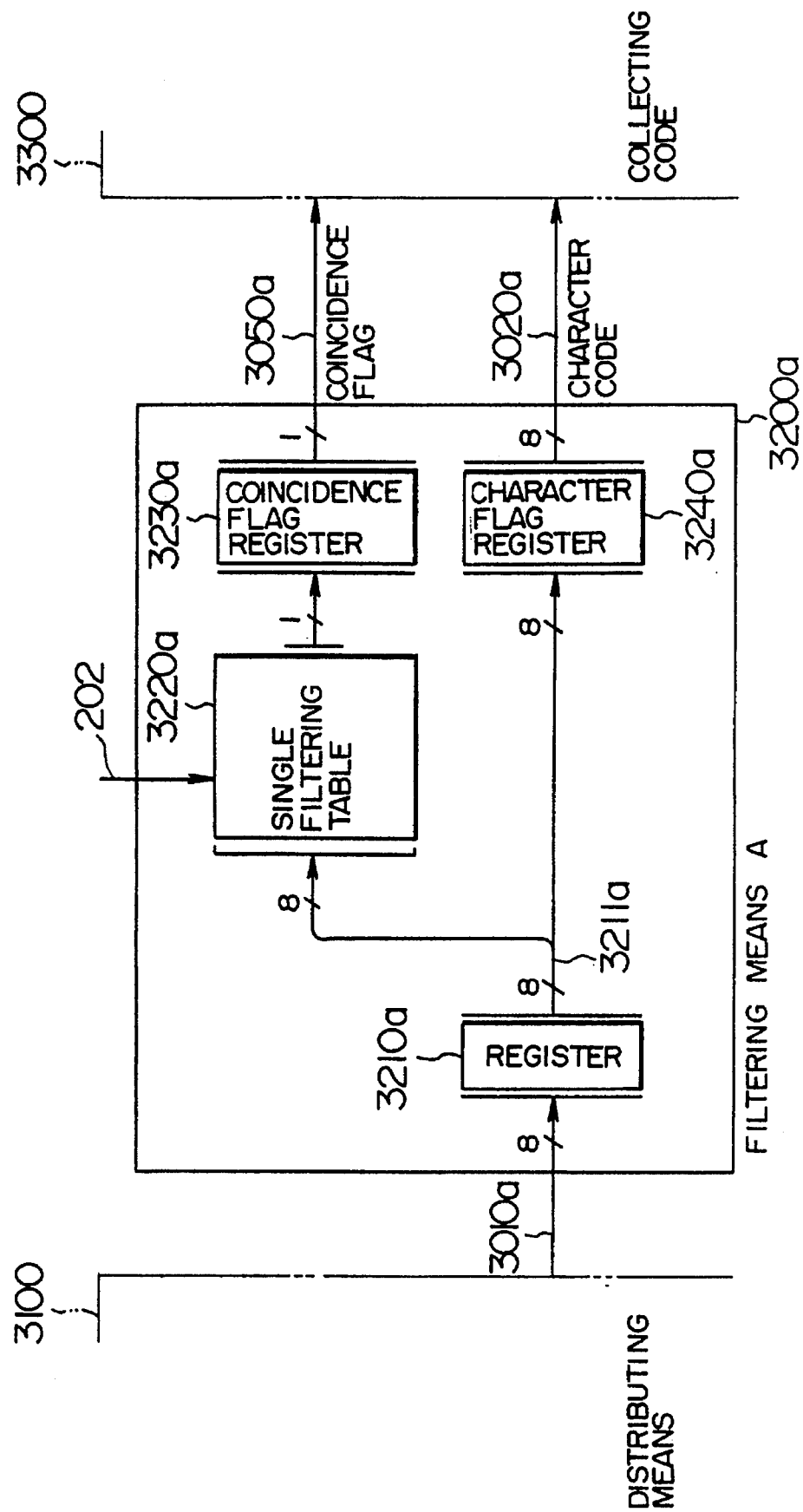
FIG. 31 is a diagram showing in detail a structure of a filtering means.

FIG. 31 shows a structure of the filtering means 3200a. As can be seen, the filtering means 3200a is comprised of a register 3210a, a single filtering table 3220a, a coincidence flag register 3230a and a character code register 3240a.

At first, as the initialization, coincidence flag of "1" is placed in those slots of the single filtering table 3220a which correspond to the character codes included in a search term while the other slots are placed with "0". Assuming, by way of example, that "BUS" is given as the search term, contents shown in FIG. 32 are set to the single filtering table 3220a. More specifically, each of those slots which correspond to the individual character codes "B", "U" and "S" constituting "BUS" is placed with the coincidence flag "1".

The filtering operation is started by fetching the character code from the distributing means 3100 to the register 3210a on a one-by-one byte basis.

The character code 3211a outputted from the register 3210a is stored intactly in the character code register 3240a to be subsequently outputted to the collecting means 3300 via the data line 3020a. On the other hand, the single filtering table 3220a is accessed with the character code 3211a as the address for referencing, whereby the coincidence flag is stored in the coincidence flag register 3230a. More specifically, when the character code 3020a is the one which constitutes a part of the search term, "1" is read out from the coincidence flag register 3230a while "0" being read out therefrom for the other character code to be outputted to the collecting means 3300 via the data line 3030a.

FIG. 33 illustrates in concrete the operation of the filtering means on the assumption that "BUS" is given as the search term and that "HIGH-SPEED SCSI BUS CONTROLLER" is inputted as the text.

At first, in the first input operation, "H" is fetched into the filtering means 3200a from the distributing means 3100 to be stored in the register 3210a. On the other hand, "I" is fetched in the filtering means 3200b to be store in the register 3210b. Immediately before the second input operation, "H" is outputted as the character code 3211a from the register 3210a of the filtering means 3200a. Thus, single filtering table 3220a is accessed with "H". However, since "H" is a character code which is not included in the search term, the coincidence flag having the value of "0" is stored in the coincidence flag register 3230a to be subsequently outputted to the collecting means 3300 via the data line 3030a. Further, the character code "H" is stored in the character code register 3240a to be subsequently outputted to the collecting means 3300 via the data line 3020a.

Similarly, in the filtering means 3200b, "I" is outputted from the register 3210b as the character code 3211b. Consequently, the single filtering table 3220b is accessed with "I". However, since "I" is not included in the search term either, "0" is stored in the coincidence flag register 3230a to be subsequently outputted to the collecting means 3300 via the data line 3020b. Further, as the character code, "I" is stored in the character code register 3240b to be subsequently outputted to the collecting means 3300 via the data line 3020b.

In the second input operation, "G" is fetched in the filtering means 3200a from the distributing means 3100 to be stored in the register 3210a. Additionally, "H" is fetched by the filtering means 3200b to be stored in the register 3210b.

Subsequently, through the similar procedure, the character code is fetched by the filtering means 3200a and 3200b from the distributing means 3100 each on a one-by-one byte basis to be outputted to the collecting means 3300 as the character codes 3020a and 3020b, respectively. Further, these character codes are compared with the search term to thereby make decision as to whether or not there coincide with any character included in the search term. When-same characters are found, the coincidence flags 3030a and 3030b of "1" are set for the characters, respectively, while the coincidence flags of "0" are set to the other characters, where the coincidence flags are outputted to the collecting means 3300.

From the above, the structure and operation of the filtering means 3200a and 3200b will be understood.

FIG. 34 shows a structure of the collecting means 3300 according to the instant embodiment. More specifically, the collecting means 3300 according to the instant embodiment is comprised of flag registers 3310a and 3310b, character code registers 3320a and 3320b, an OR circuit 3330, flag buffers 3340a and 3340b, character code buffers 3350a and 3350b, a filtering control circuit 3360 and a character selector 3370.

The coincidence flags 3030a and 3030b outputted from the filtering means are stored in the flag registers 3310a and 3310b, respectively. Further, the character codes 3020a and 3020b are once stored in the character code register 3320a and 3320b, respectively. When at least one of two characters as fetched passes through the filtering, i.e., when a logical sum of the two coincidence flags, the coincidence flags stored in the flag registers 3310a and 3310b are placed in the flag buffers 3340a and 3340b, while the character codes stored in the output character code buffers 3350a and 3350b stored in the output character code registers 3320a and 3320b are placed in the character code buffers 3350a and 3350b, respectively. When both the two characters as fetched are deleted through filtering, i.e., when a logical sum of the two coincidence flags is "0", such processing is performed to prevent the coincidence flags and the character codes corresponding to these two characters from being fetched in the flag buffer 3340a and 3340b and the character code buffers 3350a and 3350b.

The filtering control circuit 3360 responds to the input values of the coincidence flags 3303a and 3303b, read out from the flag buffers 3340a and 3340b, to thereby output a read ,enable (RE) signal 3301 for the flag buffers 3340a and 3340b and for the character code buffers 3350a and 3350b as well as a select signal 3302 for the character code selector 3370. More specifically, the read enable (RE) signal 3301 of "1" is outputted at the timing at which the coincidence flags and the character codes are read out from the flag buffers 3340a and 3340b and the character code buffers 3350a and 3350b. The select signal 3302 for the character code selector 3370 is set to "0" when the character code 3304a (X-port) outputted from the character code buffer 3350a is to be selected, while it is set to "1" when the character code (Y-port) 3304a outputted from the character code buffer 3350b is to be selected.

The character code selector 3370 selects the character code outputted as the result of filtering in dependence on the value of the select signal 3302 outputted from the filtering control circuit 3360. In other words, when the value of the select signal 3302 is "0", the character code 3304a (X-port) outputted from the character code buffer 3350a is selected, while the character code 3304b (Y-port) outputted from the character code buffer 3350b is selected when the value of the select signal 3302 is "1".

FIG. 35 shows a structure of the filtering control circuit 3360. As can be seen, the filtering control circuit 3360 according to the instant embodiment is composed of a filtering control decoder 3361 and a two-character pass flag register 3362.

FIG. 36 illustrates generally operation of the filtering control circuit 3360. The filtering control decoder 3361 receives as the inputs thereto a two-character pass flag 3363 outputted in the preceding step from the two-character pass flag register 3362, an output 3303a from the flag buffer 3340a and an output 3303b from the flag buffer 3340b to thereby generate a two-character pass flag 3364 of the current step, the select signal 3302 for the character code selector 3370 and the read enable (RE) signal 3301 which are then outputted from the filtering control decoder 3361. In the two-character pass flag register 3362, there is stored "0"

as the initial value.

At first, when the output 3303a of the flag buffer 3340a is "0" with the output 3303b of the flag buffer 3340b being "1", only the character code 3304b outputted from the character code buffer 3350b is delivered to the character string matching means 102. In other words, "1" is outputted as the select signal 3302 for the character code selector 3370, with the read enable (RE) signal of "1" being outputted.

On the other hand, in case the output 3303a of the flag buffer 3340a is "1" with the output 3303b of the flag buffer 3340b being "0", only the character code 3304a outputted from the character code buffer 3350a is delivered to the character string matching means 102. More specifically, as the select signal 3302 for the character code selector 3370, "0" is outputted, while "1" is outputted as the read enable (RE) signal.

Further, when the output 3303a of the flag buffer 3340a is "1" with the output 3303b of the flag buffer 3340b being also "1", the character code 3304a outputted from the character code buffer 3350a is first delivered to the character string matching means 102, while the character code 3304b outputted from the character code buffer 3350b in the succeeding step is delivered to the character string matching means 102. In other words, "0" is outputted as the select signal 302 for the character code selector 3370 and "0" is outputted as the read enable (RE) signal, while "1" is outputted as the two-character pass flag 3364 of the current step. The two-character pass flag 3364 of the current step is once stored in the two-character pass flag register 3362, whereby "1" is outputted in the succeeding step as the two-character pass flag 3363 of the preceding step. In other words, when the value of the two-character pass flag 3363 is "1", the select signal 3302 of "1" for the character code selector 3370 is outputted together with the read enable (RE) signal of "1". Further, the two-character pass flag 3364 of the current step is outputted as "0".

Parenthetically, it can never occur that both the output 3303a from the flag buffer 3340a and the output 3303b from the flag buffer 3340b are simultaneously "0", because this contradicts the write conditions for the flag buffers 3340a and 3340b and the character code buffers 3350a and 3350b (the condition requiring a logical sum of the two coincidence flags outputted from the flag buffers 3340a and 3340b is "1").

Next, description in concrete of operation of the collecting means 3300 will be described on the assumption that "BUS" is given as the search term and that an input text reading "HIGH-SPEED SCSI BUS CONTROLLER" is inputted, by way of example.

FIG. 37 illustrate exemplary operations of the flag registers 3310a and 3310b, the character code registers 3320a and 3320b, the OR circuit 3330, the flag buffers 3340a and 3340b and the character code buffers 3350a and 3350b.

In the first input operation, "H" and "I" are fetched as the character codes from the filtering means 3200a and 3200b to be stored in the character code registers 3320a and 3320b, respectively. Since these two character codes are not included in the search term, the coincidence flag of "0" is placed in both the flag registers 3310a and 3310b, respectively.

Immediately before the second input operation, "0" is outputted from both the flag registers 3310a and 3310b. At that time, the output of the OR circuit 3330 is "0". In other words, since the two characters stored in the character code registers 3320a and 3320b, respectively, are not included in the search term, the character codes and the coincidence flags corresponding to these two characters are not fetched in the character code buffers 3350a and 3350b and the flag buffers 3340a and 3340b, respectively.

In the second input operation, "G" and "H" are placed in the character code registers 3320a and 3320b, respectively. Further, the coincidence flag of "0" is placed in both the flag registers 3310a and 3310b. However, since the output of the OR circuit 3330 is also "0" at this time, the character codes and the coincidence flags corresponding to these two characters are not fetched in the character code buffer 3350a and 3350b and the flag buffers 3340a and 3340b, respectively.

In the third input operation, character codes "-" and "S" are stored in the character code register 3320a and 3320b, respectively. In this case, although the character code "-" is not included in the search term "BUS", the character code "S" is included in the search term. Accordingly., the coincidence flag of "0" is placed in the flag register 3310a, while "1" is placed in the flag register 3310b. In other words, since the output from the OR circuit 3330 is "1" at this time point is "1", the character codes and the coincidence flags corresponding to these two characters are fetched in the character code buffers 3350a and 3350b and the flag buffers 3340a and 3340b, respectively.

Subsequently, through the similar process, the character codes of two bytes and the coincidence flags outputted from the filtering means 3200 are once stored in the character code registers 3320a and 3320b and the flag registers 3310a and 3310b, respectively. When at least one character code included in the search term exists in the character codes as stored, i.e., when the output of the OR circuit 3330 is "1", the corresponding coincidence flags and character codes are fetched in the character code buffers 3350a and 3350b and the flag buffers 3340a and 3340b.

FIG. 38 illustrates in concrete the operations of the filtering control circuit 3360 and the character code selector 3370.

In the first input operation, when the flag buffers 3340a and 3340b and the character code buffers 3350a and 3350b are not in the empty state, i.e., in the state immediately after the character codes "-" and "S" have been written in the character code buffers, the character codes "-" and "S" are read out from the character buffers 3350a and 3350b, respectively, while the coincidence flags 3303a and 3303b of "0" and "1", respectively, are read out from the flag buffers 3340a and 3340b, respectively. Further, "0" is read out as the two-character pass flag 3363 of the preceding step from the two-character pass flag register 3362.

The filtering control decoder 3361 responds to the inputs mentioned above to thereby output "0" as the two-character pass flag 3364, "1" as the select signal for the character code selector 3370 and "1" as the read enable (RE) signal 3301 for the flag buffer 3340a and 3340b and for the=character code buffers 3350a and 3350b (refer to FIG. 36). Further, "0" is placed in the two-character pass flag register 3362 as the two-character pass flag 3364 of the current step.

The character code selector 3370 is adapted to select the character code outputted through the filtering in dependence on the values of the select signal 3302. More specifically, since the select signal 3302 has the value of "1", the character code "S" (Y-port) which is outputted from the character code buffer 3350b is selected to be outputted to the character string matching means 102. Further, "0" is placed in the two-character pass flag register 3362 as the two-character pass flag 3364 of the current step.

In the second input step, since the read enable (RE) signal 3301 for the flag buffers 3340*a* and 3340*b* and the character code buffers 3350*a* and 3350*b* is "1", the values corresponding to two succeeding characters from the respective buffers, i.e., the character codes " " and "S" are read out from the character buffers 3350*a* and 3350*b*, respectively, while the coincidence flags 3303*a* and 3303*b* of "0" and "1", respectively, are read out from the flag buffers 3340*a* and 3340*b*, respectively. The filtering control decoder 3361 responds to the inputs mentioned above to thereby output "0" as the two-character pass flag 3364 of the current step, "1" as the select signal for the character code selector 3370 and "1" as the read enable (RE) signal 3301 for the flag buffer 3340*a* and 3340*b* and for the character code buffers 3350*a* and 3350*b* (refer to FIG. 36), as described previously. More specifically, since the value of the select signal 3302 is "1", the character code selector 3370 selects "S" (Y-port) which is the output from the character code buffer 3350. Further, "0" is placed in the two-character pass flag register 3362 as the two-character pass flag 3364 of the current step.

In the third input step, since the read enable (RE) signal 3301 for the flag buffers 3340*a* and 3340*b* and the character code buffers 3350*a* and 3350*b* is "1", the values corresponding to two succeeding characters from the respective buffers, i.e., the character codes "C" and "S" are read out from the character buffers 3350*a* and 3350*b*, respectively, while the coincidence flags 3303*a* and 3303*b* of "0" and "1", respectively, are read out from the flag buffers 3340*a* and 3340*b*, respectively. The filtering control decoder 3361 responds to the inputs mentioned above to thereby output "0" as the two-character pass flag 3364 of the current step, "1" as the select signal for the character code selector 3370 and "1" as the read enable (RE) signal 3301 for the flag buffer 3340*a* and 3340*b* and for the character code buffers 3350*a* and 3350*b* (refer to FIG. 36), as described previously. More specifically, since the value of the select signal 3302 is "1", the character code selector 3370 selects "S" (Y-port) which is the output from the character code buffer 3350. Further, "0" is placed in the two-character pass flag register 3362 as the two-character pass flag 3364 of the current step.

In the fourth input step, since the read enable (RE) signal 3301 for the flag buffers 3340*a* and 3340*b* and the character code buffers 3350*a* and 3350*b* is "1", the values corresponding to two succeeding characters from the respective buffers, i.e., the character codes "B" and "U" are read out from the character buffers 3350*a* and 3350*b*, respectively, while the coincidence flags 3303*a* and 3303*b* of "1" and "1", respectively, are read out from the flag buffers 3340*a* and 3340*b*, respectively. The filtering control decoder 3361 responds to the inputs mentioned above to thereby output "1" as the two-character pass flag 3364 of the current step, "0" as the select signal 3302 for the character code selector 3370 and "0" as the read enable (RE) signal 3301 for the flag ! buffer 3340*a* and 3340*b* and for the character code buffers 3350*a* and 3350*b* (refer to FIG. 36), as described previously. In other words, since the value of the select signal 3302 is "0", the character code selector 3370 selects "B" (X-port) which is the output from the character code buffer 3350*a*. Further, "1" is placed in the two-character pass flag register 3362 as the two-character pass flag 3364 of the current step.

In the fifth input step, since the read enable (RE) signal 3301 for the flag buffers 3340*a* and 3340*b* and for the character code buffers 3350*a* and 3350*b* is "0", the values corresponding to two succeeding characters from the respective buffers, the character codes "B" and "U" remain in the state where the coincidence flags 3303*a* and 3303*b* of "1" and "1", respectively, are read out from the flag buffers 3340*a* and 3340*b*, respectively. Further, as the two-character pass flag 3364 of the preceding step, the two-character pass flag 3362 of "1" is outputted. The filtering control decoder 3361 responds to the inputs mentioned above to output "0" as the two-character pass flag 3364 of the current step, "1" as the select signal 3302 for the character code selector 3370 and "1" as the read enable (RE) signal 3301 for the flag buffer 3340*a* and 3340*b* and for the character code buffers 3350*a* and 3350*b* (refer to FIG. 36), as described previously. In other words, since the value of the select signal 3302 is "0", the character code selector 3370 selects "U" (Y-port) which is the output from the character code buffer 3350*b*. Further, "0" is placed in the two-character pass flag register 3362 as the two-character pass flag 3364 of the current step.

In the sixth input step, since the read enable (RE) signal 3301 for the flag buffers 3340*a* and 3340*b* and for the character code buffers 3350*a* and 3350*b* is "1", the values corresponding to two succeeding characters from the respective buffers, the character codes "S" and " " are read out from the flag buffers 3340*a* and 3340*b*, respectively. Further, "1" and "0" are read out as the coincidence flags 3303*a* and 3303*b* as "1" and "0", respectively. The filtering control decoder 3361 responds to the inputs mentioned above to output "0" as the two-character pass flag 3364 of the current step, "0" as the select signal 3302 for the character code selector 3370 and "1" as the read enable (RE) signal 3301 for the flag buffer 3340*a* and 3340*b* and for the character code buffers 3350*a* and 3350*b* (refer to FIG. 36), as described previously. In other words, since the value of the select signal 3302 is "0", the character code selector 3370 selects "S" (Y-port) which is the output from the character code buffer 3350*a*.

In the foregoing, the structure and the operation of the parallel filtering means 3000 according to the instant embodiment has been described.

As can be understood from the foregoing, according to the instant embodiment in which a pair of the filtering circuits are operated in parallel, the input text of thirty characters "HIGH-SPEED SCSI BUS CONTROLLER" can be filtered out as six characters "SSSBUS" included in the search term through filter processing cycles. In other words, when compared with the system in which the filtering circuit means is not parallelized, the number of processing cycles for the filtering can be diminished by a factor of $^{15}/_{30}$, i.e., ½, whereby the matching throughput of the character retrieval system can be enhanced twice as high.

In conjunction with the instant embodiment, description has been made on the assumption that the single filtering circuit is operated in parallel in the case where the appearance of a discontinuation character is not inserted in the form of the delimiter mark (delimiter). It is however obvious that same holds true for the cases where the other filtering circuits such as the single filtering circuits and the single leading character filtering circuits where the delimiter is inserted are operated in parallel with each other.

In the description of the instant embodiments, it has been assumed that two filtering means are operated in parallel. However, it will be appreciated that a method similar to that of the instant embodiment can equally be realized even when three or more filtering means adapted to be operated in parallel are employed.

Further, although the instant embodiment has been described on the assumption that the input text is represented by characters each of one byte, the principle of the invention applied to the instant embodiment holds true even in the case when the input text is represented by two-byte characters.

In this manner, according to the instant embodiment in which a pair of the filtering circuits are operated in parallel, the input text, for example, of thirty characters "HIGH-SPEED SCSI BUS CONTROLLER" can be filtered out as six characters "SSSBUS" included in the search ten through filter processing cycles. In other words, when compared with the system in which the filtering circuit means is not parallelized, the number of processing cycles for the filtering can be diminished by a factor of $^{15}/_{30}$, i.e., ½, whereby the matching throughput of the character retrieval system can be enhanced twice as high when compared with the conventional one.

We claim:

1. A text search system for deciding en bloc whether or not a plurality of user-designated search terms exist in a text composed of characters expressed in the form of character codes, characterized in that said system comprises:
  character string storage means for storing a text;
  filtering means for fetching character codes from the text read out from said character string storage means to thereby output only those character codes that are included in said search terms;
  character string matching means for matching en bloc a string of character codes outputted from said filtering means with said search terms to thereby decide whether or not said search terms exist in said string of character codes outputted from said filtering means; and
  synchronizing means provided between said filtering means and said character string matching means for buffering differences in processing speed while transferring data from said filtering means to said character string matching means.

2. A text search system set forth in claim 1, characterized in that said filtering means includes flag storage means for setting a value of "1" indicating "ON" in slots corresponding to the character codes of the characters included in the search terms designated previously while setting a value of "0" indicating "OFF" in slots corresponding to the other character codes; and
  output select means for referencing said flag storage means in correspondence to a character code inputted on a one-by-one Character code basis from said character string storage means to thereby output to said character string matching means a character code only when a relevant flag as read out from said flag storage means is "ON".

3. A text search system set forth in claim 2, characterized in that said output select means further includes delimiter code output means for referencing said flag storage means in correspondence to a character code inputted from said character string storage means to thereby inhibit the character code from being outputted when the relevant flag is "OFF" while outputting to said character string matching means a particular delimiter code only when an output flag of said flag storage means which corresponds to an immediately preceding input character code is "ON".

4. A text search system set forth in claim 1, characterized in that said filtering means include leading character flag storage means for setting a value indicating "ON" in a slot corresponding to a leading character code of a search term designated previously while setting a value indicating "OFF" in slots corresponding to the other character codes, and trailing character flag storage means for setting a value indicating "ON" in slots corresponding to other character codes than said leading character code of those character codes which are included in said search term while setting a value indicating "OFF" in slots corresponding to the other character code; and that
  said system further comprises output select means for referencing said leading character flag storage means and said trailing character flag storage means in correspondence to a character code inputted from said character string storage means to thereby output the character code to said character string matching means only when the relevant leading character flag as read out is "ON", while when said leading character flag once assumed "ON", said output select means outputs an input character code to said character string matching means only when either the relevant leading character flag or trailing character flag is "ON" before both of said leading character flag and said trailing character flag become "OFF".

5. A text search system set forth in claim 4, characterized in that said output select means further includes delimiter code output means for outputting a particular delimiter code to said character string matching means only when said leading character flag and trailing character flag corresponding to character codes as inputted are "OFF" and when said leading character flag and trailing character flag corresponding to character codes inputted in precedence by one character are "ON".

6. A text search system set forth in claim 1 further comprising, text search system further comprises first-in/first-out type buffering means for storing a string of character codes outputted from said filtering means and then outputting said stored string of character codes to said character matching means in dependence on the processing state of said character string matching means.

7. A text search system set forth in claim 6, characterized in that said buffering means includes first-in/first-out type buffer means.

8. A text search system set forth in claim 6, characterized in that said buffering means includes exchange buffering means.

9. A text search system for deciding en bloc whether or not a plurality of user-designated search terms exist in a text composed of characters expressed in the form of character codes, characterized in that said system comprises:
  character string storage means for storing a text;
  concatenate filtering means for fetching character codes sequentially from the text read out from said character string storage means to thereby make decision as to whether or not n, where n represents an integer not smaller than 2, character codes as fetched are included in said search terms as a concatenate character string and output said n concatenate character codes only when said codes are included in said search terms;
  character string matching means for deciding by matching en bloc whether or not said search terms exist in a compound character string composed of a chain of the character strings each constituted by n concatenate character codes outputted from said concatenate filtering means; and
  synchronizing means provided between said concatenate filtering means and said character string matching means for buffering differences in processing speed while transferring data from said concatenate filtering means to said character string matching means.

10. A text search system set forth in claim 9, characterized in that the n concatenate character codes fetched from said character string storage means are divided into a first character code string, referred to as a leading text code string including m character codes as counted from the leading one of said n concatenate character codes, inclusive of said leading code, and a second character code string, referred to as a trailing text code string, including n–m character codes succeeding to said leading text code string, said concatenate filtering means including:
   offset storage means which is accessed with an address represented by said leading text code string and which stores therein undermentioned offset values;
   offset adding means for determining a sum of an offset value outputted from said offset storage means and said trailing text code string;
   verify storage means for storing n concatenate character codes contained in the search terms as designated, said verify storage means being accessed by using the output of said offset addition means as an address; and
   character code string comparing means for comparing the n concatenate character codes read out from said verify storage means with n concatenate character codes read out from said character string storage means, to thereby output a coincidence signal when said comparison results in coincidence;
   wherein said offset storage means stores the offset values in slots which are accessed by using as addresses m character codes, referred to as a leading term code string, as counted from the start of the n concatenate character codes, referred to as a term code string, contained in the designated search term, said offset values being obtained by subtracting from address values of the slots of said verify storage means in which said term code string is stored the values of n–m character code strings, referred to as trailing term code strings, which succeed to the leading term code string of said term code string.

11. A text search system set forth in claim 9, characterized in that said concatenate filtering means is comprised of a pointer table for storing order numbers, referred to as serial numbers, allotted in correspondence to the character codes included in the search term designated previously in slots which can be accessed with addresses indicated by said character codes, and a concatenate filtering table storing flags indicating "ON" in slots accessed by using as addresses therefor codes each represented by a string of the serial numbers corresponding to n concatenate character codes, respectively, which are included in the designated search term while storing "OFF" in the other slots.

12. A text search system set forth in claim 9, characterized in that said concatenate filtering means includes flag storage means for setting a value indicating "ON" in slots corresponding to the character codes of the n concatenate characters included in the search term designated previously while setting a value indicating "OFF" in slots corresponding to the character codes of the other n concatenate characters; and that said system further comprises output select means for referencing said flag storage means in correspondence to n concatenate character codes inputted from said character string storage means to thereby output n concatenate character codes to said character string matching means only when the flag as read out from said flag storage means is "ON".

13. A text search system set forth in claim 12, characterized in that said output select means further includes delimiter code output means for outputting to said character string matching means a particular delimiter code only when said flag corresponding to the n concatenate character codes as inputted is "OFF" and when said flag corresponding to n concatenate character codes inputted immediately before is "ON".

14. A text search system set forth in claim 9, characterized in that said filtering means includes leading concatenate character flag storage means for setting a value indicating "ON" in slots corresponding to concatenate character codes of a leading portion, referred to as leading concatenate character code, of the search term designated previously while setting a value indicating "OFF" in slots corresponding to the other character codes, and trailing concatenate character flag storage means for setting a value indicating "ON" in slots corresponding to other concatenate character codes, referred to as trailing concatenate character codes, than said leading concatenate character codes contained in said search term while setting a value indicating "OFF" in a slot corresponding to the other concatenate character codes;

said system further comprising output select means for referencing said leading concatenate character flag storage means and said trailing concatenate character flag storage means in correspondence to n concatenate character codes inputted from said character string storage means sequentially, to thereby output said concatenate character codes to said character string matching means only when the relevant leading concatenate character flag as read out is "ON" while when said leading character flag once assumed "ON", said output select means outputs the input character codes to said character string matching means only when either the relevant leading character flag or trailing character flag is "ON" before both of said leading character flag and said trailing character flag become "OFF".

15. A text search system set forth in claim 14, characterized in that said output select means further includes delimiter code output means for outputting to said character string matching means a particular delimiter code only when said leading character string flag and said trailing character string flag corresponding to the n input concatenate character codes are "OFF" and when said leading character string flag and said trailing character string flag corresponding to n concatenate character codes immediately preceding to said n input character codes of "OFF" are "ON".

16. A text search system set forth in claim 9, wherein every time an input character code is fetched on a one-by-one character basis sequentially from the text read out from said character string storage means, said concatenate filtering means makes a decision as to whether or not the character codes of n characters fetched till then inclusive of said input character code are included in said search terms as a string of concatenate characters, for thereby outputting the character code fetched first of said n concatenate character codes to said character string matching means only when said character codes of n characters are decided as being included in said search terms as a concatenate character string.

17. A text search system set forth in claim 16, characterized in that said concatenate filtering means includes flag storage means for setting a value indicating "ON" in slots corresponding to the character codes of n concatenate characters which are included in the search terms designated previously while setting a value indicating "OFF" in slots corresponding to the character codes of the other n concatenate characters; and output select means, wherein every time the input character code is fetched on a one-by-one character basis sequentially from the text read out from said character string storage means, said output select means references said flag storage means in correspondence to the character codes of n characters fetched till then inclusive of said input character code, for thereby outputting the character code fetched first of said n concatenate character codes to said character string matching means only when the flag as read out is "ON".

18. A text search system set forth in claim 17, characterized in that said output select means further includes delimiter code output means, wherein every time an input character code is fetched on a one-by-one character basis sequentially from the text read out from said character string storage means, said delimiter code output means outputs a particular delimiter code to said character string matching means only when the flag corresponding to the character codes of n characters fetched till then inclusive of said input character code is "OFF" and when the flag corresponding to n character codes fetched up to a time when an input character code immediately preceding to the first mentioned input character code is fetched, inclusive of the second mentioned input character code, is "ON".

19. A text search system for deciding en bloc whether or not a plurality of user-designator search terms exist in a text composed of characters expressed in the form of character codes, characterized in that said system comprises:
character string storage means for storing the text;
parallel filtering means for fetching character codes sequentially on an n-by-n character basis from the text read out from said character string storage means to thereby make decision for m, where m represents a divisor of n, characters in parallel as to whether or not n, where n represents an integer not smaller than 2, character codes as fetched are included in said search terms as concatenate character strings and output said n concatenate character codes only when they are included in said search term;
character string matching means for deciding by matching en bloc whether or not said search terms exist in a compound character string constituted by a chain of character strings each composed of n concatenate character codes outputted from said parallel filtering means; and
synchronizing means provided between said parallel filtering means and said character string matching means for buffering differences in processing speed while transferring data from said parallel filtering means to said character string matching means.

20. A text search system set forth in claim 19, characterized in that said parallel filtering means includes:
character codes distributing means for outputting distributively input character codes every time the character code is fetched on a one-by-one character basis in sequence from the text read out from said character string storage means;
m filtering means connected in parallel with one another for making decision as to whether or not the character codes outputted from said distributing means are included in said search terms; and
collecting means for fetching and arraying the character codes outputted from said m filtering means to thereby output the arrayed character codes to said character string matching means.

21. A text search system set forth in claim 19, characterized in that said filtering means includes parallel filtering means, wherein every time an input character code is fetched on a one-by-one character basis sequentially from the text read out from said character string storage means, said parallel filtering means makes decision for m, where m represents a divisor of n, characters in parallel as to whether or not the character codes of n characters fetched till then inclusive of said input character code are included in the search terms as a string of concatenate characters, for thereby outputting the character code fetched first of said n concatenate character codes to said character string matching means only when said character codes of n characters are decided as being included in said search terms as a concatenate character string.

22. A text search system set forth in claim 21, characterized in that said system further includes collecting means for storing once the character codes outputted from the m filtering means in a buffer in dependence on a processing state of said character string matching means, wherein said character codes are outputted to said character string matching means in accordance with the order in which said character codes were inputted to said distributing means.

23. A text search system set forth in claim 19, characterized in that said parallel filtering means includes distributing means for fetching n character codes at one time from the text read out form said character string storage means to thereby output said character codes while dividing them;
m filtering means connected in parallel for making decision as to whether or not the character codes outputted from said distributing means are those character codes which are included in said search terms; and
collecting means for fetching and arraying the character codes outputted from said m filtering means to thereby output the arrayed character codes to said character string matching means.

24. A text search system set forth in claim 23, characterized in that said filtering means include leading concatenate character flag storage means for setting a value indicating "ON" in a slot corresponding to concatenate character codes of a leading portion, referred to as leading concatenate character codes, of the search term designated previously while setting a value indicating "OFF" in slots corresponding to the other character codes, and trailing concatenate character flag storage means for setting a value indicating "ON" in slots corresponding to other concatenate character codes, referred to as trailing concatenate character codes, than said leading concatenate character codes contained in said search term while setting a value indicating "OFF" in slots corresponding to the other concatenate character codes;

said system further comprising output select means for referencing said leading concatenate character flag storage means and said trailing concatenate character flag storage means in correspondence to n concatenate character codes inputted from said character string storage means sequentially, to thereby output said concatenate character codes to said character string matching means only when the relevant leading concatenate character flag as read out is "ON" while when said leading character flag once assumed "ON", said output select means outputs the input character codes to said character string matching means only when either the relevant leading character flag or trailing character flag is "ON" before both of said leading character flag and said trailing character flag become "OFF".

25. A text search system set forth in claim 23, characterized in that said filtering means includes delimiter output means for fetching n concatenate character codes sequentially from the text read out from said character string storage means to thereby output said n concatenate character codes to said character string matching means only when said n concatenate character codes are included in the designated search terms, while outputting a particular delimiter code to said character string matching means when said n concatenate character codes are not included in the designated search terms and when n concatenate characters inputted immediately before are included in said search terms.

26. A text search system set forth in claim 25, characterized in that said filtering means further includes delimiter code output means, wherein every time an input character code is fetched on a one-by-one character basis sequentially from the text read out from said character string storage means, said delimiter code output means outputs a particular delimiter code to said character string matching means only when the flag correspond to the character codes of n characters fetched till then inclusive of said input character code is "OFF" and when the flag corresponding to n character codes fetched up to a time point when an input character code immediately preceding the first mentioned input character code is fetched, inclusive of the second mentioned input character code, is "ON".

27. A text search method for deciding en bloc whether or not a plurality of user-designated search terms exist in a text composed of characters expressed in the form of character codes, characterized in that character codes are fetched from said text to output only those character codes that are included in said search terms by extracting said character codes, referred to as filtering;

matching is performed en bloc for deciding whether or not said search terms exist in the string of said character codes as outputted; and synchronizing between said filtering and said matching for buffering differences in processing speed while transferring data from said filtering to said matching.

28. A text search method set forth in claim 27, characterized in that in said filtering, a value indicating "ON" is set as a flag to a leading character code of the search term designated previously with a value indicating "OFF" being set as a flag to other character codes, the flags being referred to as leading character flags, while a value indicating "ON" is set as a flag to other character code than said leading character code of those included in said search term with a value indicating "OFF" being set as a flag to the other character code then said those codes, the flags being referred to as trailing character flags, and that said leading character flag and trailing character flag are referenced in correspondence to character codes inputted on a one-by-one character code basis to thereby output a character code only when the relevant leading character flag as read out is "ON" and wherein an input character code is outputted when either the relevant leading character flag or trailing character flag is "ON" before both of said leading character flag and trailing character flag become "ON", when said leading character flag is once assumed "ON".

29. A text search method set forth in claim 27, characterized in that in said selective outputting, a particular delimiter code is outputted only when said leading character flag and trailing character flag corresponding to character codes as inputted are "OFF" and when said leading character flag and trailing character flag corresponding to character codes inputted immediately before are "ON".

30. A text search method set forth in claim 27, characterized in that in said filtering, a value indicating "ON" is set as a flag for the character codes of the characters which are included in the search terms designated previously while a value indicating "OFF" is set as a flag for the other character codes, and that said flags are referenced in correspondence to a character code inputted on a one-by-one character basis from said text to thereby output a character code only when a relevant flag is "ON", said character code as outputted being then subjected to a character string matching.

31. A text search method set forth in claim 30, characterized in that said flags are referenced in correspondence to a character code as inputted to thereby inhibit the character code from being outputted when the relevant flag is "OFF" while outputting a particular delimiter code only when the flag which corresponds to an immediately preceding input character code is "ON".

32. A text search method for deciding en bloc whether or not a plurality of user-designated search terms exist in a text composed of characters expressed in the form of character codes, characterized in that character codes are sequentially fetched from said text to thereby make a decision as to whether or not n, where n represents an integer not smaller than 2, character codes as fetched are included in said search terms as a concatenate character string and output by extracting said n concatenate character codes, referred to as concatenate filtering, only when they are included in said search terms, and that matching is performed en bloc for deciding whether or not said search terms exist in a compound character string constituted by a chain of character strings each composed of the n concatenate character codes as outputted, and synchronizing between said filtering step and said matching step for buffering differences in processing speed while transferring data from said filtering step to said matching step.

33. A text search method set forth in claim 32, characterized in that in said filtering, a value indicating "ON" is set as a flag for the character codes of the n concatenate characters included in the search terms designated previously while setting a value indicating "OFF" as a flag for the character codes of the other n concatenate characters, and that said flags are referenced in correspondence to n concatenate character codes as inputted to thereby output selectively n concatenate character codes only when the relevant flag as read out is "ON".

34. A text search method set forth in claim 32, characterized in that in said selective outputting, a particular delimiter code is outputted only when said flag corresponding to the n concatenate character codes as inputted is "OFF" and when said flag corresponding to n concatenate character codes inputted immediately before is "ON".

35. A text search method set forth in claim 32, characterized in that in said concatenate filtering is effected by using a pointer table storing order numbers, referred to as serial numbers, allotted in correspondence to the character codes included in the search term designated previously in slots indicated by said character codes, and a concatenate filtering table storing flags indicating "ON" in slots accessed by using as addresses therefore codes each represented by a string of the serial numbers corresponding to n concatenate character codes, respectively, which are included in the designated search term while storing "OFF" in the other slots.

36. A text search method set forth in claim 32, characterized in that in said concatenate filtering;

for the n concatenate character code string, referred to as a leading text code string, including m character codes as counted from the leading one of said n concatenate character codes and a character code string, referred to as a trailing text code string, including n–m character codes succeeding to said leading text code string;

offset values mentioned below are stored in an offset table which is accessed with an address represented by said leading text code string;

a sum of the offset value read out from said offset table and said trailing text code string is determined as an offset-added value;

n concatenate character codes contained in the search term as designated are stored in slots of a verify table which can be accessed by using said offset-added value as an address; and n concatenate character codes read out from said verify table are compared with n concatenate character codes read out from said text, to thereby output a coincidence signal when said comparison results in coincidence;

wherein the offset values are stored in slots which are accessed by suing as addresses m character codes, referred to as a leading term code string, from the start of the n concatenate character codes, referred to as a term code string, contained in the designated search term, said offset values being obtained by subtracting from an address value of the slot of said verify table in which said term code string is stored the values of n–m character code strings, referred to as trailing term code strings, which succeed to the leading term code string of said term code string.

37. A text search method set forth in claim 32, characterized in that in said filtering, a value indicating "ON" is set as a flag for concatenate character codes, referred to as leading concatenate character codes, of a leading portion of the search term designed previously with a value indicating "OFF" being set as a flag to other character codes, referred to as trailing concatenate character codes, then said leading concatenate character codes in those included in said search term, while a value indicating "ON" is set as a flag to the other concatenate character codes, and that said leading concatenate character flag and said trailing concatenate character flag are referenced in correspondence to n concatenate character codes inputted sequentially to thereby output concatenate character codes to said character string matching only when the relevant leading concatenate character flag as read out is "ON" and selectively output n input concatenate character codes to said character string matching only when either the relevant leading concatenate character flag or designated concatenate character flag is "ON" before both of said leading concatenate character flag and said trailing concatenate character flag become "OFF", when said leading concatenate character flag is once assumed "ON".

38. A test search method set forth in claim 37, characterized in that in said selective outputting, a particular delimiter code is outputted to said character string matching means only when said leading character string flag and trailing character string flag corresponding to the n concatenate character codes as inputted are "OFF" and when said leading character string flag and said trailing character string flag corresponding to n concatenate character codes as inputted immediately before are "ON".

\* \* \* \* \*